US008717504B2

(12) United States Patent
Tsurumi

(10) Patent No.: US 8,717,504 B2
(45) Date of Patent: May 6, 2014

(54) PICTURE PROCESSING APPARATUS, PROCESSING METHOD FOR USE THEREWITH, AND PROGRAM

(71) Applicant: Sony Corporation, Tokyo (JP)

(72) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/035,514

(22) Filed: Sep. 24, 2013

(65) Prior Publication Data
US 2014/0022455 A1 Jan. 23, 2014

Related U.S. Application Data

(63) Continuation of application No. 12/530,477, filed as application No. PCT/JP2008/072936 on Dec. 17, 2008, now Pat. No. 8,599,320.

(30) Foreign Application Priority Data

Jan. 21, 2008 (JP) ................................. 2008-010205

(51) Int. Cl.
| H04N 5/60 | (2006.01) |
| H04N 5/262 | (2006.01) |
| G03B 21/14 | (2006.01) |
| G06T 13/00 | (2011.01) |
| H04N 7/167 | (2011.01) |
| H04N 5/272 | (2006.01) |
| G06T 13/40 | (2011.01) |
| G09G 5/377 | (2006.01) |

(52) U.S. Cl.
CPC ............... *H04N 5/272* (2013.01); *G06T 13/00* (2013.01); *G06T 13/40* (2013.01); *G09G 2340/125* (2013.01); *G09G 5/377* (2013.01)
USPC ............. 348/738; 348/239; 353/84; 345/474; 380/201

(58) Field of Classification Search
CPC ........ H04N 5/272; G06T 13/00; G06T 13/40; G09G 2340/125; G09G 5/377
See application file for complete search history.

(56) References Cited

U.S. PATENT DOCUMENTS

| 4,251,688 A | 2/1981 | Furner |
| 5,469,274 A | 11/1995 | Iwasaki et al. |

(Continued)

FOREIGN PATENT DOCUMENTS

| JP | 5-260264 | 10/1993 |
| JP | 9-62861 | 3/1997 |

(Continued)

OTHER PUBLICATIONS

Office Action issued Jul. 26, 2010, in Japanese Patent Application No. 2008-010205.

(Continued)

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

A picture conversion information supply section 130 calculates per frame an affine transformation parameter for picture conversion based on motion information about a moving picture. With reference to a reference picture, a picture conversion section 140 affine-transforms pictures making up the moving picture per frame using the calculated affine transformation parameters. Based on information indicating the center position, angle or scaling factor about the transformed pictures coming from the picture conversion section 140, a sound conversion information calculation section 190 calculates sound conversion information for converting the sound corresponding to the pictures. Based on the sound conversion information, a sound conversion processing section 200 controls the volume of each of the channels making up the sound, adds up the controlled sound of each channel, and outputs the result as output sound to speakers 220.

24 Claims, 60 Drawing Sheets

(56) References Cited

U.S. PATENT DOCUMENTS

| | | |
|---|---|---|
| 5,649,032 A | 7/1997 | Burt et al. |
| 5,657,402 A | 8/1997 | Bender et al. |
| 5,706,416 A | 1/1998 | Mann et al. |
| 5,920,657 A | 7/1999 | Bender et al. |
| 5,953,485 A | 9/1999 | Abecassis |
| 5,999,662 A | 12/1999 | Burt et al. |
| 6,393,163 B1 | 5/2002 | Burt et al. |
| 6,895,126 B2 | 5/2005 | Di Bernardo et al. |
| 7,327,494 B2 | 2/2008 | Aiso |
| 2001/0005208 A1 | 6/2001 | Minami et al. |
| 2004/0150657 A1 | 8/2004 | Wittenburg et al. |
| 2005/0237395 A1 | 10/2005 | Takenaka et al. |
| 2006/0109283 A1 | 5/2006 | Shipman et al. |
| 2007/0008499 A1 | 1/2007 | Iketani et al. |
| 2007/0053513 A1 | 3/2007 | Hoffberg |
| 2007/0103544 A1 | 5/2007 | Nakazawa |

FOREIGN PATENT DOCUMENTS

| | | |
|---|---|---|
| JP | 11-120353 | 4/1999 |
| JP | 11-134352 | 5/1999 |
| JP | 2000-295700 A | 10/2000 |
| JP | 2002-359798 | 12/2002 |
| JP | 2003-264900 A | 9/2003 |
| JP | 2004-266670 | 9/2004 |
| JP | 2005-217874 | 8/2005 |
| JP | 2005-311604 | 11/2005 |
| JP | 2007-183588 | 7/2007 |
| WO | WO 2005/024723 A1 | 3/2005 |
| WO | WO 2005/032125 A1 | 4/2005 |

OTHER PUBLICATIONS

Supplementary European Search Report dated Nov. 11, 2010 in corresponding European Application No. 08 87 1439.

Akihito Akutsu et al., "Video Interface for Spatiotemporal Interactions Based on Multi-Dimensional Video Computing", IEEE International Conference on Acoustics, Speech and Signal Processing, 1997, vol. 1, XP 010226167, pp. 191-194.

FIG.2
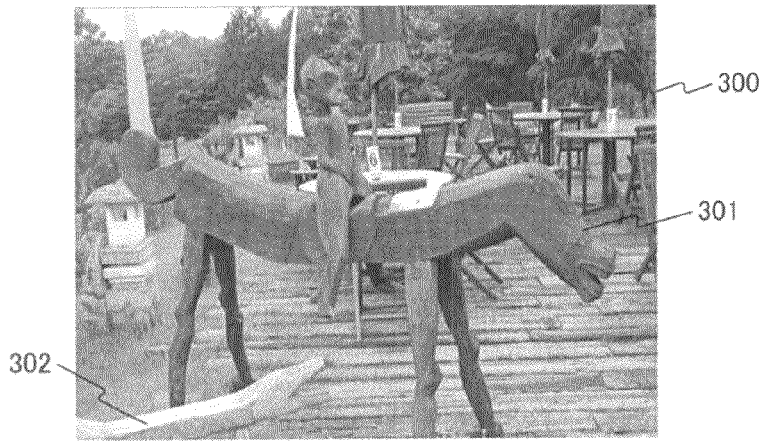
(a)
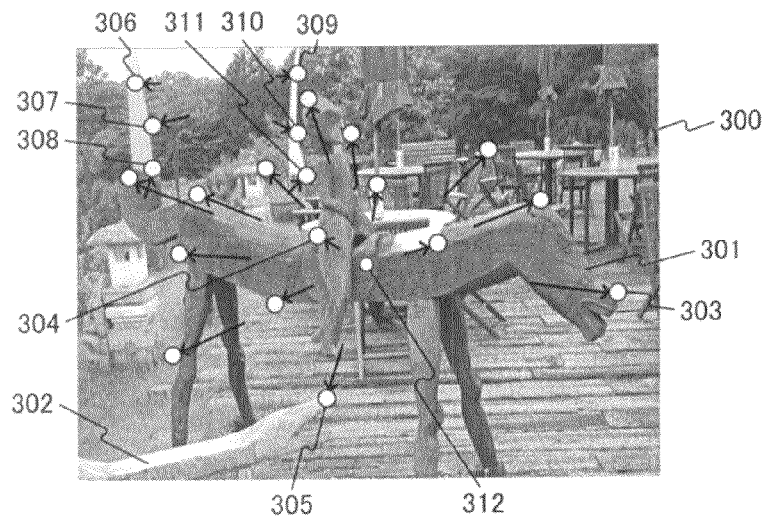
(b)
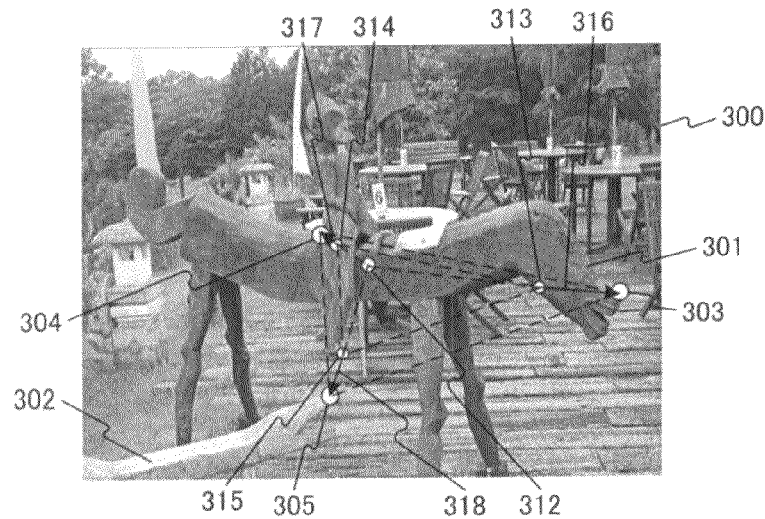
(c)

FIG. 5
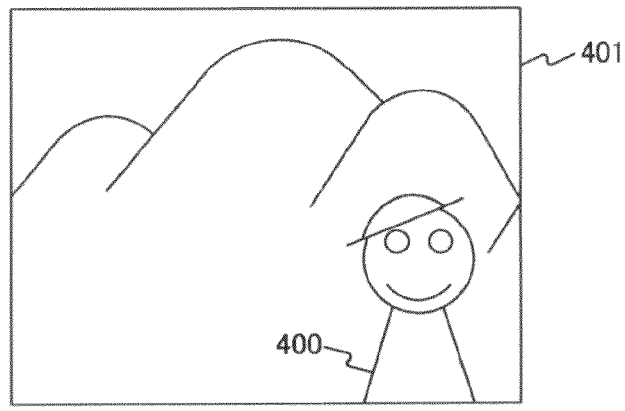
(a)
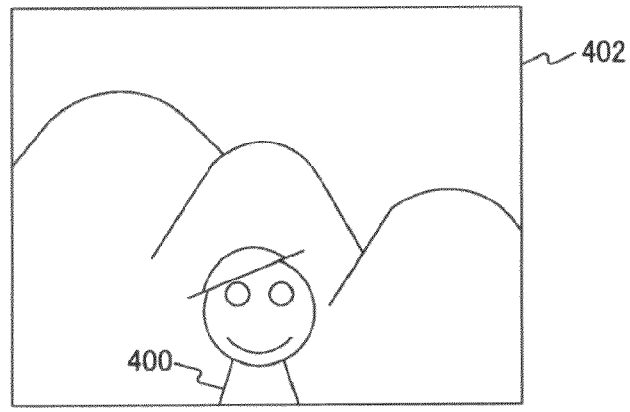
(b)
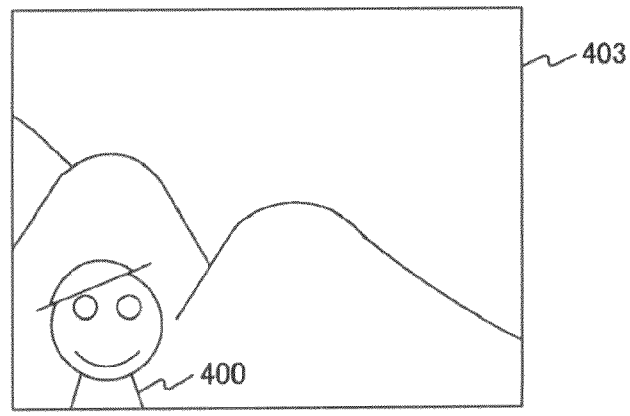
(c)

FIG. 6
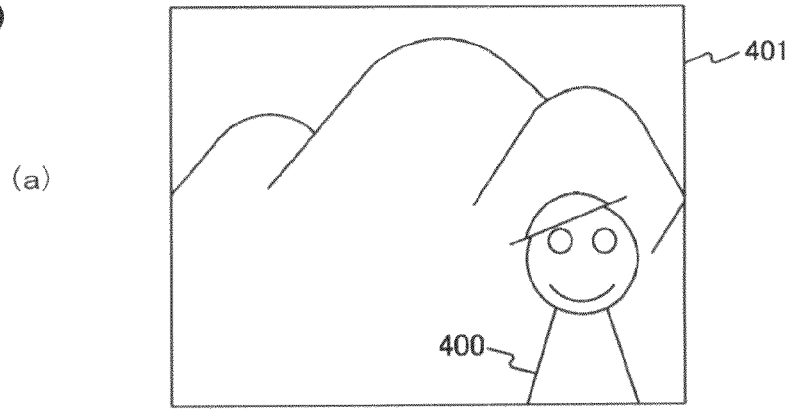
(a)
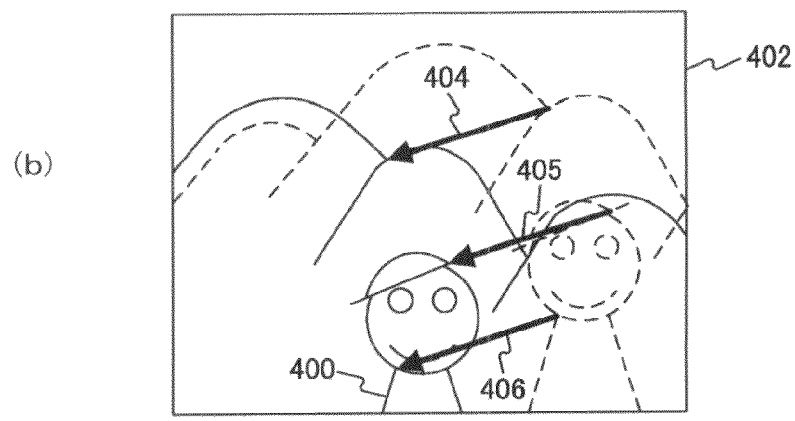
(b)
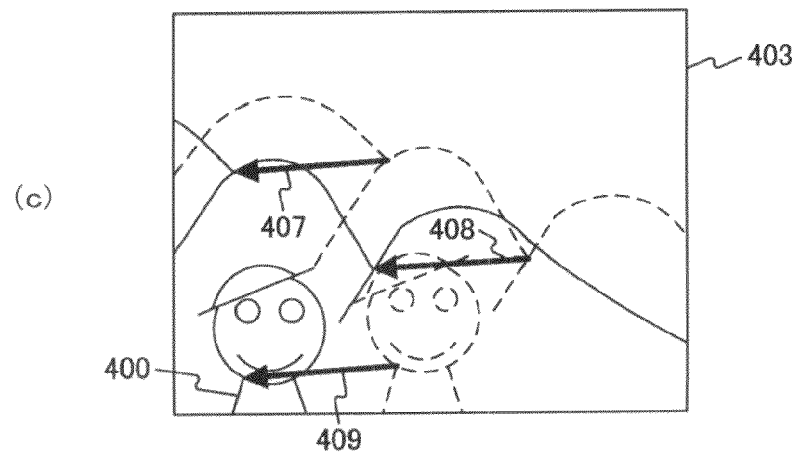
(c)

FIG. 9
(a) 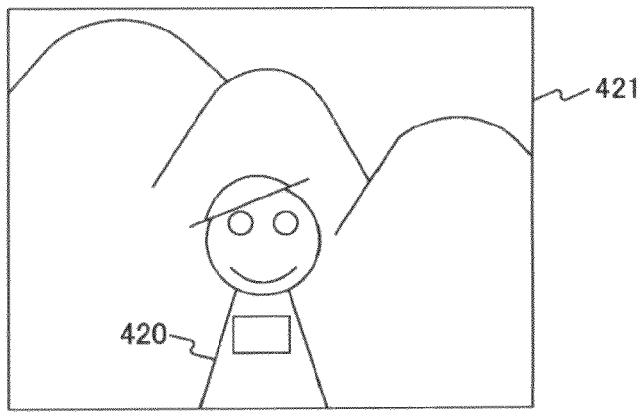
(b) 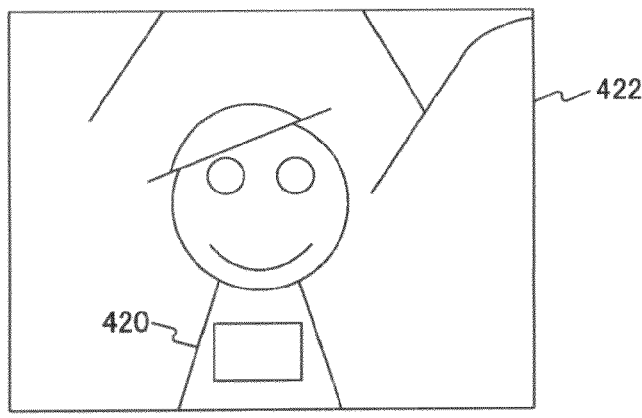
(c) 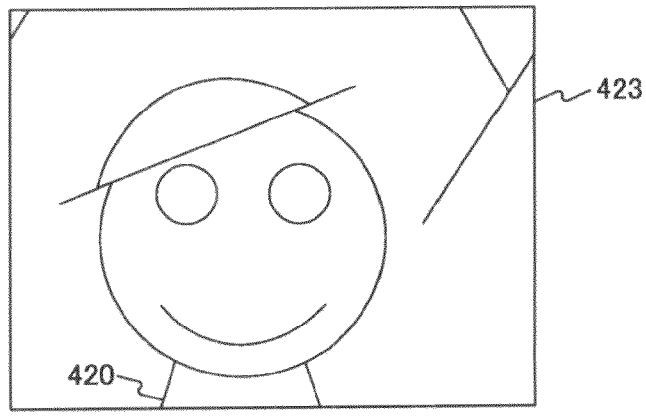

FIG.10
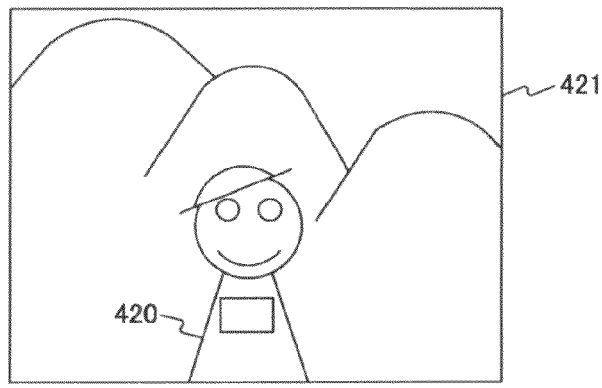
(a)
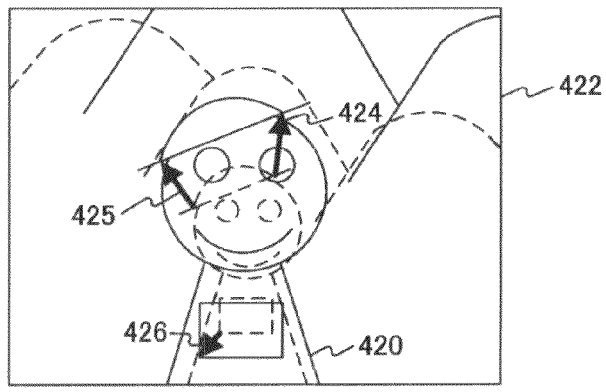
(b)
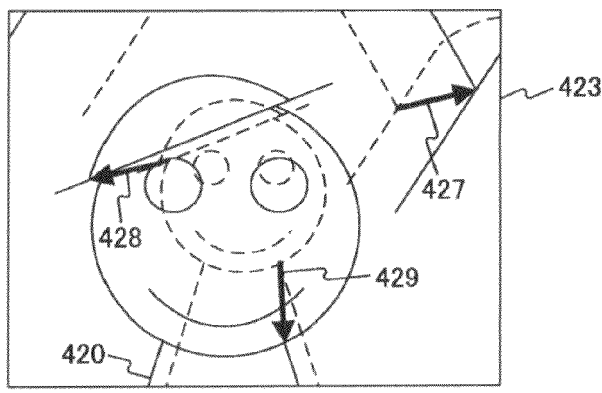
(c)

FIG.11
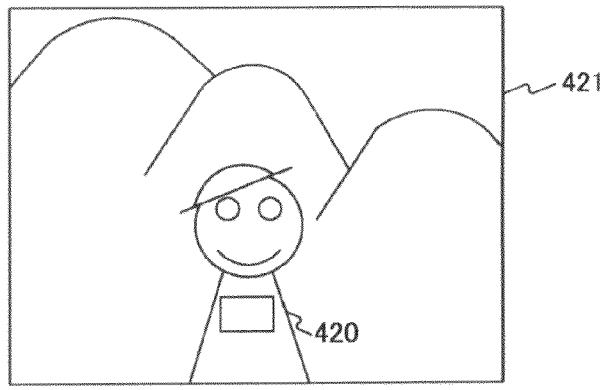
(a)
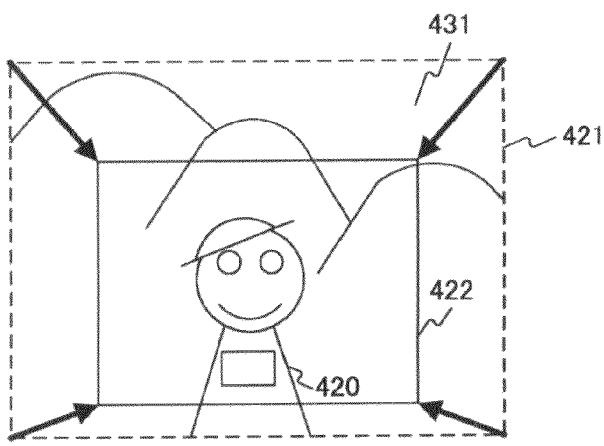
(b)
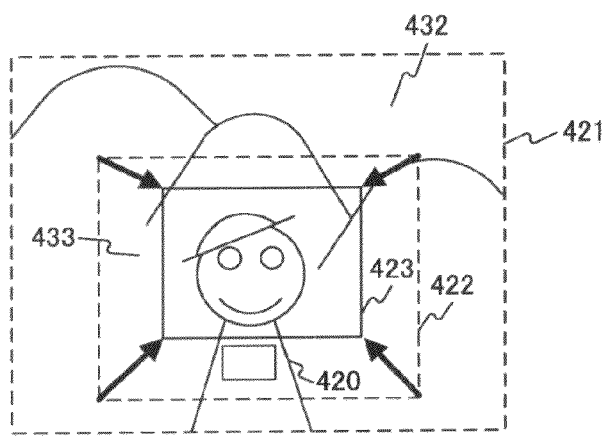
(c)

FIG.12
(a) 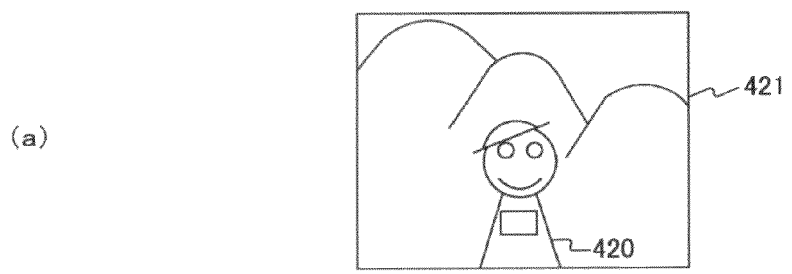
(b) 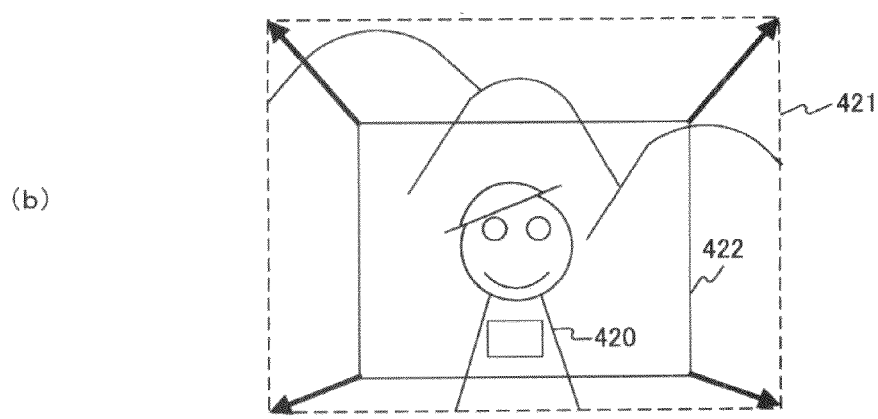
(c) 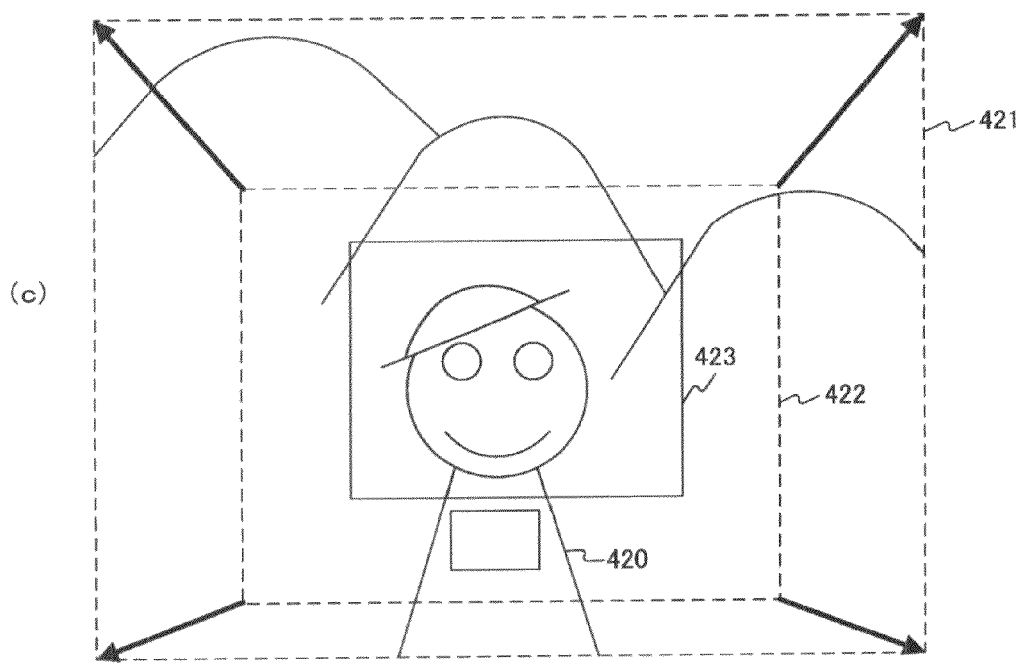

FIG.13
(a) 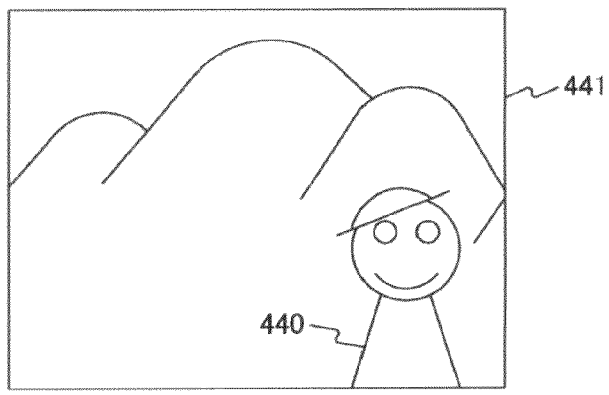
(b) 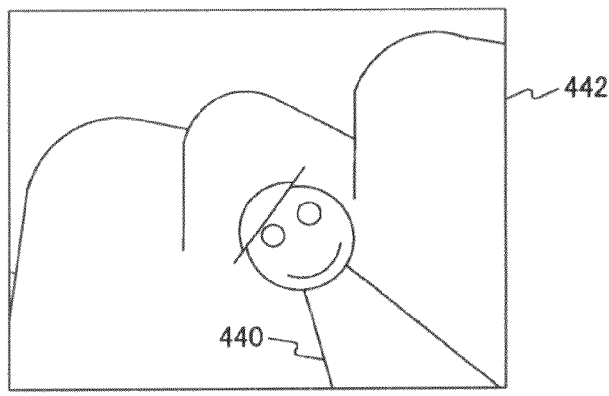
(c) 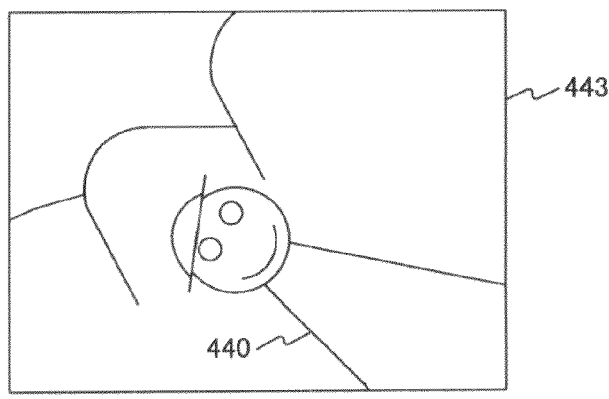

FIG. 14
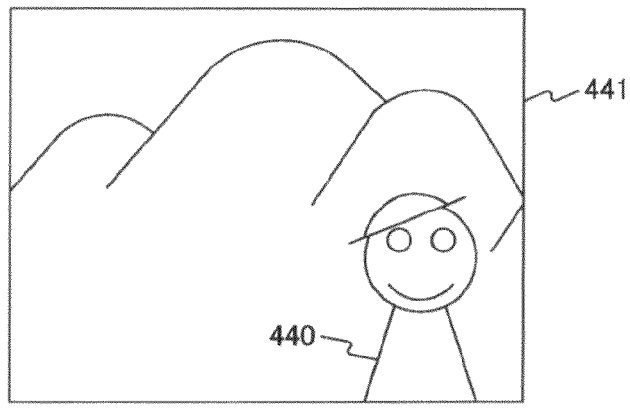
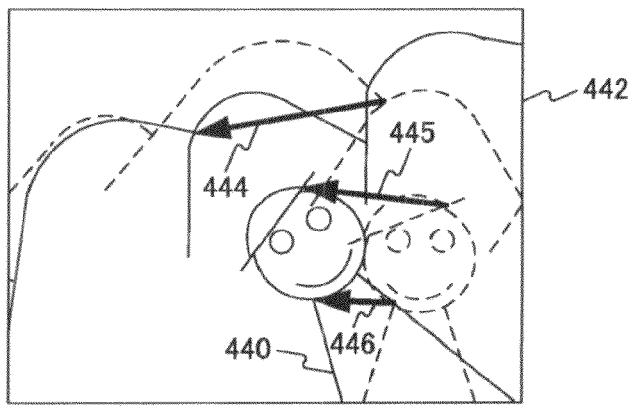
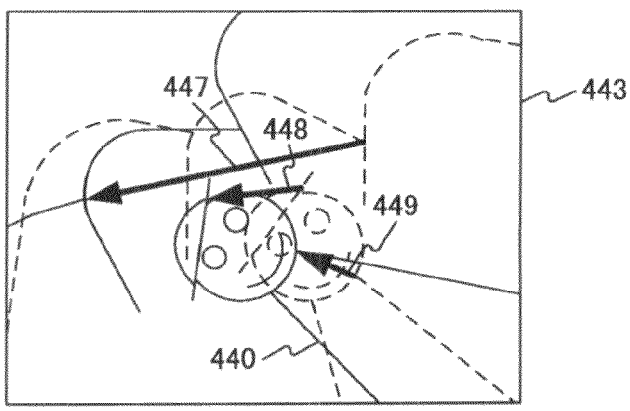

FIG.16
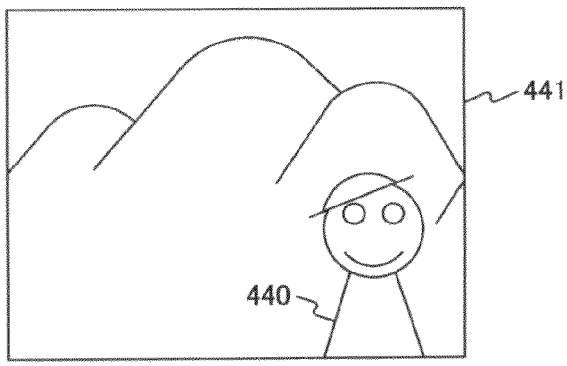
(a)
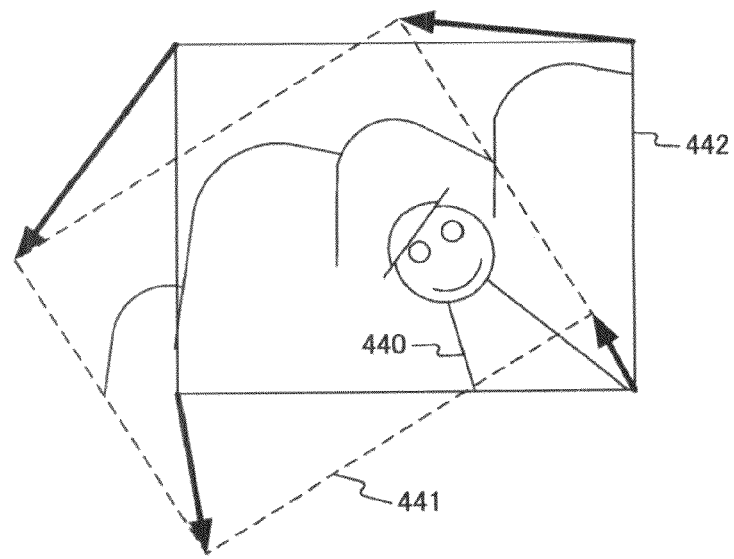
(b)
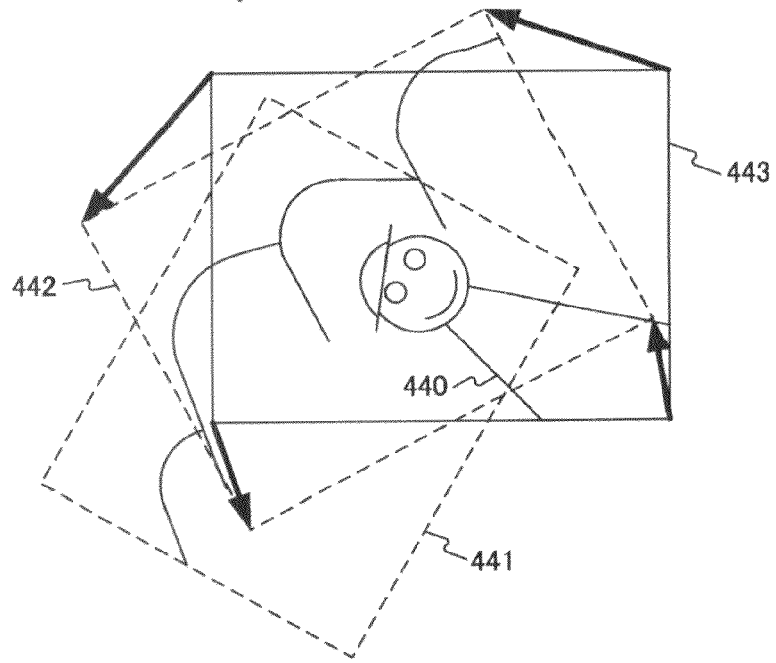
(c)

FIG. 18
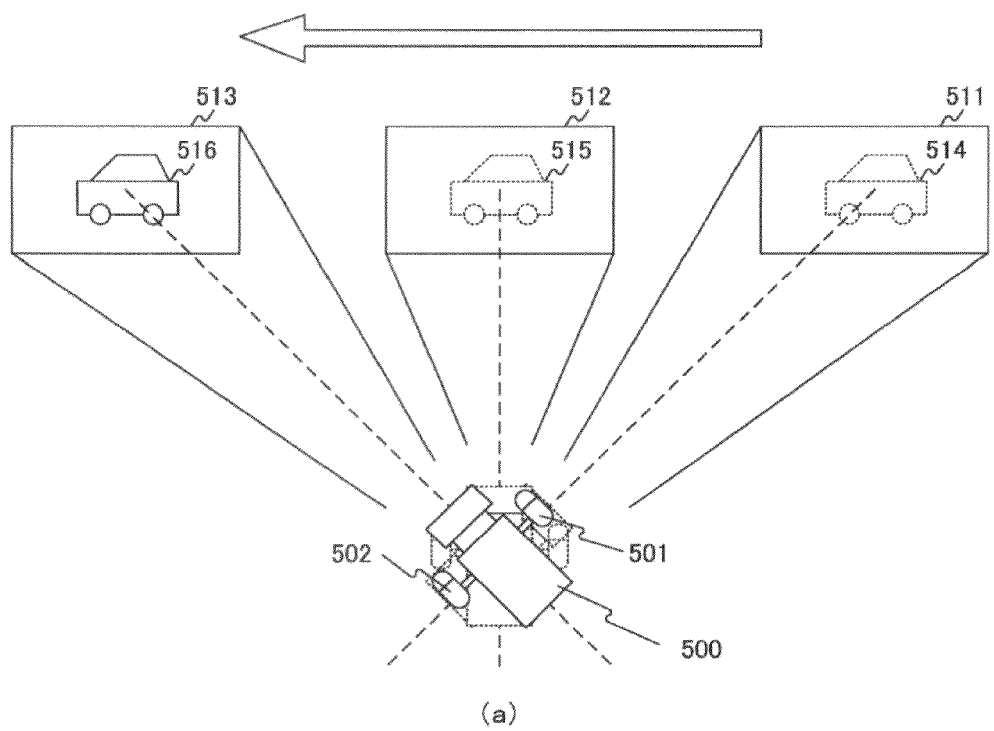
(a)
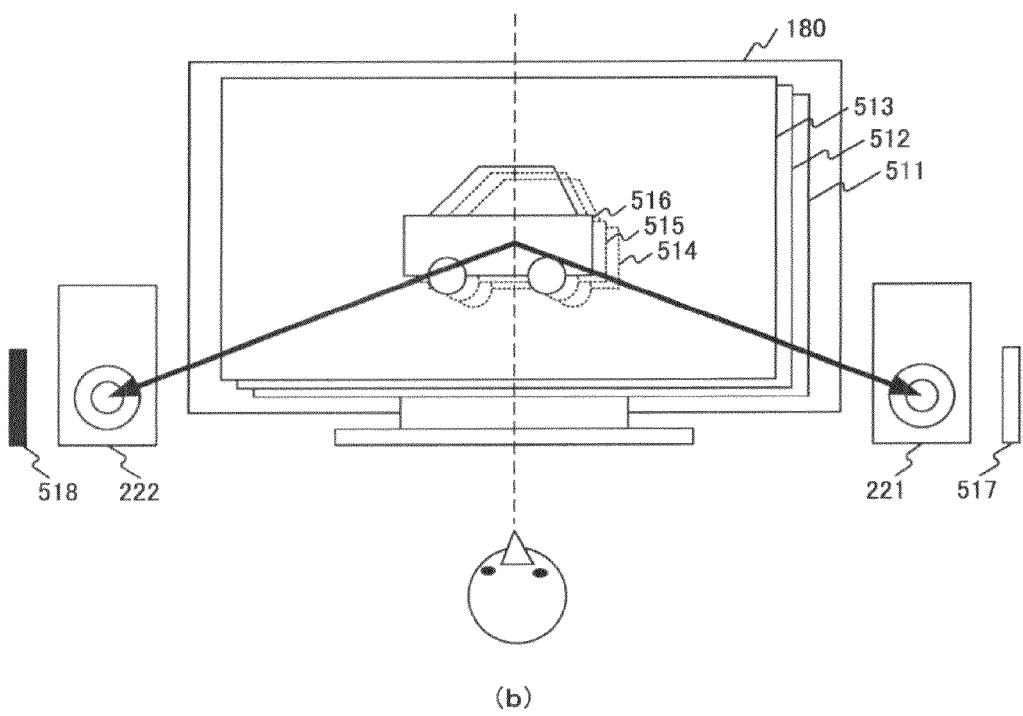
(b)

FIG.21
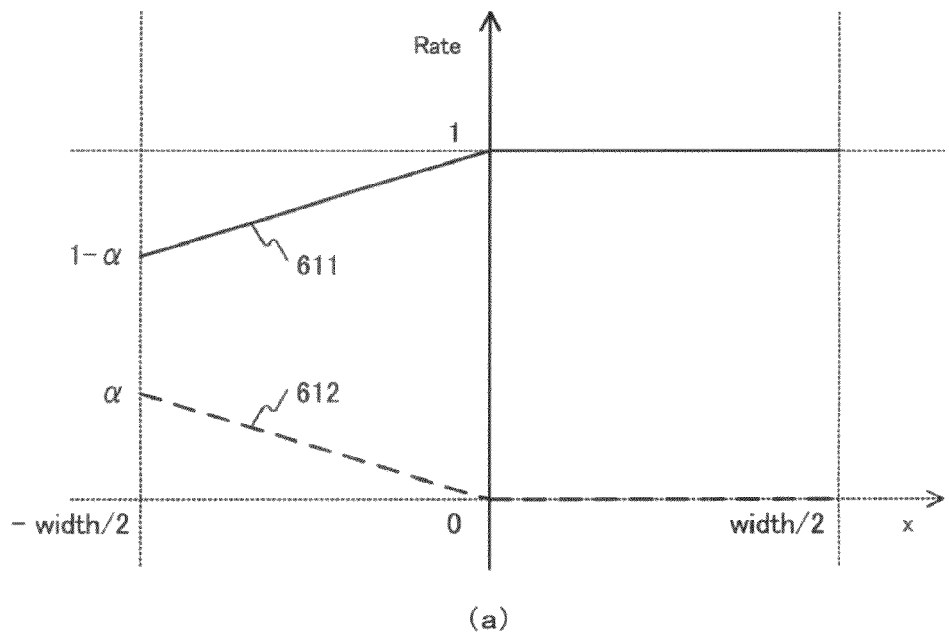
(a)
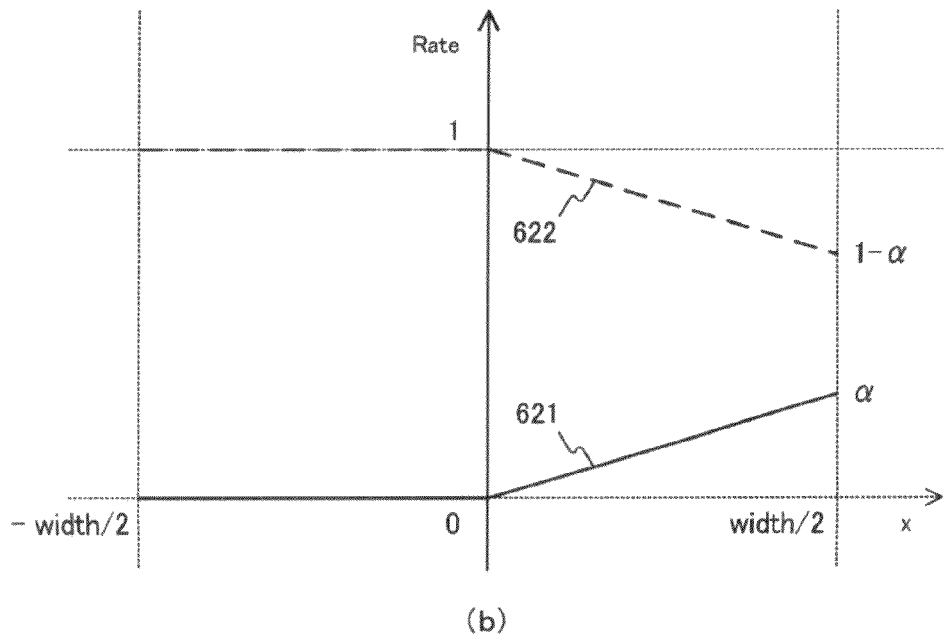
(b)

FIG.22
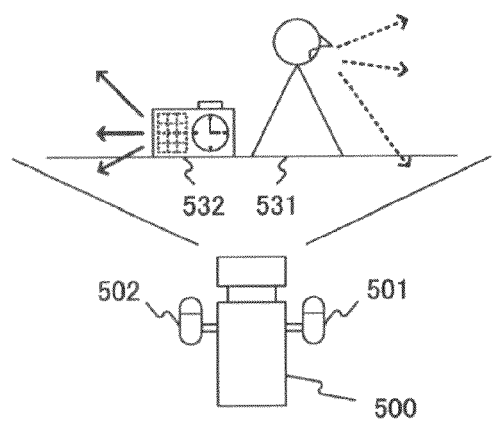
(a)
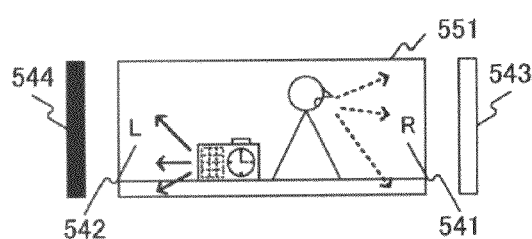
(b)
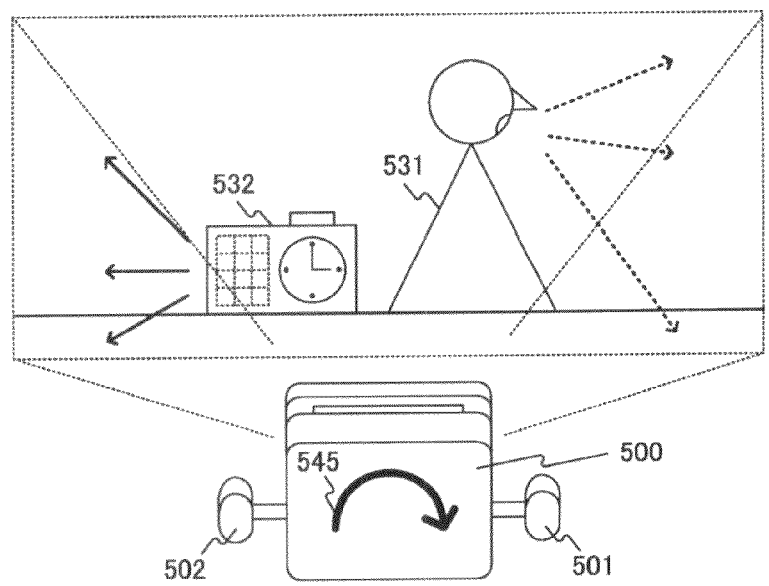
(c)

FIG.24
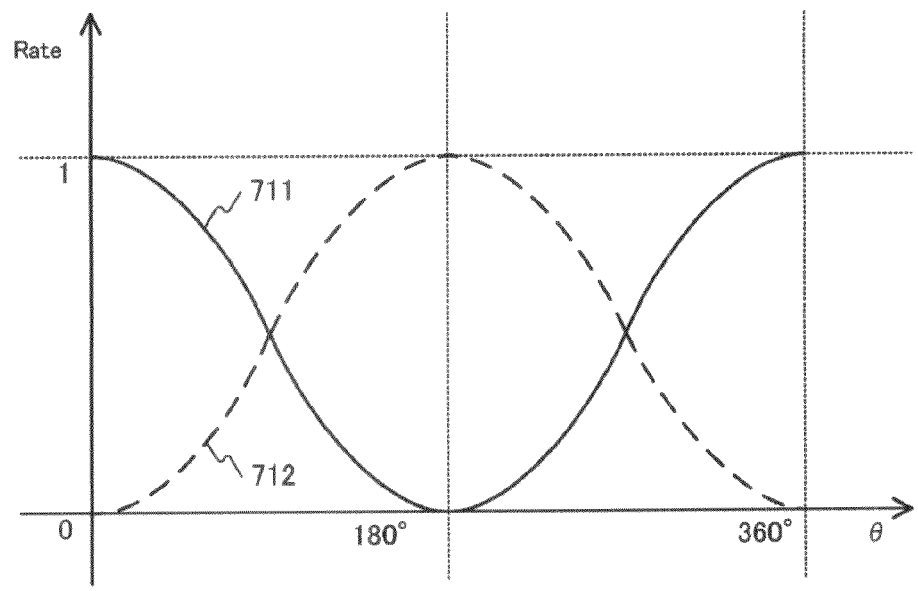
(a)
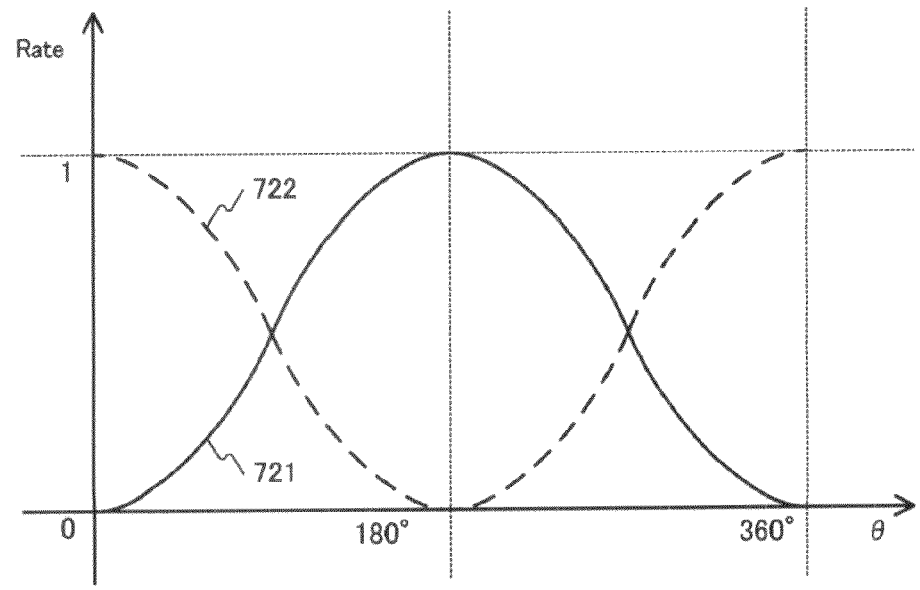
(b)

FIG.26
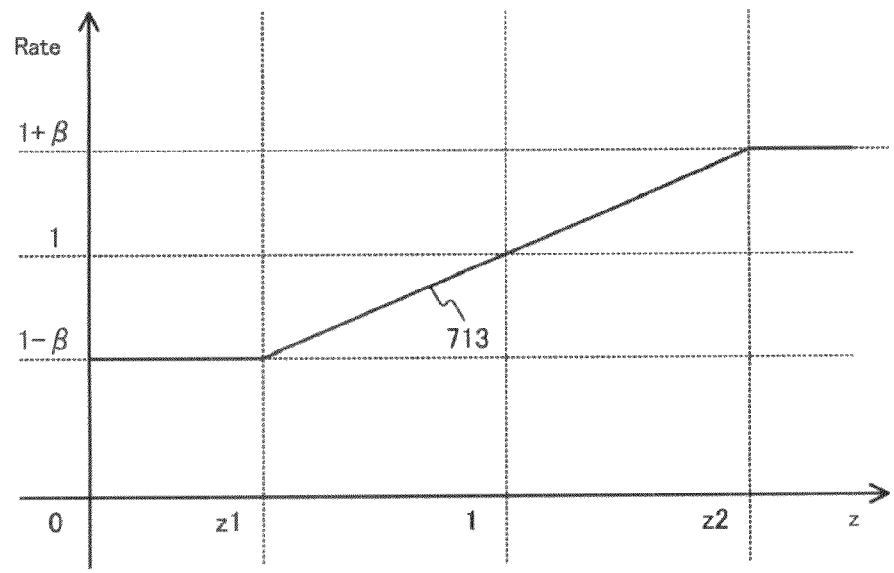
(a)
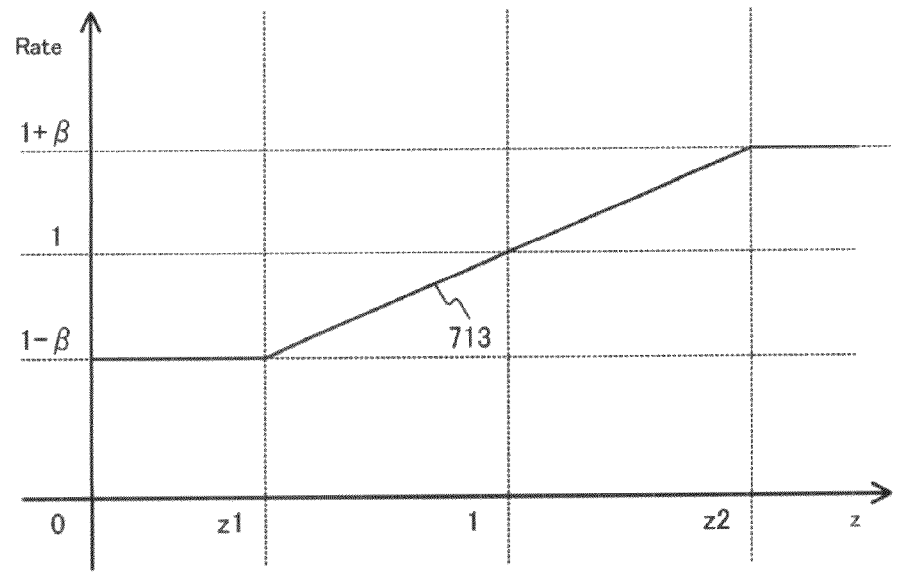
(b)

FIG.30
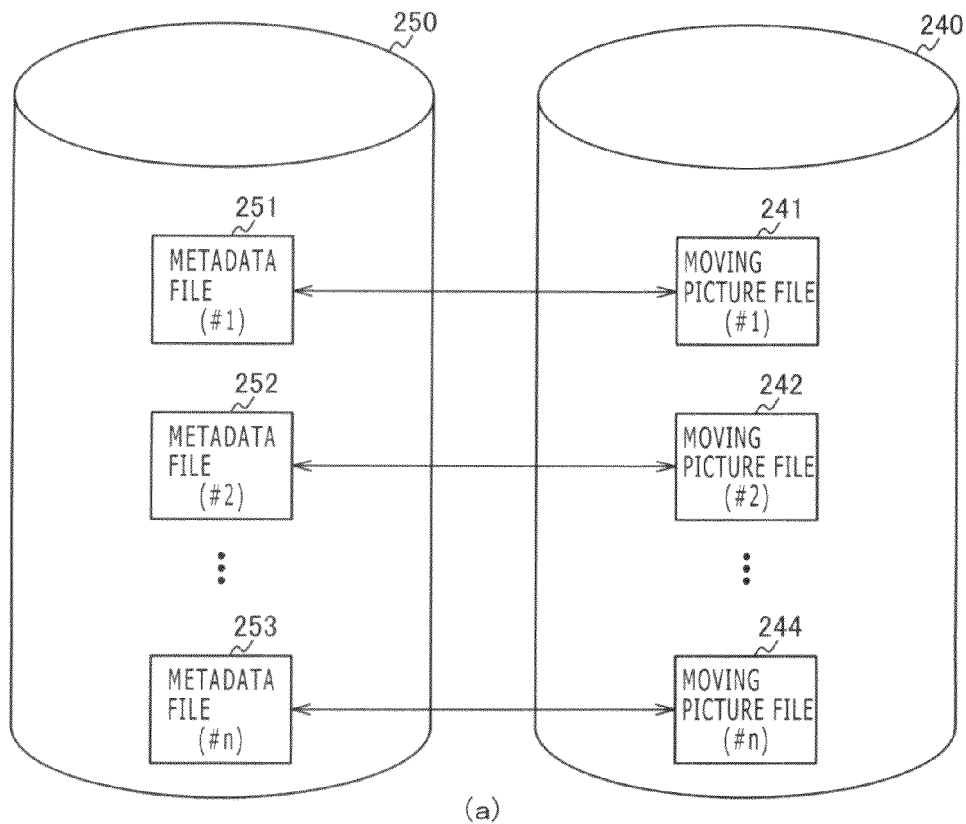
(a)
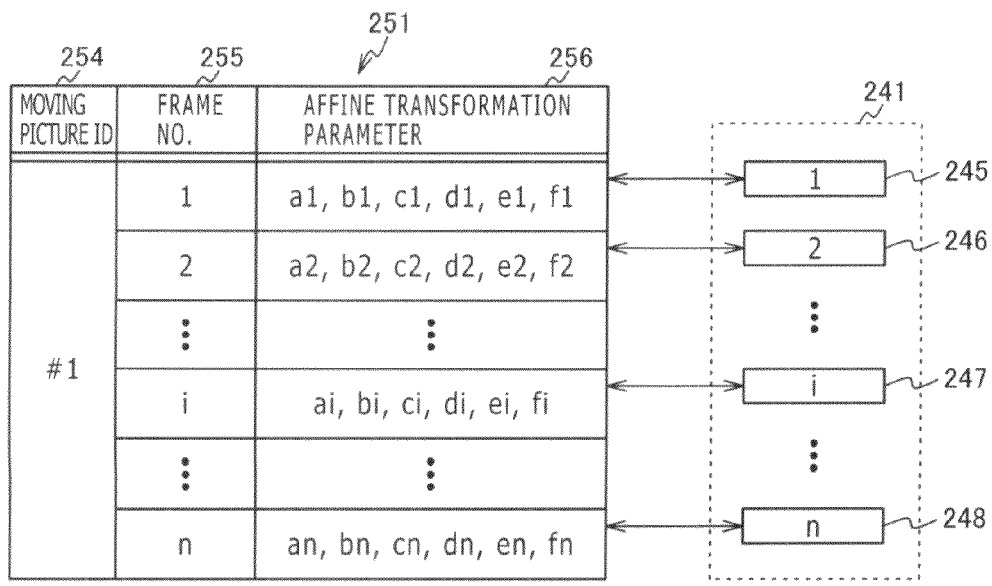
(b)

FIG.32
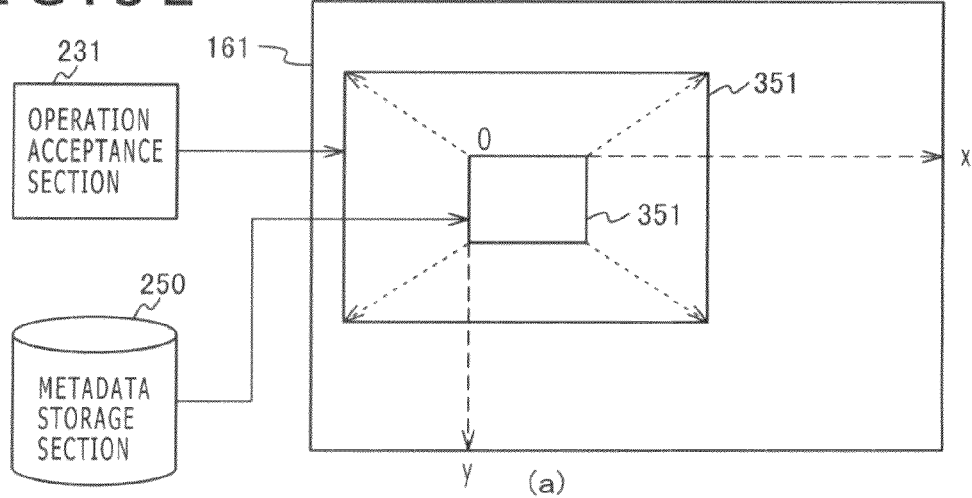
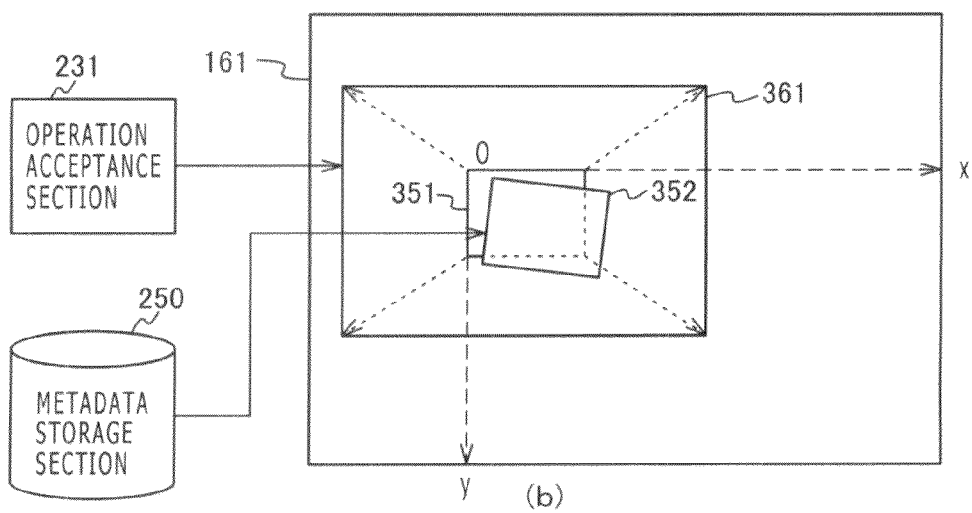
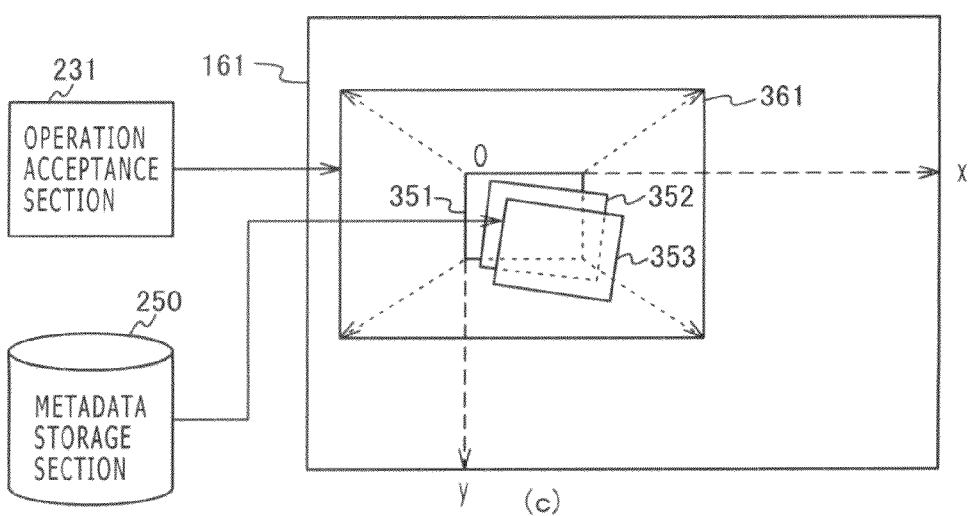

FIG.33
(a) 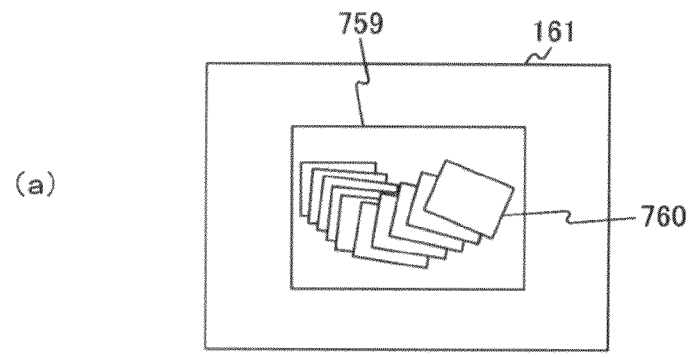
(b) 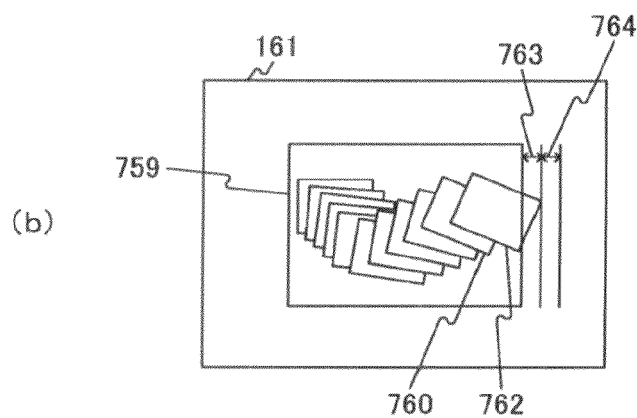
(c) 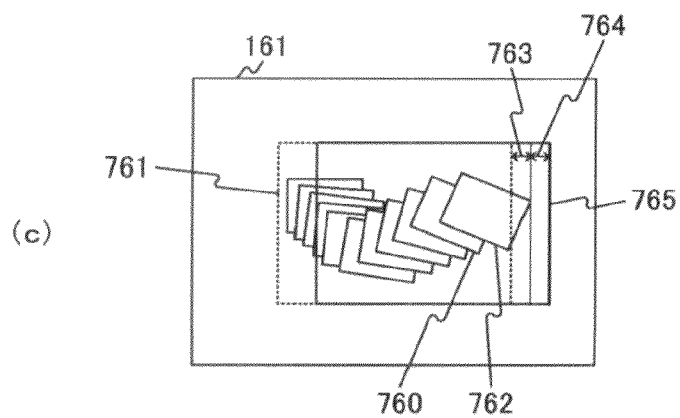

FIG.47
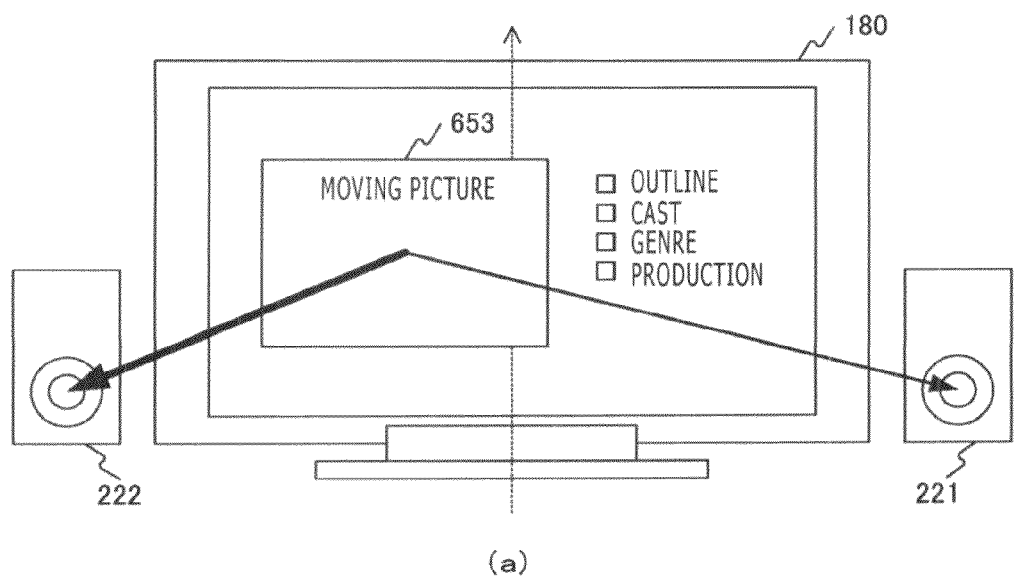
(a)
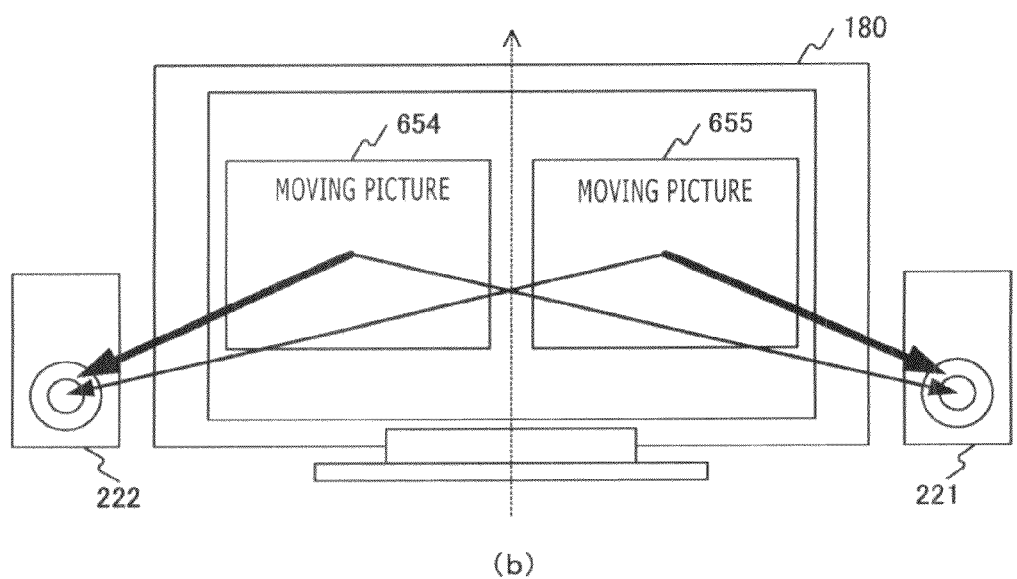
(b)

FIG.54

| A1 | + | B1 | = | C1 |
| A2 | + | B2 | = | C2 |
| A3 | + | B3 | = | C3 |
| A4 | + | B4 | = | C4 |

(a)

⇩ SIMD COMPUTATIONS 827  828  829

| A1 |   | B1 |   | C1 |
| A2 | + | B2 | = | C2 |
| A3 |   | B3 |   | C3 |
| A4 |   | B4 |   | C4 |

(b)

FIG.56
OUTPUT OF RESULT

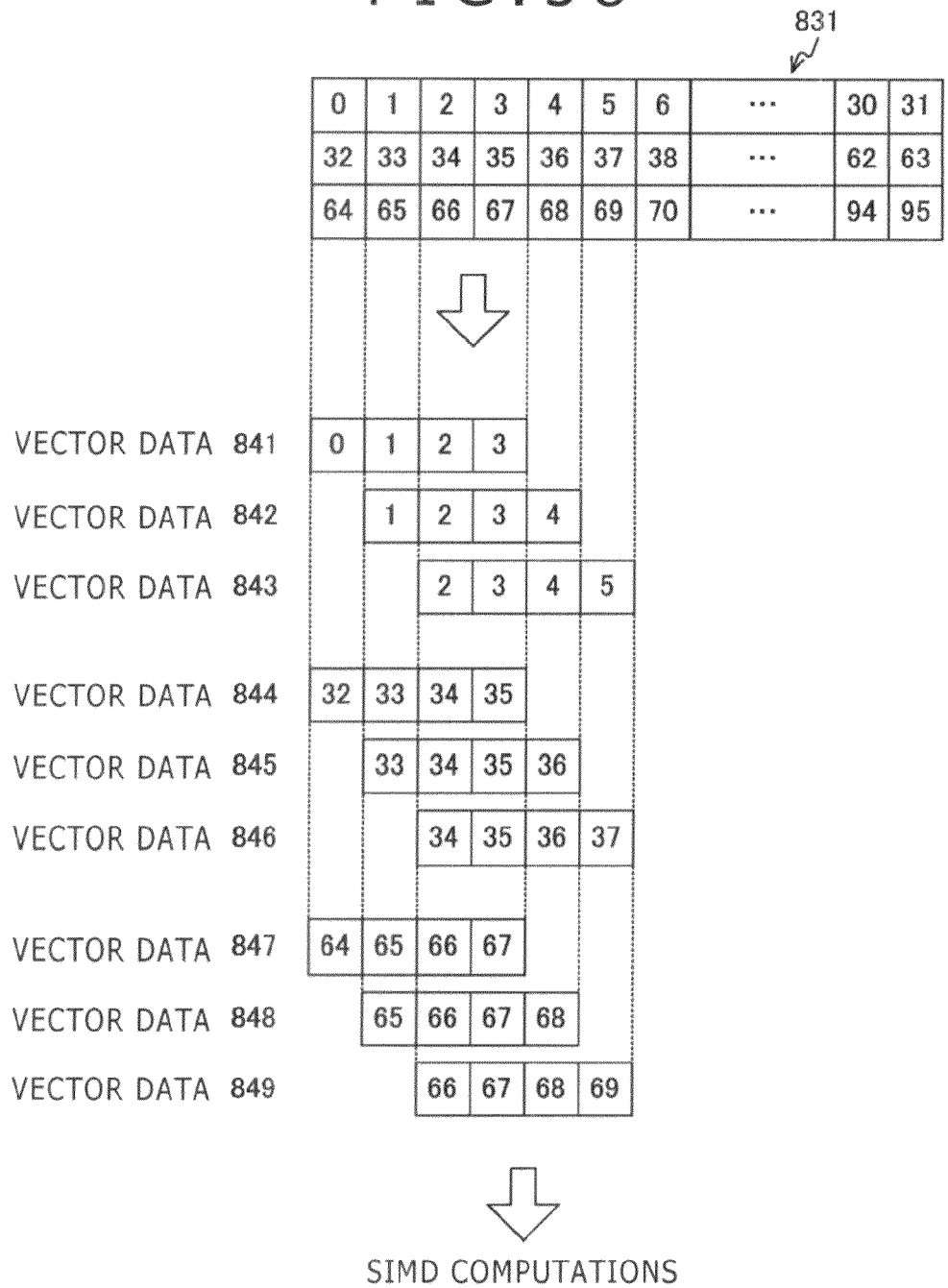

FIG.59

$$\text{VECTOR A} = \left( \boxed{-1} \times \begin{array}{|c|}\hline 0 \\\hline 1 \\\hline 2 \\\hline 3 \\\hline\end{array}\overset{841}{} + \boxed{0} \times \begin{array}{|c|}\hline 1 \\\hline 2 \\\hline 3 \\\hline 4 \\\hline\end{array}\overset{842}{} \right) + \boxed{1} \times \begin{array}{|c|}\hline 2 \\\hline 3 \\\hline 4 \\\hline 5 \\\hline\end{array}\overset{843}{}$$

$$\text{VECTOR B} = \left( \boxed{-2} \times \begin{array}{|c|}\hline 32 \\\hline 33 \\\hline 34 \\\hline 35 \\\hline\end{array}\overset{844}{} + \boxed{0} \times \begin{array}{|c|}\hline 33 \\\hline 34 \\\hline 35 \\\hline 36 \\\hline\end{array}\overset{845}{} \right) + \boxed{2} \times \begin{array}{|c|}\hline 34 \\\hline 35 \\\hline 36 \\\hline 37 \\\hline\end{array}\overset{846}{}$$

$$\text{VECTOR C} = \left( \boxed{-1} \times \begin{array}{|c|}\hline 64 \\\hline 65 \\\hline 66 \\\hline 67 \\\hline\end{array}\overset{847}{} + \boxed{0} \times \begin{array}{|c|}\hline 65 \\\hline 66 \\\hline 67 \\\hline 68 \\\hline\end{array}\overset{848}{} \right) + \boxed{1} \times \begin{array}{|c|}\hline 66 \\\hline 67 \\\hline 68 \\\hline 69 \\\hline\end{array}\overset{849}{}$$

VECTOR D = ( VECTOR A + VECTOR B ) + VECTOR C

US 8,717,504 B2

PICTURE PROCESSING APPARATUS, PROCESSING METHOD FOR USE THEREWITH, AND PROGRAM

CROSS REFERENCE TO RELATED APPLICATIONS

This application is a continuation application of U.S. application Ser. No. 12/530,477 filed Sep. 9, 2009, the entire content of which is incorporated herein by reference. U.S. application Ser. No. 12/530,477 is a National Phase of PCT/JP08/72936 filed Dec. 17, 2008 and claims priority to Japanese Patent Application No. 2008-010205 filed Jan. 21, 2008.

TECHNICAL FIELD

The present invention relates to a picture processing apparatus. More particularly, the invention relates to a picture processing apparatus capable of reproducing moving pictures, a processing method for use with the apparatus, and a program for causing a computer to execute the method.

BACKGROUND ART

In recent years, moving picture reproduction apparatuses for reproducing moving pictures taken by digital video cameras or the like have been popularized. Commonly used digital video cameras are those having a zoom capability to enlarge or contract the object being pictured in keeping with the interest of the person taking the picture. Where a moving picture taken by use of such a zoom capability is reproduced, the pictured object varies in size on a display screen but sound is output unchanged. Because of this, there is not a sufficient sense of realism available. Thus ways have been devised to process sound illustratively by taking into account the conditions under which the picture was taken by the digital video camera. For example, there have been proposed sound conversion processing methods (e.g., see Patent Document 1) whereby the levels of sound signals on a plurality of channels are controlled on the basis of information about the zooming operations made on the digital video camera.

[Patent Document 1]
Japanese Patent Laid-Open No. 2005-311604 (FIG. 2)

DISCLOSURE OF INVENTION

According to the above-mentioned prior art, when a moving picture is to be reproduced, it is possible to obtain realistic sound effects relevant to the moving picture by changing the sound volume in keeping with the amount of zoom on the digital video camera.

According to the above prior art, however, where the moving picture is to be displayed in a limited area of the display screen, there is a possibility that the amount of zoom may not match the position of the moving picture on the screen. This may make it impossible to obtain appropriate sound effects corresponding to the position of the moving picture on the screen. In this manner, where the moving picture is to be displayed in a limited area of the display screen, it is important to obtain sound effects relevant to the position of the moving picture on the screen.

Thus an object of the present invention is to generate sound relevant to a moving picture display area on the display screen when a moving picture is reproduced.

The present invention has been devised to resolve the above-mentioned problem and according to a first aspect thereof, there is provided a picture processing apparatus including: content acquisition means for acquiring content data including a moving picture and sound corresponding to the moving picture; picture conversion information supply means which, based on a first picture and a second picture making up the moving picture, supplies picture conversion information about the second picture relative to the first picture; picture conversion means for converting the second picture based on the picture conversion information with reference to the first picture; picture synthesis means for synthesizing the converted second picture and a background picture serving as a background of the second picture into a synthesized picture; display control means for causing display means to display the synthesized picture; sound conversion information calculation means for calculating sound conversion information about the sound regarding the second picture based on the picture conversion information; sound conversion processing means for generating output sound by performing a conversion process on the sound based on the sound conversion information; and sound output control means for causing sound output means to output the output sound. With regard to the picture converted on the basis of the picture conversion information, this apparatus provides the effect of having the sound converted and output in accordance with the area in which the picture is displayed.

Also according to the first aspect of the present invention, the picture conversion information may include elements regarding a movement of the second picture relative to the first picture. This structure provides the effect of having the sound converted in accordance with the movement of the picture.

Also according to the first aspect of the present invention, the picture conversion information may include elements regarding a rotation of the second picture relative to the first picture. This structure provides the effect of having the sound processed in accordance with the rotation of the picture.

Also according to the first aspect of the present invention, the picture conversion information may include elements regarding a scaling factor of the second picture relative to the first picture. This structure provides the effect of having the sound processed in accordance with the scaling factor of the picture.

Also according to the first aspect of the present invention, the sound conversion processing means may include volume control means and sound addition means; the volume control means may control the volumes of a plurality of channels making up the sound based on the sound conversion information; and the sound addition means may add up the controlled sound for each of the channels. This structure provides the effect of having the sound on the plurality of channels converted.

Also according to the first aspect of the present invention, the sound conversion processing means may generate sound on a right channel and a left channel making up the output sound through the conversion process. This structure provides the effect of having the sound on the right and left channels generated.

Also according to the first aspect of the present invention, the sound conversion processing means may generate sound on a center channel making up the output sound through the conversion process. This structure provides the effect of having the sound on the center channel generated.

Also according to the first aspect of the present invention, the sound may include the sound on a right channel and a left channel; and the sound conversion processing means may generate the output sound by performing the sound process on the sound on the right channel and the left channel. This structure provides the effect of having the output sound generated by performing the conversion process on the input sound on the right and left channels.

Also according to the first aspect of the present invention, the sound may include the sound on a center channel; and the sound conversion processing means may generate the output sound by performing the conversion process on the sound on the center channel. This structure provides the effect of having the output sound generated by performing the conversion process on the input sound on the center channel.

Also according to the first aspect of the present invention, picture holding means may be further included to hold pictures including the first picture as historical pictures; wherein the first picture may be positioned chronologically before the second picture in a timeline of the moving picture; wherein the picture conversion means may convert at least either the second picture or the historical pictures held in the picture holding means based on the picture conversion information; and wherein the picture synthesis means may synthesize the second picture and the historical pictures at least either of which have been converted, into the synthesized picture and may cause the picture holding means to hold the synthesized picture as a new historical picture. This structure provides the effect of having a series of converted pictures from the pictures that make up the moving picture synthesized into a synthesized picture to be displayed. In this case, display area extraction means may be further included to determine a display area targeted for display on the display means from the new historical picture held in the picture holding means, before extracting the picture included in the display area as a display picture; wherein the picture synthesis means may overwrite the display picture with the converted second picture to obtain a new display picture by synthesis; wherein the display control means may cause the display means to display the new display picture; wherein the display area extraction means may generate display area extraction information about the position, angle, or size of the display area in a holding area of the picture holding means; and wherein the sound conversion information calculation means may calculate the sound conversion information based on the picture conversion information and the display area extraction information. This structure provides the effect of having the current picture displayed in a manner accommodated within the area of the display screen.

Also according to the first aspect of the present invention, the picture conversion means may convert the second picture based on template information indicating a display area in which to display the moving picture on the display means. This structure provides the effect of having the picture converted based on the template information.

According to a second aspect of the present invention, there is provided a sound conversion processing method for use with a picture processing apparatus having sound output means for outputting sound corresponding to a moving picture, the sound conversion processing method including: a content acquisition step of acquiring content data including the moving picture and the sound; a picture conversion information supply step which, based on a first picture and a second picture making up the moving picture, supplies picture conversion information about the second picture relative to the first picture; a picture conversion step of converting the second picture based on the picture conversion information with reference to the first picture; a sound conversion information calculation step of calculating sound conversion information about the sound based on the picture conversion information; a sound conversion processing step of generating output sound by performing a conversion process on the sound based on the sound conversion information; and a sound output control step of causing the sound output means to output the output sound; or a program for causing a computer to execute these steps. With regard to the picture converted on the basis of the picture conversion information, this method or program provides the effect of having the sound converted and output in accordance with the area in which the picture is displayed.

The present invention thus provides the advantageous effects of having the sound generated in a manner appropriate to the moving picture display area on the display screen when a moving picture is reproduced therein.

BRIEF DESCRIPTION OF DRAWINGS

FIG. 1 is a block diagram showing a typical functional structure of a picture processing apparatus 100 as an embodiment of the present invention.
[FIG. 2]
FIG. 2 is views showing typical pictures corresponding to frames making up a moving picture.
FIG. 3 is views showing simplified pictures with no background or the like which are derived from pictures corresponding to frames making up a moving picture.
FIG. 4 is a flowchart showing the steps constituting an affine transformation parameter detection process performed by the picture processing apparatus 100 as the embodiment of the present invention.
[FIG. 5]
FIG. 5 is views showing a typical transition of a moving picture taken by an imaging apparatus.
[FIG. 6]
FIG. 6 is views which indicate by broken lines pictures corresponding to the preceding frames of the pictures in FIG. 5 and which also show typical optical flows that have been detected.
FIG. 7 is views showing typical displays given when a moving picture including pictures 401 through 403 in FIG. 5 is reproduced.
FIG. 8 is views showing typical displays given when the moving picture including the pictures 401 through 403 in FIG. 5 is reproduced.
[FIG. 9]
FIG. 9 is views showing a typical transition of a moving picture taken by the imaging apparatus.
[FIG. 10]
FIG. 10 is views which indicate by broken lines pictures corresponding to the preceding frames of the pictures in FIG. 9 and which also show typical optical flows that have been detected.
[FIG. 11]
FIG. 11 is views showing typical displays given when a moving picture including pictures 421 through 423 in FIG. 9 is reproduced.
[FIG. 12]
FIG. 12 is views showing typical displays given when the moving picture including the pictures 421 through 423 in FIG. 9 is reproduced.
[FIG. 13]
FIG. 13 is views showing a typical transition of a moving picture taken by the imaging apparatus.

[FIG. 14]

FIG. 14 is views which indicate by broken lines pictures corresponding to the preceding frames of the pictures in FIG. 13 and which also show typical optical flows that have been detected.

FIG. 15 is views showing typical displays given when a moving picture including pictures 441 through 443 in FIG. 13 is reproduced.

[FIG. 16]

FIG. 16 is views showing typical displays given when the moving picture including the pictures 441 through 443 in FIG. 13 is reproduced.

FIG. 17 is a block diagram showing a typical structure of a sound conversion processing section 200 in the embodiment of the present invention.

[FIG. 18]

FIG. 18 is views outlining an example in which a moving picture that was taken is reproduced conventionally.

FIG. 19 is a view outlining an example of reproduction performed by the picture processing apparatus 100 as the embodiment of the present invention.

FIG. 20 is a block diagram showing a coordinate system of a display screen on a display section 180 in the embodiment of the present invention.

[FIG. 21]

FIG. 21 is graphic representations showing typical relations between output sound and the center position of a picture corresponding to the current frame according to the embodiment of the present invention.

[FIG. 22]

FIG. 22 is views showing typical relations between an imaging apparatus 500 and an object being pictured.

FIG. 23 is views outlining examples of reproduction performed by the picture processing apparatus 100 as the embodiment of the present invention.

[FIG. 24]

FIG. 24 is graphic representations showing typical relations between output sound and the angle of the picture corresponding to the current frame according to the embodiment of the present invention.

FIG. 25 is views outlining examples of reproduction performed by the picture processing apparatus 100 as the embodiment of the present invention.

[FIG. 26]

FIG. 26 is graphic representations showing typical relations between output sound and the scaling factor of the picture corresponding to the current frame according to the embodiment of the present invention.

FIG. 27 is a flowchart showing the steps constituting a moving picture reproduction process performed by the picture processing apparatus 100 as the embodiment of the present invention.

FIG. 28 is a flowchart showing the steps constituting a sound conversion process (i.e., procedure in step S950) performed by the picture processing apparatus 100 as the embodiment of the present invention.

FIG. 29 is a block diagram showing a typical functional structure of a picture processing apparatus 650 as an embodiment the present invention.

[FIG. 30]

FIG. 30 is views schematically showing files recorded in a moving picture storage section 240 and in a metadata storage section 250 in the embodiment of the present invention.

FIG. 31 is a block diagram showing a typical functional structure of a picture processing apparatus 680 as an embodiment of the present invention.

[FIG. 32]

FIG. 32 is views schematically showing relations between a display area and frames of a moving picture stored in the moving picture storage section 240 in the embodiment of the present invention.

[FIG. 33]

FIG. 33 is views schematically showing the process of moving the display area when the picture corresponding to the current frame extends off the display area.

FIG. 34 is views showing examples of transition effected when the display area is moved by the movement process shown in FIG. 33.

FIG. 35 is views schematically showing relations between the display area and frames of a moving picture file stored in the moving picture storage section 240 in the embodiment of the present invention.

FIG. 36 is views outlining a method which, when a display mode is designated in which to fix the picture corresponding to the current frame on the display section 180, involves enlarging a moving picture displayed on the display section 180.

FIG. 37 is views schematically showing a flow of frames from a moving picture file stored in the moving picture storage section 240 in the embodiment of the present invention.

FIG. 38 is views schematically showing a flow of frames from a moving picture file stored in the moving picture storage section 240 in the embodiment of the present invention.

FIG. 39 is a flowchart showing the steps constituting a moving picture reproduction process performed by the picture processing apparatus 650 as the embodiment of the present invention.

FIG. 40 is a flowchart showing the steps constituting the moving picture reproduction process performed by the picture processing apparatus 680 as the embodiment of the present invention.

FIG. 41 is a flowchart showing the exemplary steps constituting a sound conversion process (i.e., procedure in step S980) performed by the picture processing apparatus 680 as the embodiment of the present invention.

FIG. 42 is a block diagram showing a typical functional structure of a picture processing apparatus 740 as an embodiment of the present invention.

FIG. 43 is a view schematically showing files recorded in the moving picture storage section 240 and in a relative relation information storage section 290 in the embodiment of the present invention.

FIG. 44 is views schematically showing examples of synthesizing two moving pictures.

FIG. 45 is a block diagram showing a typical structure of the sound conversion processing section 200 in the picture processing apparatus 740 as the embodiment of the present invention.

FIG. 46 is a view showing an example of the sound conversion process performed when two moving pictures are reproduced simultaneously by the picture processing apparatus 740 as the embodiment of the present invention.

[FIG. 47]

FIG. 47 is views showing examples of the process of converting sound in accordance with information other than motion information about a moving picture according to the embodiment of the present invention.

FIG. 48 is a block diagram showing a typical functional structure of a camera work detection section 480 in the embodiment of the present invention.

FIG. 49 is a view showing a typical structure of a multi-core processor 800 in the embodiment of the present invention.

FIG. 50 is a view showing a typical structure of a control processor core 801 in the embodiment of the present invention.

FIG. 51 is a view showing a typical structure of an arithmetic processor core (#1) 811 in the embodiment of the present invention.

FIG. 52 is a view schematically showing a computing method of the multi-core processor 800 in the embodiment of the present invention.

FIG. 53 is a view schematically showing flows of programs and data in effect when the multi-core processor 800 in the embodiment of the present invention performs operations.

[FIG. 54]

FIG. 54 is views schematically outlining a computing method whereby processes are performed on a plurality of data items using instructions specific to such processes, as compared with SIMD computations whereby processes are carried out on a plurality of data items using a single instruction.

FIG. 55 is a view showing a typical structure of programs executed by either the control processor core 801 or the arithmetic processor core (#1) 811 in the embodiment of the present invention.

[FIG. 56]

FIG. 56 is a view schematically outlining a structure of data and a flow of processes in effect when picture data stored in a main memory 781 in the embodiment of the present invention is subjected to a filtering process using a Sobel filter 830.

FIG. 57 is a view schematically outlining a flow of data in effect when picture data stored in the main memory 781 in the embodiment of the present invention is subjected to SIMD computations using the Sobel filter 830.

[FIG. 58]

FIG. 58 is a view schematically outlining a vector creation method whereby nine vectors are created from picture data stored in a first buffer 831 when a filtering process is performed using the Sobel filter 830 in the embodiment of the present invention.

[FIG. 59]

FIG. 59 is a view schematically outlining a vector operation method whereby vector operations are performed on vector data 841 through 849 using a SIMD instruction when a filtering process is carried out using the Sobel filter 830 in the embodiment of the present invention.

FIG. 60 is a view chronologically outlining a flow of a camera work parameter calculation process according to the embodiment of the present invention.

FIG. 61 is views schematically showing a Blu-ray disk 880 as a typical recording medium, data 881 through 884 recorded on the Blu-ray disk 880, and an internal structure of a Blu-ray player 890 capable of reproducing the Blu-ray disk 880.

BEST MODE FOR CARRYING OUT THE INVENTION

Some embodiments of the present invention will be described hereunder in detail with reference to the accompanying drawings.

Figure 1:
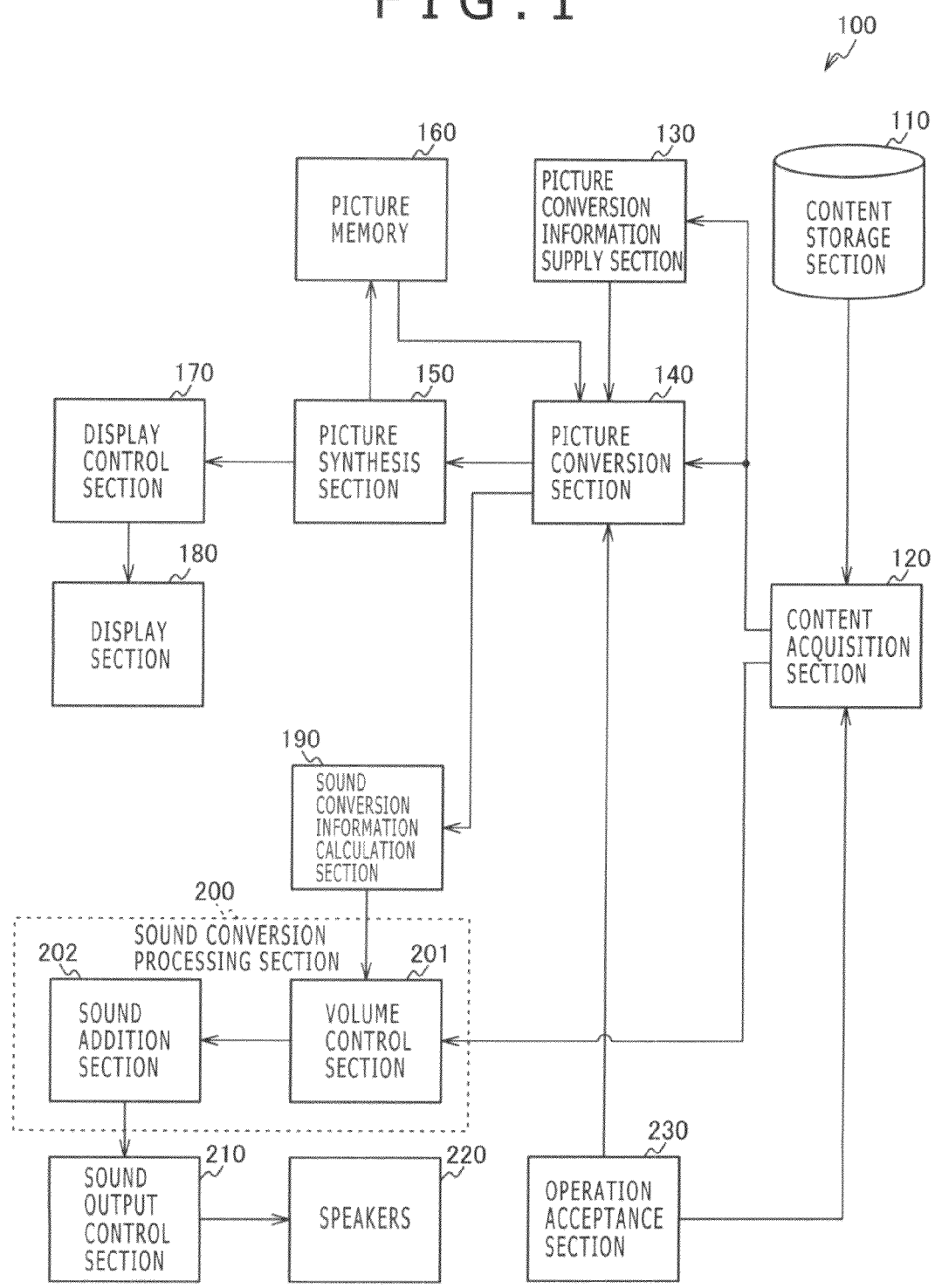
[FIG. 1]

FIG. 1 is a block diagram showing a typical functional structure of a picture processing apparatus 100 embodying the present invention. The picture processing apparatus 100 is made up of a content storage section 110, a content acquisition section 120, a picture conversion information supply section 130, a picture conversion section 140, a picture synthesis section 150, a picture memory 160, a display control section 170, a display section 180, a sound conversion information calculation section 190, a sound conversion processing section 200, a sound output control section 210, speakers 220, and an operation acceptance section 230. Illustratively, the picture processing apparatus 100 may be implemented by a personal computer which can extract, through picture analysis, feature quantities from a moving picture taken by an imaging apparatus such as a digital video camera and which can perform various picture processes using the extracted feature quantities.

The content storage section 110 stores content files each including a moving picture and sound corresponding to the moving picture. And the content storage section 110 supplies a content file to the content acquisition section 120 upon request by the content acquisition section 120.

The content acquisition section 120 acquires content files from the content storage section 110 in accordance with the operations input through the operation acceptance section 230 for content acquisition. The content acquisition section 120 outputs a moving picture from the acquired content file to the picture conversion information supply section 130 and picture conversion section 140. Also, the content acquisition section 120 outputs to the sound conversion processing section 200 the sound corresponding to the moving picture out of the acquired content file.

The picture conversion information supply section 130 detects motion information by analyzing the moving picture output by the content acquisition section 120, and calculates affine transformation parameters based on the motion information. That is, the picture conversion information supply section 130 extracts feature points from each of the pictures making up the moving picture, extracts optical flows (motion vectors) from the feature points, analyzes the optical flows of the extracted feature points to select the feature points manifesting a dominant movement, and estimates the movement of the imaging apparatus based on the optical flows regarding the feature points representing the dominant movement. The dominant movement in this context refers to a regular movement indicated by a relatively large number of optical flows from among those regarding a plurality of feature points. And the picture conversion information supply section 130 supplies the affine transformation parameters to the picture conversion section 140.

Given the pictures making up the moving picture output by the content acquisition section 120, as well as the pictures held in the picture memory 160, the picture conversion section 140 performs affine transformations per frame with reference to the picture corresponding to the first frame and using the affine transformation parameters supplied by the picture conversion information supply section 130. Specifically, the picture conversion section 140 performs affine transformations using a matrix of affine transformation parameters obtained by multiplying the matrix of affine transformation parameters corresponding to the current frame, by the matrix of affine transformations corresponding to the frames leading up to the preceding frame. The picture conversion section 140 performs affine transformations at least on either the pictures making up the moving picture output by the content acquisition section 120, or the synthesized picture held in the picture memory 160, and outputs the transformed pictures to the picture synthesis section 150. Also, with reference to the picture corresponding to the first frame in the picture memory 160 and based on the affine transformation parameters obtained by the above multiplication, the picture conversion section 140 calculates the center position, angle, and scaling factor of the picture corresponding to the current frame and outputs the results to the sound conversion information calculation section 190. In the ensuing description, the information about the picture corresponding to the first frame will be explained as reference information. The reference information indicates the center position, angle, and size of the picture corresponding to the first frame in the picture memory 160, and is held in the picture conversion section 140.

Specifically, when reproducing and displaying a moving picture by fixing a synthesized picture obtained by synthesizing the pictures corresponding to the frames preceding the current frame, the picture conversion section 140 performs affine transformations on the picture corresponding to the current frame output by the content acquisition section 120 through the use of the affine transformation parameters supplied by the picture conversion information supply section 130. And the picture conversion section 140 outputs the picture held in the picture memory 160 as well as the transformed picture corresponding to the current frame. In this case, the picture conversion section 140 outputs to the sound conversion information calculation section 190 the center position and angle, other than the scaling factor, of the picture corresponding to the current frame. Meanwhile, when reproducing and displaying the moving picture by fixing the picture corresponding to the current frame, the picture conversion section 140 performs affine transformations on the synthesized picture held in the picture memory 160 using the affine transformation parameters supplied by the picture conversion information supply section 130, in the reverse direction of the affine transformation parameters. And the picture conversion section 140 outputs to the picture synthesis section 150 the picture corresponding to the current frame and the synthesized picture transformed in the reverse direction. In this case, the picture conversion section 140 outputs only the scaling factor of the picture corresponding to the current frame to the sound conversion information calculation section 190. Also, when reproducing and displaying the moving picture by fixing the scaling factor of the picture corresponding to the current frame, the picture conversion section 140 separates the affine transformation parameters supplied by the picture conversion information supply section 130 into the elements related to the scaling factor (i.e., zoom components) and the elements other than those of the scaling factor (i.e., elements related to movement or rotation). Using the scale-up/down elements, the picture conversion section 140 performs affine transformations on the synthesized picture corresponding to the frames preceding the current frame and held in the picture memory 160, in the reverse direction of the affine transformation parameters. The picture conversion section 140 also performs affine transformations on the picture corresponding to the current frame and output by the content acquisition section 120, using the elements related to movement or rotation. And the picture conversion section 140 outputs the two transformed pictures to the picture synthesis section 150. In this case, the picture conversion section 140 outputs the center position, angle, and scaling factor of the picture corresponding to the current frame to the sound conversion information calculation section 190.

The above transformations are performed in accordance with the operations input through the operation acceptance section 230 as instructions for reproduction. Whereas the above example showed that the picture conversion section 140 calculates the center position, angle, and scaling factor of the picture corresponding to the current frame in accordance with the operations input through the operation acceptance section 230 as instructions for reproduction and that the calculated information is output to the sound conversion information calculation section 190, the sound conversion information calculation section 190 may alternatively calculate the center position, angle, and scaling factor of the picture corresponding to the current frame using the reference information output by the picture conversion section 140 and the affine transformation parameters obtained by multiplication. Furthermore, instead of outputting to the sound conversion information calculation section 190 the center position, angle, and size of the picture corresponding to the first frame in the picture memory 160, the picture conversion section 140 may alternatively output the center position, angle, and size of the picture corresponding to the frame preceding the current frame. In this case, using the center position, angle, and size of the picture corresponding to the frame preceding the current frame in place of reference information, the sound conversion information calculation section 190 calculates the center position, angle, and scaling factor of the picture corresponding to the current frame on the basis of the affine transformation parameters corresponding to the current frame. It is also possible to make the similar calculations of the picture corresponding to the frame occurring a predetermined number of frames earlier than the current frame using the center position, angle, and size of the picture corresponding to that frame occurring the predetermined number of frames earlier and on the basis of the affine transformation parameters corresponding to the frames leading up to the frame occurring the predetermined number of frames earlier than the current frame.

The picture synthesis section 150 receives from the picture conversion section 140 the pictures making up the moving picture and output by the content acquisition section 120 as well as the synthesized picture held in the picture memory 160, and synthesizes the received pictures. The picture synthesis section 150 causes the picture memory 160 to hold the synthesized picture and outputs the synthesized picture to the display control section 170. Although the example cited herein involves getting the picture synthesis section 150 to cause the picture memory 160 to hold the synthesized picture, a predetermined picture may alternatively be held in the picture memory 160 instead of having the synthesized picture held in the picture memory 160. For example, suppose that the predetermined picture is a picture of a park and that the moving picture to be synthesized with the picture of the park is one which shows children taking a walk. In this case, the picture of the park may be held in the picture memory 160 and the moving picture may be synthesized with that picture through affine transformation. This makes it possible to display a moving picture virtually showing the children walking in the park.

The picture memory 160 is a work buffer that holds the synthesized picture synthesized by the picture synthesis section 150. The picture memory 160 supplies the synthesized picture held therein to the picture conversion section 140.

The display control section 170 causes the display section 180 to display per frame the synthesized picture synthesized by the picture synthesis section 150.

Under control of the display control section 170, the display section 180 displays the synthesized picture synthesized by the picture synthesis section 150. For example, the display section 180 may be implemented in the form of a display of a personal computer or a TV display.

The sound conversion information calculation section 190 calculates sound conversion information based on the center position, angle, or scaling factor of the picture corresponding to the current frame and obtained by the picture conversion section 140 using affine transformation parameters and reference information. The sound conversion information in this context refers to information for converting the sound output by the content acquisition section 120. The sound conversion information calculation section 190 outputs the calculated sound conversion information to the sound conversion processing section 200.

The sound conversion processing section 200 generates output sound by converting the sound output by the content acquisition section 120 based on the sound conversion information calculated by the sound conversion information calculation section 190. The sound conversion processing section 200 outputs the generated output sound to the sound output control section 210. The sound conversion processing section 200 includes a volume control section 201 and a sound addition section 202. The volume control section 201 controls the volumes of a plurality of channels constituting the sound output by the content acquisition section 120 on the basis of the sound conversion information calculated by the sound conversion information calculation section 190. The volume control section 201 outputs the controlled volumes of the plurality of channels to the sound addition section 202. The sound addition section 202 adds up per channel the volumes controlled by the volume control section 201. The sound addition section 202 outputs to the sound output control section 210 the added sound as the output sound.

The sound output control section 210 causes the speakers 220 to output the output sound generated by the sound conversion processing section 200.

Under control of the sound output control section 210, the speakers 220 output the output sound generated by the sound conversion processing section 200. Also, the speakers 200 make up a speaker system constituted by a plurality of speakers.

The operation acceptance section 230 has various operation keys. Upon accepting the operations input through these keys, the operation acceptance section 230 outputs what is contained in the accepted operations to the content acquisition section 120 or picture conversion section 140. The operation acceptance section 230 has a setting key illustratively for setting a display mode in which to reproduce moving pictures. The display mode may be a mode in which to display a synthesized picture obtained by performing affine transformations on the picture corresponding to the current frame and by synthesizing the transformed picture with the synthesized pictures corresponding to the preceding frames; a display mode in which to display a synthesized picture obtained by synthesizing the picture corresponding to the current frame with the synthesized pictures which correspond to the preceding frames and which have been subjected to affine transformations in the reverse direction of affine transformation parameters; or a display mode in which to reproduce and display a moving picture by fixing the display scaling factor of the picture corresponding to the current frame. Also, the operation acceptance section 230 outputs to the content acquisition section 120 what is contained in the operations input for content acquisition purposes.

It was explained illustratively with reference to FIG. 1 how the picture conversion information supply section 130 typically calculates affine transformation parameters. Alternatively, a moving picture associated with affine transformation parameters may be stored in the content storage section 110. The moving picture may then be acquired by the content acquisition section 120 and output to the picture conversion information supply section 130, and the affine transformation parameters associated with the moving picture may be extracted by the picture conversion information supply section 130 and output to the picture conversion section 140.

Described below in detail with reference to the drawings is a detection method for detecting the affine transformation parameters used for picture conversion.

Figure 3:
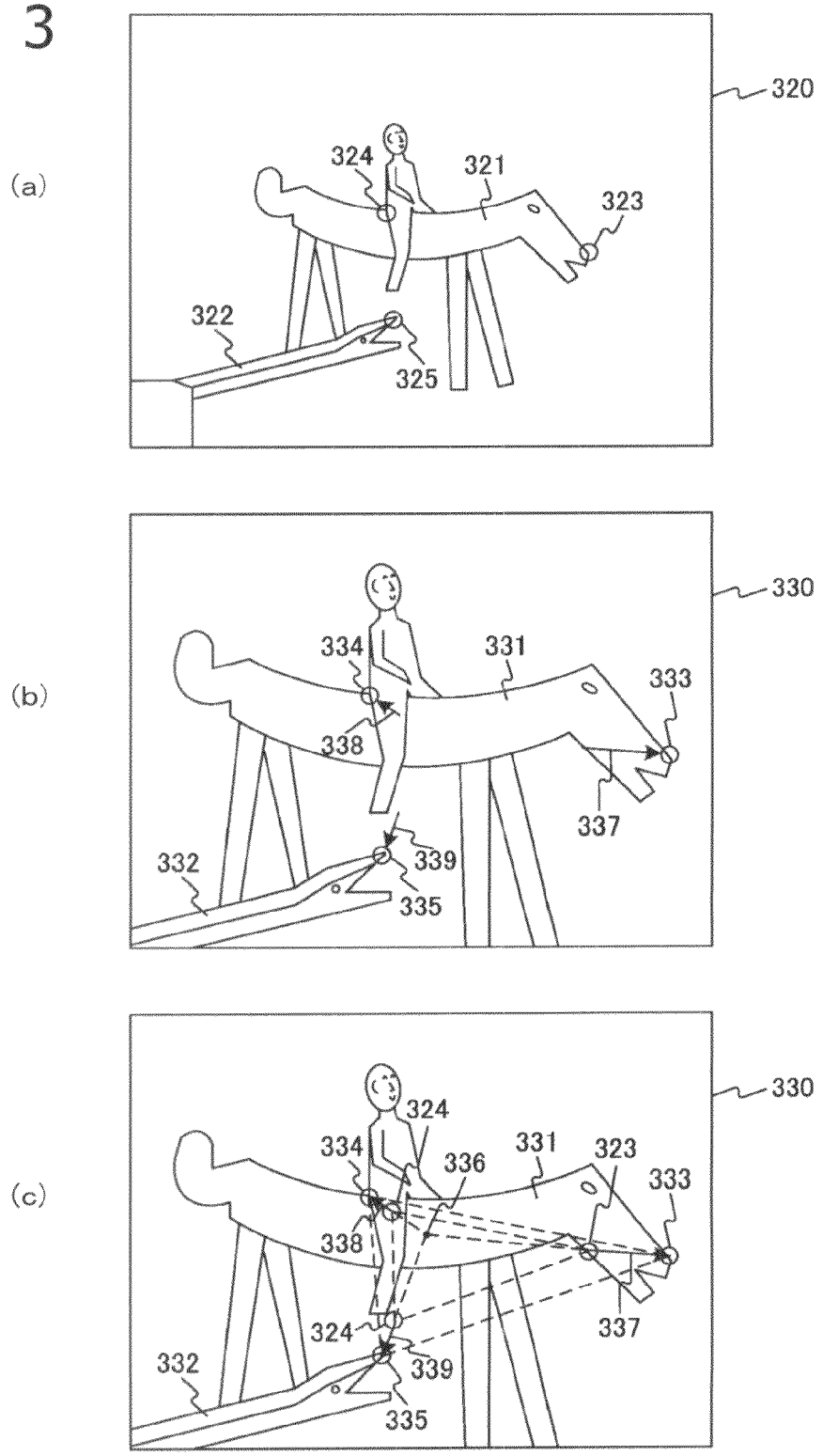
[FIG. 3]

FIGS. 2(*a*) through (*c*) are views showing typical pictures corresponding to frames making up a moving picture. FIG. 3(*a*) is a view showing a simplified picture with no background or the like corresponding to the frame preceding the frame corresponding to a picture 300 indicated in FIG. 2. And FIGS. 3(*b*) and (*c*) are views showing simplified pictures with no background or the like which correspond to the picture 300 of FIG. 2.

The pictures 300, 320 and 330 shown in FIGS. 2 and 3 include statues of a horse 301, 321 and 331 mounted by a person, and statues of a snake 302, 322 and 332 in the foreground of the statues of the horse 301, 321 and 331. And as shown in FIG. 2, flags and chairs are found in the background of these statues, with the flags fluttering in the wind.

The picture 320 shown in FIG. 3(*a*) is a simplified picture derived from the picture corresponding to the frame preceding the frames corresponding to the pictures 300 and 330 indicated in FIGS. 2(*a*) through (*c*), and FIGS. 3(*b*) and (*c*). The pictures 320 and 330 corresponding to two consecutive frames indicate a transition of an object growing progressively in size within the screen. That is, when these pictures were taken, a zoom-in operation was performed to zoom in on the object within the screen.

The embodiment of the present invention is explained illustratively by citing methods for calculating affine transformation parameters using optical flows corresponding to the feature points that have been detected from the pictures making up a moving picture. This example will be explained using corner points as the feature points.

Explained hereunder with reference to FIGS. 3(a) through (c) is a method for calculating affine transformation parameters using the optical flows corresponding to three corner points detected from the pictures 320 and 330.

For example, suppose that in the picture 320 of FIG. 3(a), the detected feature points are a corner point 323 near the mouth of the horse statue 321, a corner point 324 near the hips of the person riding the horse statue 321, and a corner point 325 near the mouth of the snake statue 322. In this case, in the picture 330 of FIG. 3(b), optical flows 337, 338 and 339 corresponding to the corner points 323, 324 and 325 in the picture 320 are detected using the gradient method, block matching method or the like. And on the basis of the detected optical flows 337, 338 and 339, corner points 333, 334 and 335 corresponding to the corner points 323, 324 and 325 in the picture 320 are detected.

In this case, the horse statues 321 and 331 and the snake statues 322 and 332 included in the pictures 320 and 330 of FIGS. 3(a) and (b) are placed illustratively on the ground and thus do not move irrespective of the motions of the imaging apparatus. For this reason, the movement of the imaging apparatus is estimated accurately based on the optical flows obtained with regard to the corner points detected from the horse statues 321 and 331 and snake statues 322 and 332. For example, as shown in FIG. 3(c), it is possible to estimate that the picture 330 has been enlarged starting from the picture 320 centering on a point 336 on the basis of the three optical flows 337 through 339 detected in the picture 330. This makes it possible to determine that the movement of the imaging apparatus upon taking the picture 330 was a zoom-in operation centering on the point 336. In this manner, corner points are detected from objects that do not move irrespective of the motions of the imaging apparatus. On the basis of the optical flows obtained with regard to these corner points, it is possible to detect precisely the movement of certain regularity of the imaging apparatus. Thus affine transformation parameters can be calculated using the optical flows obtained relative to these corner points.

However, pictures could conceivably include, like flags fluttering in the wind, objects that move irrespective of the motions of the imaging apparatus. For example, the picture 300 shown in FIG. 2 includes the flags fluttering in the wind. If corner points are detected from such objects moving regardless of the motions of the imaging apparatus and if optical flows are obtained from these corner points and used to estimate the movement of the imaging apparatus, it is impossible to estimate the movement of the imaging apparatus accurately.

Illustratively, the optical flows detected in the picture 300 shown in FIG. 2(b) are indicated by arrows, and the corner points detected from these optical flows are indicated by hollow circles at the tips of the arrows. Corner points 303 through 305 here correspond to the corner points 333 through 335 shown in FIGS. 3(b) and (c). And corner points 306 through 311 are the corner points detected from the flags in the background of the horse statue 301. Because these flags are fluttering in the wind, the movements of the flags under the influence of the wind are detected as optical flows. That is, the optical flows corresponding to the corner points 306 through 311 have been detected from the flags moving regardless of the movement of the imaging apparatus. For this reason, if the three optical flows used to calculate affine transformation parameters include an optical flow corresponding to at least one of the corner points 306 through 311, then the accurate movement of the imaging apparatus cannot be detected. In this case, it is impossible to calculate accurate affine transformation parameters.

As described above, it might happen that from the pictures having been taken, there are detected optical flows corresponding to objects moving regardless of the movement of the imaging apparatus (i.e., optical flows corresponding to the corner points 306 through 311 shown in FIG. 2(b)), and optical flows having certain regularity in relation to the motion of the imaging apparatus (i.e., optical flows other than those corresponding to the corner points 306 through 311 indicated in FIG. 2(b)).

Thus with regard to the embodiment of the present invention, it will be explained that an affine transformation parameter calculation process is performed a plurality of times to calculate a plurality of affine transformation parameters based on three optical flows and that an optimal affine transformation parameter is selected from the multiple affine transformation parameters thus obtained. For this example, it is assumed that moving objects included in the pictures making up the moving picture have relatively small areas compared with the areas of the pictures.

Below is a brief explanation of affine transformation. If, in a two-dimensional space, the position before movement is defined as (x, y) and the destination position after movement following an affine transformation is defined as (x', y'), then the determinant of the affine transformation is given by the following expression 1:

[Expression 1]

$$(x'\ y'\ 1) = (x\ y\ 1)\begin{pmatrix} a & d & 0 \\ b & e & 0 \\ c & f & 1 \end{pmatrix}$$ (Expression 1)

where, "a" through "f" stand for affine transformation parameters. An affine transformation matrix AM made up of these affine transformation parameters is defined by an expression shown below. In this case, an X-direction zoom component XZ, a Y-direction zoom component YZ, an X-direction translation component XT, a Y-direction translation component YT, and a rotation component R are obtained by other expressions shown below. In the case of a unit matrix, a=e=1 and b=c=d=f=0.

$$AM = \begin{pmatrix} a & b & c \\ d & e & f \end{pmatrix}$$ [Expression 2]

$$XZ = \sqrt{a^2 + d^2} \quad YZ = \sqrt{b^2 + e^2}$$
$$XT = c \quad YT = f$$
$$R = \tan^{-1}\left(\frac{d}{a}\right)$$

A method for calculating affine transformation parameters is explained below.

First, three feature points are selected from the feature points by which optical flows have been detected in the picture corresponding to the current frame which is one of the frames making up a moving picture. For example, from the corner points detected in the picture 300 of FIG. 2(b) (indicated by hollow circles), three corner points are randomly selected. If projective transformation parameters are used as affine transformation parameters, then four feature points are randomly selected.

Then, affine transformation parameters are calculated using three optical flows corresponding to the three selected feature points. For example, affine transformation parameters are calculated using the optical flows (indicated by arrows tipped with hollow circles) corresponding to the three corner points selected from the corner points (indicated by hollow circles) in the picture 300 of FIG. 2(b). The affine transformation parameters may be obtained using the expression 1.

Then based on the affine transformation parameters obtained above, scores of the parameters are calculated. Specifically, the obtained affine transformation parameters are used to find the positions after movement of all feature points in the picture corresponding to the frame preceding the current frame. And through comparisons between the positions of the feature points obtained using the affine transformation parameters on the one hand, and the positions of the feature points detected in the current frame on the other hand, a difference value for each feature point is calculated between the positions of two corresponding feature points. The absolute distance between two corresponding positions of feature points is calculated illustratively as the different value. Thereafter, the calculated different values are compared with a predetermined threshold value for each feature point to find the number of the feature points whose different values are smaller than the threshold value, the number being regarded as a score. In this manner, three feature points are randomly selected from the feature points by which optical flows have been detected. On the basis of the optical flows corresponding to the selected feature points, the process of calculating an affine transformation parameter score is repeated a predetermined number of times in order to calculate a plurality of affine transformation parameter scores. The predetermined number of times may be either fixed to a predetermine value or determined illustratively in accordance with the type of pictures to be compared and the throughput of the picture processing apparatus 100. For example, the predetermined process repeat count may be about 20 with the throughput of the picture processing apparatus 100 taken into consideration.

For example, suppose the case where three corner points other than the corner points 306 through 311 are selected from the corner points detected in the picture 300 of FIG. 2(b). Affine transformation parameters are then calculated using three optical flows corresponding to the three selected corner points. Because the three optical flows have certain regularity as mentioned above, it is possible to obtain affine transformation parameters such as to transform according to certain rules the picture corresponding to the preceding frame. For this reason, of the difference values between the positions of the corner points obtained using the affine transformation parameters on the one hand, and the positions of the corner points detected from the current frame on the other hand, the difference values obtained regarding the corner points other than the corner points 306 through 311 are relatively small. As a result, the scores of the affine transformation parameters tend to be large.

Meanwhile, suppose the case where three corner points including at least one of the corner points 306 through 311 are selected from the corner points detected in the picture 300 of FIG. 2(b). Affine transformation parameters are then calculated using three optical flows corresponding to the three corner points thus selected. Because the three optical flows include one which does not have certain regularity as mentioned above, it is possible to obtain affine transformation parameters such as not to transform according to certain rules the picture corresponding to the preceding frame. For this reason, of the difference values between the positions of the corner points obtained using the affine transformation parameters on the one hand, and the positions of the corner points detected from the current frame on the other hand, the difference values regarding arbitrarily selected corner points are relatively large. As a result, the scores of the affine transformation parameters tend to be small.

Subsequently, from among a plurality of affine transformation parameters with their scores thus obtained, the affine transformation parameter with the largest score value is selected as a representative affine transformation parameter. The selected representative affine transformation parameter is supplied to the picture conversion section 140. This makes it possible to use an optimal affine transformation parameter when the pictures making up the moving picture are to be affine-transformed.

As described above, even if the pictures making up the moving picture include objects that move such as people, vehicles or the like (i.e., moving objects), it is possible to extract the movement of the imaging apparatus without being affected by such moving objects provided their sizes are relatively small compared with the areas of the pictures.

And by extracting the movement of the imaging apparatus, it is possible to estimate zoom-in, zoom-out, pan, tilt, rotation, or other operations deemed to be performed intentionally by the person taking pictures.

Next, explained below with reference to the drawings are the workings of the picture processing apparatus 100 as the embodiment of the present invention.

Figure 4:
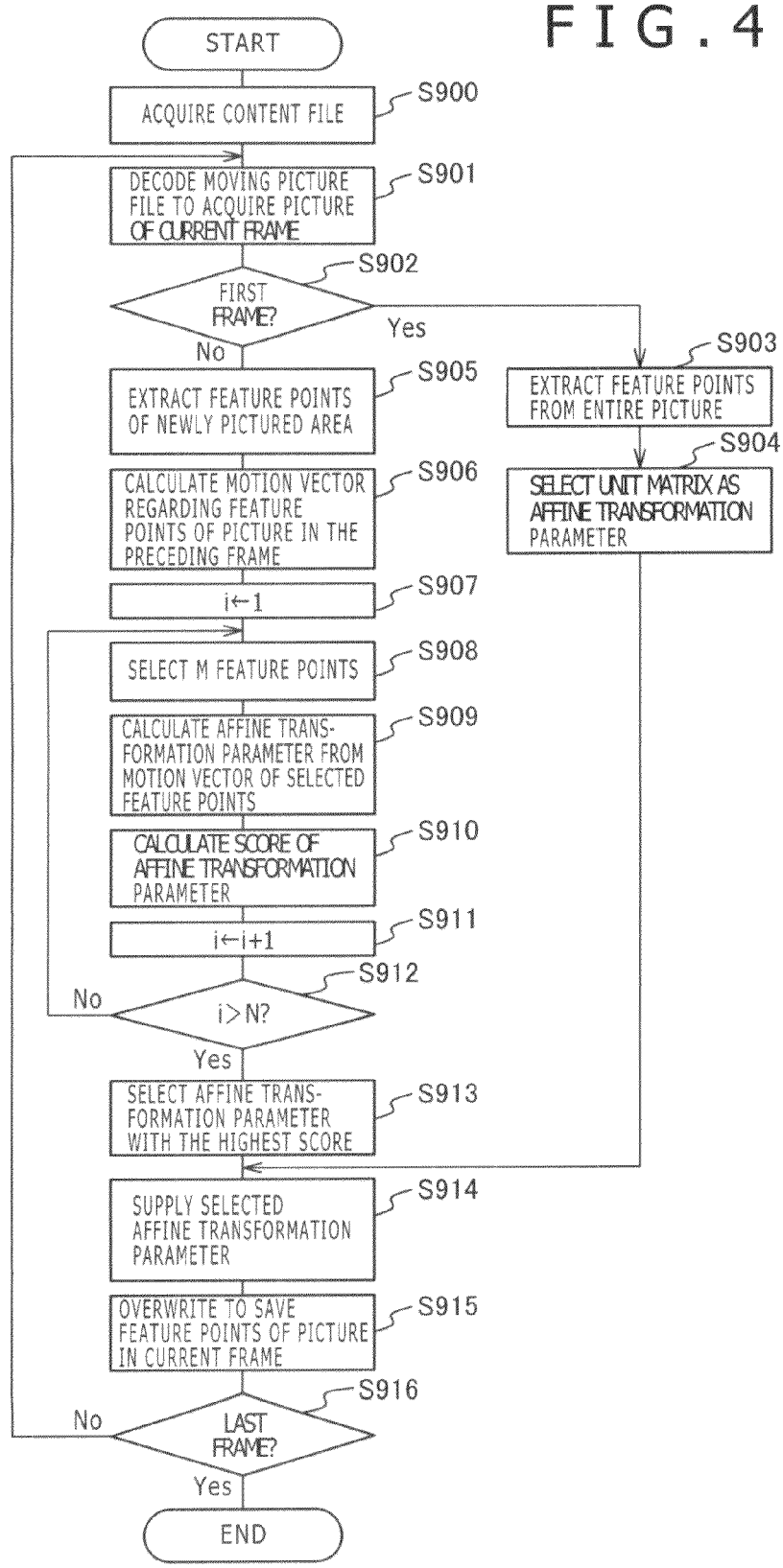
[FIG. 4]

FIG. 4 is a flowchart showing the steps constituting an affine transformation parameter detection process performed by the picture processing apparatus 100 as the embodiment of the present invention.

First, the content acquisition section 120 acquires a content file (step S900). Then the moving picture of the content file acquired by the content acquisition section 120 is decoded, and the picture of one frame is acquired chronologically (step S901). Then a check is made to determine whether the one acquired frame is the first frame of the moving picture input to the picture conversion information supply section 130 (step S902). If the one acquired frame is found to be the first frame (step S902), feature points are extracted from the entire picture corresponding to the first frame (step S903). For example, as shown in FIG. 2(b), a plurality of corner points are extracted from the picture. Then a unit matrix affine transformation parameter is selected as the affine transformation parameter (step S904), and step S914 is reached.

If the one acquired frame is not found to be the first frame (step S902), then feature points are extracted from a newly pictured area with reference to the picture corresponding to the preceding frame (step S905). That is, the feature points already extracted from the picture corresponding to the preceding frame can be obtained from the optical flows corresponding thereto, and are thus not extracted from the picture corresponding to the current frame.

Then, the optical flows corresponding to the feature points extracted from the picture corresponding to the preceding frame are calculated (step S906). That is, as shown in FIG. 2(b), the optical flows with regard to the corner points are calculated.

Then, a variable "i" is initialized to "1" (step S907). Then as many as M feature points are selected from those feature points from which the optical flows have been detected (step S908). For example, where affine transformation parameters are to be used, three feature points are randomly selected. If projective transformation parameters are to be used, then four feature points are randomly selected. Then, on the basis of M optical flows calculated corresponding to the M selected feature points, the affine transformation parameter is calculated (step S909).

Next, based on the affine transformation parameter thus calculated and obtained, the score of that affine transformation parameter is calculated (step S910). Specifically, the calculated affine transformation parameter is used to find the positions after movement of all feature points in the picture corresponding to the preceding frame. And through comparisons between the positions of the feature points obtained using the affine transformation parameter on the one hand, and the positions of the feature points in the picture corresponding to the current frame obtained when the optical flows were calculated in step S906 on the other hand, a difference value regarding each feature point is calculated between the positions of two corresponding feature points. The absolute distance between two corresponding positions is calculated illustratively as the difference value. Then the calculated difference values are compared with a predetermined threshold value for each feature point in order to find the number of the feature points whose difference values are smaller than the threshold value, the number being regarded as the score of the affine transformation parameter.

Then the variable "i" is incremented by "1" (step S911). A check is made to determine whether the variable "i" is larger than a constant N (step S912). If the variable "i" is found to be smaller than the constant N (step S912), then step S908 is reached again, and the process of calculating the score of the affine transformation parameter is repeated (steps S908 through S910). For example, the number 20 may be used as the constant N.

Meanwhile, if the variable "i" is found to be larger than the constant N (step S912), then from among the affine transformation parameters with their scores thus obtained, the affine transformation parameter with the largest score value is selected as the representative affine transformation parameter (step S913). Then the selected representative affine transformation parameter is supplied to the picture conversion section 140 (step S914). If the current frame is the first frame, the affine transformation parameter of the selected unit matrix is supplied to the picture conversion section 140. Then the picture corresponding to the current frame and the feature points of this picture are saved through overwriting (step S915).

A check is then made to determine whether the current frame is the last frame of the moving picture that was input to the picture conversion information supply section 130 (step S916). If the current frame is not found to be the last frame (step S916), then step S901 is reached again, and the affine transformation parameter detection process is repeated (steps S901 through S915). If the current frame is found to be the last frame (step S916), the affine transformation parameter detection process is brought to an end.

With the embodiment of the present invention, it was explained how the affine transformation parameter is detected based on the optical flows detected from the pictures making up the moving picture. Alternatively, the imaging apparatus may be equipped with sensors such as an acceleration sensor and a gyro sensor or with zoom buttons for making zoom operations. Such sensors or zoom buttons may be used to detect the amount of movement of the imaging apparatus upon taking pictures, and the affine transformation parameter may be calculated based on the amount of movement of the imaging apparatus. Such amounts of movement of the imaging apparatus detected upon taking pictures may be used to determine whether the affine transformation parameter obtained by the picture conversion information supply section 130 is correct. As another alternative, a plurality of affine transformation parameters may be detected beforehand by the picture conversion information supply section 130 and, based on the amount of movement of the imaging apparatus detected upon taking pictures, one of the multiple affine transformation parameters may be selected.

Explained below in detail with reference to the drawings is how a moving picture is reproduced and displayed using the above-described affine transformation parameters. It should be noted that the pictures shown in FIGS. 5 through 16 are simplified for explanation purposes and that the amount of movement between two consecutive frames is shown enlarged.

Described first is the case in which, with scaling factor kept unchanged while pictures are being taken by the imaging apparatus, the lens direction of the apparatus is moved either vertically or horizontally relative to the center constituted by the position of the apparatus.

FIG. 5 gives views showing a typical transition of a moving picture taken by the imaging apparatus. FIG. 5 contains pictures 401 through 403 corresponding to consecutive frames included in the moving picture taken of a person 400 against the background of mountains. In this example, the picture-taking person moves the lens direction of the imaging apparatus rightward and upward while taking pictures. In this case, the person 400 included in the moving picture taken by the imaging apparatus is shown moved from right to left and toward the bottom in the pictures constituting the moving picture.

FIG. 6 gives views which indicate by broken lines the pictures corresponding to the preceding frame in the pictures found in FIG. 5 and which show typical optical flows detected from the pictures. The picture 401 shown in FIG. 6(a) is the same as the picture 401 indicated in FIG. 5(a). The portions indicated by solid lines in the picture 402 of FIG. 6(b) are the same as those in the picture 402 of FIG. 5(b), and the portions indicated by broken lines in the picture 402 of FIG. 6(b) are the same as those indicated by solid lines in the picture 401 of FIG. 6(a). And arrows 404 through 406 in the picture 402 of FIG. 6(b) represent typical optical flows detected from the picture 402. Likewise, the portions indicated by solid lines in the picture 403 of FIG. 6(c) are the same as those in the picture 403 of FIG. 5(c), and the portions indicated by broken lines in the picture 403 of FIG. 6(c) are the same as those indicated by solid lines in the picture 402 of FIG. 6(b). And arrows 407 through 409 in the picture 403 of FIG. 6(c) indicate typical optical flows detected from the picture 403.

As shown in FIGS. 6(b) and (c), the person 400 in the pictures and the mountains in the background move in keeping with the movement of the imaging apparatus. It is possible to obtain the affine transformation parameter per frame based on the optical flows detected through the movement.

Figure 7:
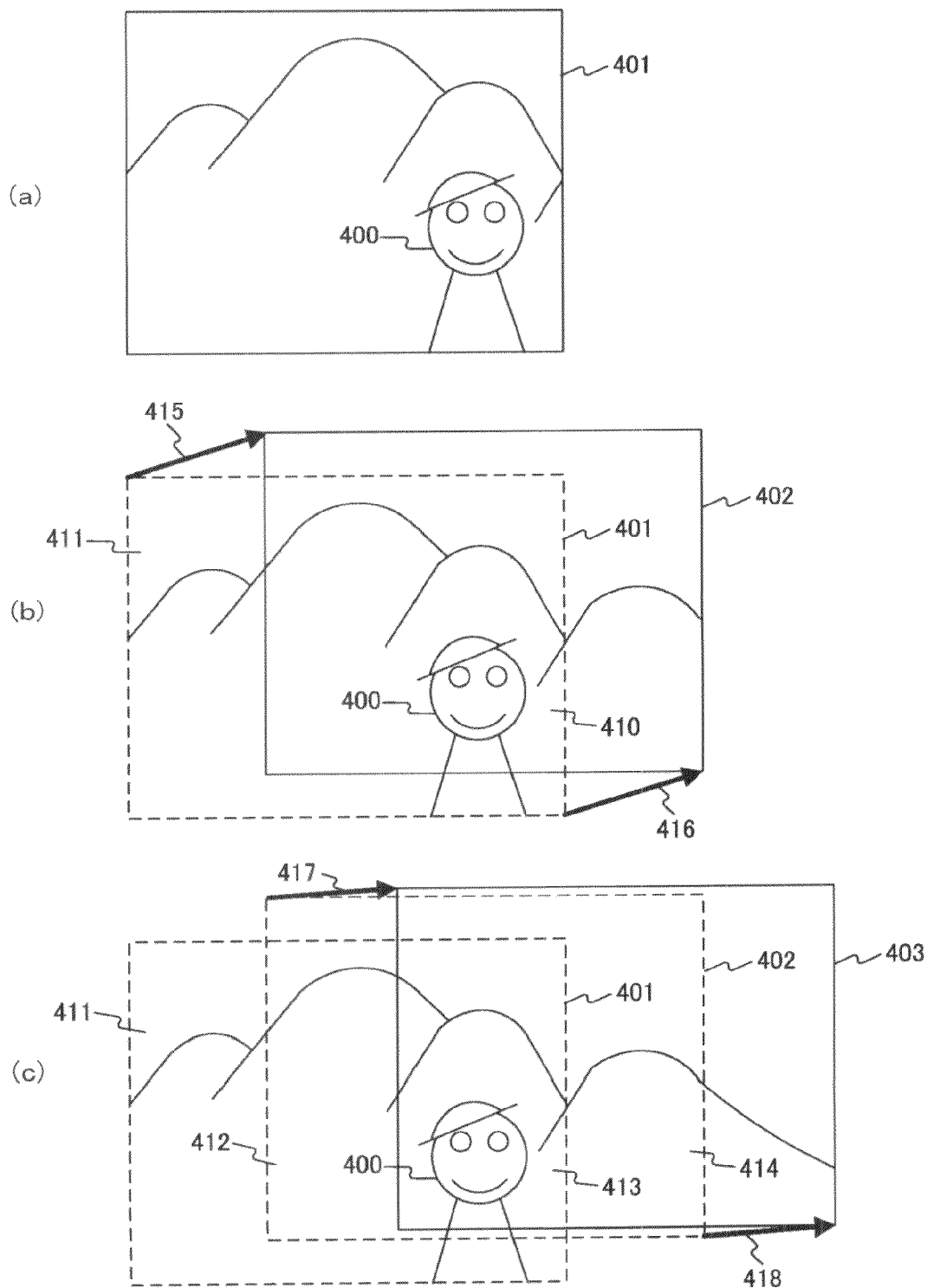
[FIG. 7]

FIG. 7 gives views of typical displays in effect when the moving picture including the pictures 401 through 403 shown in FIG. 5 is reproduced. With the embodiment of the present invention, each of the pictures making up the moving picture is synthesized. For this reason, the picture displayed on the display section 180 becomes larger with the passage of reproduction time than normal picture size. Thus the initially displayed picture appears relatively small compared with the size of the display area on the display section 180. The user may designate the size, position, etc., of the picture to be displayed first.

As shown in FIG. 7(a), only the picture 401 corresponding to the first frame is initially displayed. If a matrix of affine transformation parameters (3×3 matrix) corresponding to the picture 401 is denoted by A1, then A1 constitutes a unit matrix and thus the position and size of the picture 401 are not transformed. If the picture 402 corresponding to the next frame is displayed successively, the picture 402 is affine-transformed using the affine transformation parameter associated with that frame. Specifically, on the assumption that A2 stands for a matrix of affine transformation parameters corresponding to the picture 402 and that A1 denotes a matrix of affine transformation parameters corresponding to the picture 401, the value of "A1×A2" is obtained. With reference to the position and size of the picture 401 of the first frame, the picture 402 is affine-transformed using the matrix of "A1×A2" thus obtained. Of the pictures shown in FIG. 7(b), the picture 402 is transformed only in position. And the picture 401 corresponding to the preceding frame is overwritten with the picture 402 affine-transformed by use of the affine transformation parameter. That is, of the areas in the picture 401, the area 410 overlapping with the picture 402 is overwritten with the picture 402. Of the areas in the picture 401, the area 411 that does not overlap with the picture 402 is synthesized with the picture 401. That is, when the picture 402 corresponding to the second frame is to be displayed, the entire picture 402 and that area in the picture 401 which corresponds to the area 411 are synthesized into a picture being displayed, as shown in FIG. 7(b). Also, a picture framework pattern may be displayed in a manner surrounding the picture corresponding to the current frame so as to indicate the most recent of the pictures being displayed. In FIG. 7(b), the picture framework pattern is displayed around the picture 402. And the affine transformation parameter by which the picture 402 was affine-transformed is held in the picture conversion section 140.

Where the picture 403 corresponding to the next frame is to be displayed successively, the picture 403 is affine-transformed using the affine transformation parameter associated with that frame. That is, the picture 403 is affine-transformed using the affine transformation parameter obtained by multiplying the matrix of affine transformation parameters corresponding to the picture 403, by the matrix of affine transformation parameters corresponding to the picture 402 and used in the preceding affine transformation. Specifically, on the assumption that A3 stands for the matrix of affine transformation parameters corresponding to the picture 403, that A2 denotes the matrix of affine transformation parameters corresponding to the picture 402, and that A1 represents the matrix of affine transformation parameters corresponding to the picture 401, the value of "A1×A2×A3" is obtained. With reference to the position and size of the picture 401 of the first frame, the picture 403 is affine-transformed using the matrix of "A1×A2×A3" thus obtained. Of the picture shown in FIG. 7(c), only the picture 403 is transformed in position. And the synthesized picture derived from the pictures 401 and 402 corresponding to the preceding frame is overwritten with the picture 403 affine-transformed by use of the affine transformation parameter. That is, of the areas in the synthesized picture derived from the pictures 401 and 402, areas 413 and 414 overlapping with the picture 403 are overwritten with the picture 403. And of the areas in the synthesized picture derived from the pictures 401 and 402, the areas 411 and 412 that do not overlap with the picture 403 are synthesized with the synthesized picture out of the pictures 401 and 402. That is, when the picture 403 corresponding to the third frame is to be displayed, the entire picture 403, that area in the picture 401 which corresponds to the area 411, and that area in the picture 402 which corresponds to the area 412 are synthesized into a picture being displayed, as shown in FIG. 7(c). Also, where a picture framework pattern indicating the most recent of the pictures being displayed is to be displayed in a manner surrounding the picture corresponding to the current frame, the picture framework pattern is made to appear around the picture 403 shown in FIG. 7(c). And the affine transformation parameter by which the picture 403 was affine-transformed is held in the picture conversion section 140. That is, the affine transformation parameter obtained by multiplying the matrices of affine transformation parameters corresponding to the pictures 402 and 403 is held in the picture conversion section 140. In this manner, where the picture corresponding to the current frame is to be affine-transformed, the affine transformation parameter is obtained by multiplying the matrix of affine transformation parameters corresponding to the current frame by the matrix of affine transformation parameters corresponding to the frames preceding the current frame. The picture corresponding to the current frame is then affine-transformed using the obtained affine transformation parameter. The affine transformation parameter obtained for this affine transformation is held in the picture conversion section 140 for use in the next affine transformation. The same also applies to the cases in FIGS. 11 and 15.

Figure 8:
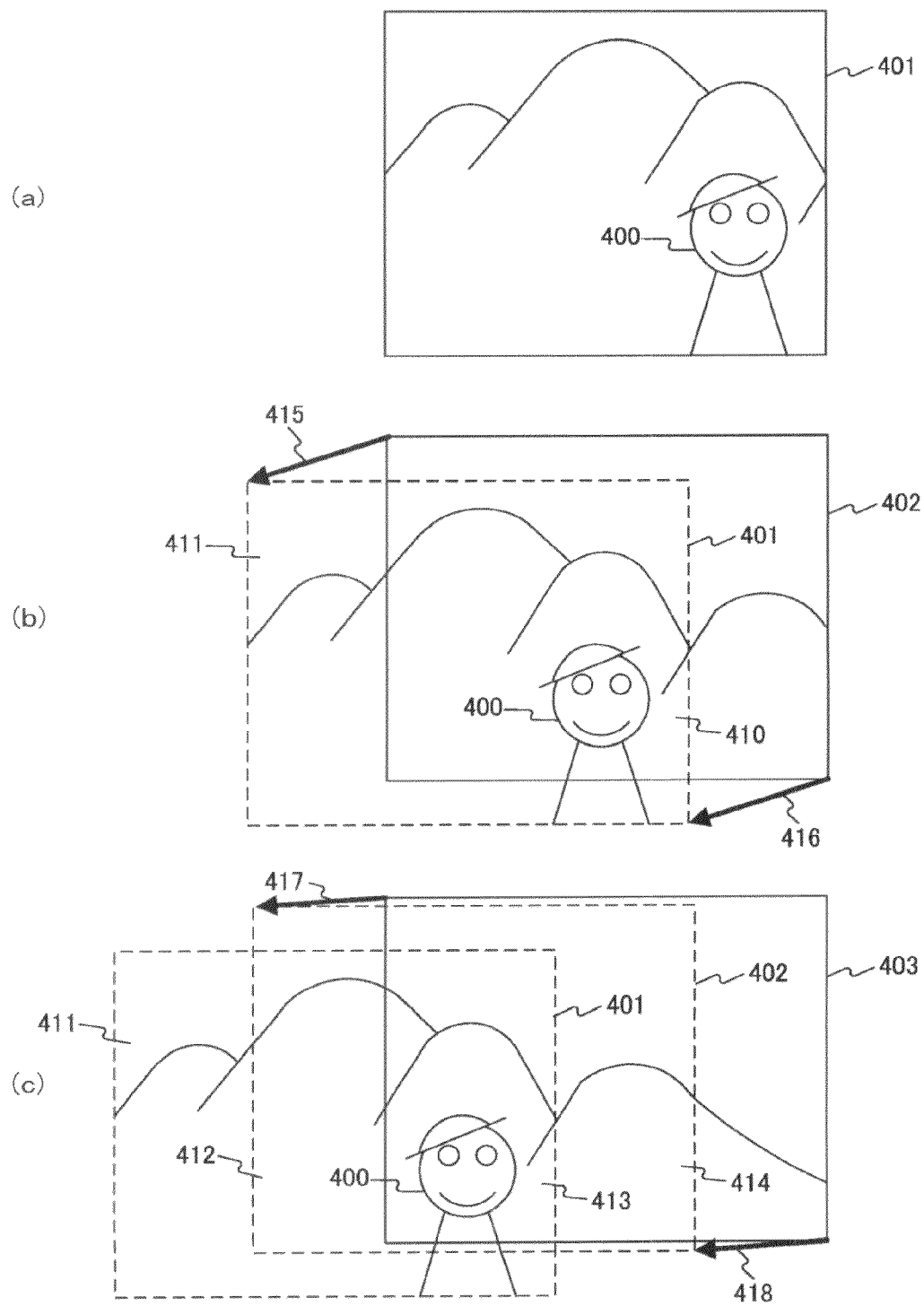
[FIG. 8]

FIG. 8 gives views showing typical displays in effect when the moving picture including the pictures 401 through 403 in FIG. 5 is to be reproduced. The typical displays shown in FIG. 7 indicate a synthesized picture obtained by fixing the synthesized pictures (a single picture the first time) corresponding to the frames preceding the current frame and by overwriting the fixed synthesized pictures with the picture corresponding to the current frame following affine transformation. By contrast, the typical displays shown in FIG. 8 indicate a synthesized picture obtained by fixing the position of the picture corresponding to the current frame, by affine-transforming the synthesized pictures corresponding to the frames preceding the current frame in the reverse direction of affine transformation parameters, and by overwriting the synthesized pictures following affine transformation with the picture corresponding to the current frame. That is, the typical displays shown in FIGS. 7 and 8 differ in terms of the pictures displayed in fixed positions and the pictures to be affine-transformed, but are common in the other portions. For this reason, the portions common to FIG. 7 are designated by common reference numerals for explanation purposes.

As shown in FIG. 8(a), only the picture 401 corresponding to the first frame is initially displayed. When the picture 402 corresponding to the next frame is to be displayed subsequently, the preceding picture 401 is affine-transformed in the reverse direction of affine transformation parameters by use of the affine transformation parameter associated with that frame. Specifically, on the assumption that A2 stands for the matrix of affine transformation parameters corresponding to the picture 402 and that A1 denotes the matrix of affine transformation parameters corresponding to the picture 401, the value of inv(A1×A2) is obtained, and the picture 401 is affine-transformed using the matrix of inv(A1×A2) thus obtained. It should be noted here that invA (A is matrix) is the inverse matrix of A. Of the pictures shown in FIG. 8(b), the picture 401 is transformed only in position. And the picture 401 affine-transformed in the reverse direction of affine transformation parameters is overwritten with the picture 402 corresponding to the current frame. The synthesized picture obtained by overwriting the picture 401 with the picture 402 is the same as the synthesized picture shown in FIG. 7(b) and thus will not be discussed further.

Then, where the picture 403 corresponding to the next frame is to be displayed, the synthesized picture derived from the pictures 401 and 402 corresponding to the preceding frame is affine-transformed in the reverse direction of affine transformation parameters by use of the affine transformation parameter associated with the next frame. Specifically, on the assumption that A3 stands for the matrix of affine transformation parameters corresponding to the picture 403, that A2 denotes the matrix of affine transformation parameters corresponding to the picture 402 and that A1 represents the matrix of affine transformation parameters corresponding to the picture 401, the value of inv(A1×A2×A3) is obtained, and the synthesized picture derived from the pictures 401 and 402 is affine-transformed using the matrix of inv(A1×A2×A3) thus obtained. Of the pictures shown in FIG. 8(c), the synthesized picture derived from the pictures 401 and 402 is transformed only in position. And the synthesized picture derived from the pictures 401 and 402 affine-transformed in the reverse direction of affine transformation parameters is overwritten with the picture 403 corresponding to the current frame. The synthesized picture obtained by overwriting the pictures 401 and 402 with the picture 403 is the same as the synthesized picture shown in FIG. 7(c) and thus will not be discussed further.

Next, explained below is the case in which the scaling factor of the imaging apparatus when taking pictures is changed while the lens direction of the imaging apparatus is not moved.

FIG. 9 gives views showing a typical transition of a moving picture taken by the imaging apparatus. FIG. 9 has pictures 421 through 423 corresponding to consecutive frames included in the moving picture taken of a person 420 against the background of mountains. In this example, the picture-taking person takes pictures while raising the scaling factor of the lens of the imaging apparatus. In this case, the person 420 included in the moving picture taken by the imaging apparatus grows progressively in size in the pictures constituting the moving picture. Although the position of the imaging apparatus may move slightly when the scaling factor is being raised, the movement of the imaging apparatus position is not considered for purpose of explanation.

FIG. 10 gives views which indicate by broken lines the pictures corresponding to the preceding frame in the pictures found in FIG. 9 and which show typical optical flows detected from the pictures. The picture 421 shown in FIG. 10(a) is the same as the picture 421 in FIG. 9(a). And the portions indicated by solid lines in the picture 422 of FIG. 10(b) are the same as the picture 422 of FIG. 9(b), and the portions indicated by broken lines in the picture 422 of FIG. 10(b) are the same as the portions indicated by solid lines in the picture 421 of FIG. 9(a). Also, arrows 424 through 426 in the picture 422 of FIG. 10(b) indicate typical optical flows detected from the picture 422. Likewise, the portions indicated by solid lines in the picture 423 of FIG. 10(c) are the same as the picture 423 of FIG. 9(c), and the portions indicated by broken lines in the picture 423 of FIG. 10(c) are the same as the portions indicated by solid lines in the picture 422 of FIG. 9(b). And arrows 427 through 429 in the picture 423 of FIG. 10(c) indicate typical optical flows detected from the picture 423.

As shown in FIGS. 10(b) and (c), when the scaling factor is changed, the person 420 and the mountains in the background in the pictures are changed in size accordingly. On the basis of the optical flows detected through the changes, the affine transformation parameter can be obtained for each of the frames.

FIG. 11 gives views showing typical displays in effect when the moving picture including the pictures 421 through 423 shown in FIG. 9 is reproduced.

As shown in FIG. 11(a), only the picture 421 corresponding to the first frame is initially displayed. Then when the picture 422 corresponding to the next frame is to be displayed, the picture 422 is affine-transformed using the affine transformation parameter associated with that frame. Of the pictures shown in FIG. 11(b), the picture 422 is transformed only in size. And the picture 421 corresponding to the preceding frame is overwritten with the picture 422 affine-transformed using the affine transformation parameter. That is, of the areas in the picture 421, those areas overlapping with the picture 422 are overwritten with the picture 422. In this case, the picture 421 overlaps with the picture 422 in all areas so that the picture 421 is entirely overwritten with the picture 422. And of the areas in the picture 421, an area 431 not overlapping with the picture 422 is synthesized with the picture 421. That is, when the picture 422 corresponding to the second frame is to be displayed, the entire picture 422 and that area in the picture 421 which corresponds to the area 431 are synthesized into a picture being displayed, as shown in FIG. 11(b). Also, a picture framework pattern indicating the most recent of the pictures being displayed may be made to appear around the picture corresponding to the current frame. In FIG. 11(b), the picture framework pattern is displayed around the picture 422. And the affine transformation parameter by which the picture 422 was affine-transformed is held in the picture conversion section 140.

Subsequently, when the picture 423 corresponding to the next frame is to be displayed, the picture 423 is affine-transformed using the affine transformation parameter associated with that frame. That is, the picture 423 is affine-transformed using the affine transformation parameter obtained by multiplying the matrix of affine transformation parameters corresponding to the picture 423 by the matrix of affine transformation parameters corresponding to the picture 422 and used in the preceding affine transformation. Of the pictures shown in FIG. 11(c), the picture 423 is transformed only in size. And the synthesized picture derived from the pictures 421 and 422 corresponding to the preceding frame is overwritten with the picture 423 affine-transformed using the affine transformation parameter. That is, of the areas making up the synthesized picture derived from the pictures 421 and 422, those areas overlapping with the picture 423 are overwritten with the picture 423. In this case, the picture 423 overlaps with all areas of the pictures 421 and 422, so that the synthesized picture derived from the pictures 421 and 422 is overwritten entirely with the picture 423. And of the areas constituting the synthesized picture derived from the pictures 421 and 422, areas 432 and 433 that do not overlap with the picture 423 are synthesized with the synthesized picture derived from the pictures 421 and 422. That is, when the picture 423 corresponding to the third frame is to be displayed, the entire picture 423, that area in the picture 421 which corresponds to the area 432, and that area in the picture 422 which corresponds to the area 433 are synthesized into a picture being displayed, as shown in FIG. 11(c). And when a picture framework pattern indicating the most recent of the pictures being displayed is to be displayed in a manner surrounding the picture corresponding to the current frame, the picture framework pattern is made to appear around the picture 423 shown in FIG. 11(c). Also, the affine transformation parameter by which the picture 423 was affine-transformed is held in the picture conversion section 140. That is, the affine transformation parameter obtained by multiplying the matrices of affine transformation parameters corresponding to the pictures 422 and 423 is held in the picture conversion section 140.

FIG. 12 gives views showing typical displays in effect when the pictures 421 through 423 shown in FIG. 9 is reproduced. The differences between typical displays in FIGS. 11 and 12 are the same as the differences between typical displays in FIGS. 7 and 8; the typical displays in FIGS. 11 and 12 differ in terms of the pictures displayed in fixed positions and the pictures to be affine-transformed, but are common in the other portions. For this reason, the portions common to FIG. 11 are designated by common reference numerals for explanation purposes.

As shown in FIG. 12(a), only the picture 421 corresponding to the first frame is initially displayed. When the picture 422 corresponding to the next frame is to be subsequently displayed, the preceding picture 421 is affine-transformed in the reverse direction of affine transformation parameters by use of the affine transformation parameter associated with that frame. Of the pictures shown in FIG. 12(b), the picture 421 is transformed only in size. And the picture 421 affine-transformed in the reverse direction of affine transformation parameters is overwritten with the picture 422 corresponding to the current frame. It should be noted that the synthesized picture obtained by overwriting the picture 421 with the picture 422 differs in size from the synthesized picture shown in FIG. 11(b) but is the same as the latter in the other aspects and thus will not be discussed further.

Then, where the picture 423 corresponding to the next frame is to be displayed, the synthesized picture derived from the pictures 421 and 422 corresponding to the preceding frame is affine-transformed in the reverse direction of affine transformation parameters by use of the affine transformation parameter associated with the next frame. Of the pictures shown in FIG. 12(c), the synthesized picture derived from the pictures 421 and 422 is transformed only in size. And the synthesized picture derived from the pictures 421 and 422 affine-transformed in the reverse direction of affine transformation parameters is overwritten with the picture 423 corresponding to the current frame. The synthesized picture obtained by overwriting the synthesized picture derived from the pictures 421 and 422 with the picture 423 differs in size from the synthesized picture shown in FIG. 11(c) but is the same as the latter in the other aspects and thus will not be discussed further.

Next, explained below is the case in which the imaging apparatus during picture-taking is rotated around the direction of taking pictures while the lens direction and scaling factor of the imaging apparatus remain unchanged.

FIG. 13 gives views showing a typical transition of a moving picture taken by the imaging apparatus. FIG. 13 has pictures 441 through 443 corresponding to consecutive frames included in the moving picture taken of a person 440 against the background of mountains. In this example, the picture-taking person takes pictures while rotating the imaging apparatus around the direction of taking pictures. In this case, the person 440 included in the moving picture taken by the imaging apparatus is rotated in the pictures making up the moving picture. Although the position of the imaging apparatus may move slightly during its rotation, the movement of the imaging apparatus position is not considered for purpose of explanation.

FIG. 14 gives views which indicate by broken lines the pictures corresponding to the preceding frame and found in the pictures shown in FIG. 13 and which show typical optical flows detected from the pictures. The picture 441 shown in FIG. 14(a) is the same as the picture 441 in FIG. 13(a). And the portions indicated by solid lines in the picture 442 of FIG. 14(b) are the same as the picture 442 of FIG. 13(b), and the portions indicated by broken lines in the picture 442 of FIG. 14(b) are the same as the portions indicated by solid lines in the picture 441 of FIG. 13(a). Also, arrows 444 through 446 in the picture 442 of FIG. 14(b) indicate typical optical flows detected from the picture 442. Likewise, the portions indicated by solid lines in the picture 443 of FIG. 14(c) are the same as the picture 443 of FIG. 13(c), and the portions indicated by broken lines in the picture 443 of FIG. 14(c) are the same as the portions indicated by solid lines in the picture 442 of FIG. 13(b). And arrows 447 through 449 in the picture 443 of FIG. 14(c) indicate typical optical flows detected from the picture 443.

As shown in FIGS. 14(b) and (c), when the imaging apparatus is rotated, the person 440 and the mountains in the background included in the pictures are rotatively moved accordingly. On the basis of the optical flows detected through the rotative movement, the affine transformation parameter can be detected for each of the frames.

Figure 15:
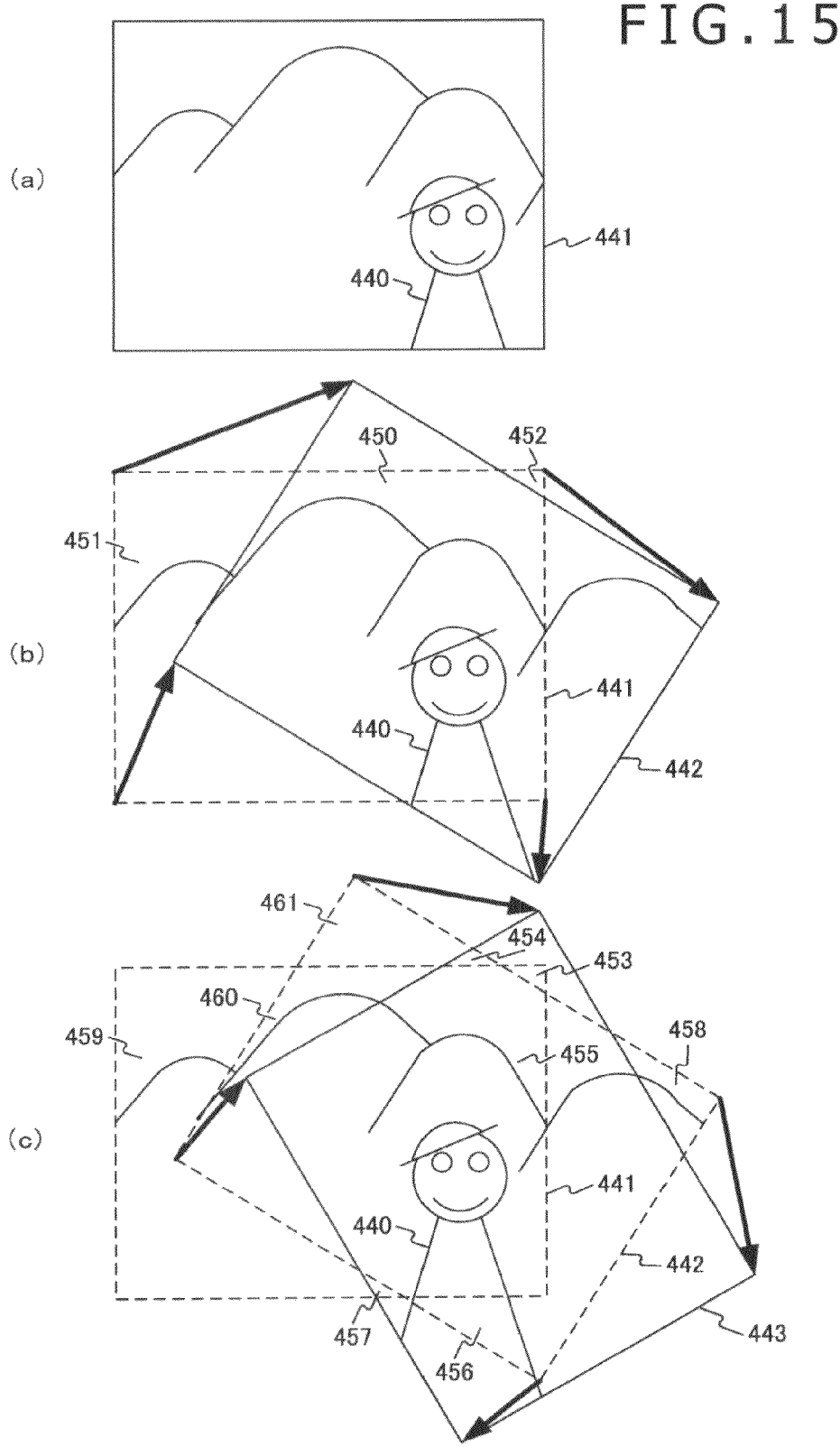
[FIG. 15]

FIG. 15 gives views showing typical displays in effect when the moving picture including the pictures 441 through 443 shown in FIG. 13 is reproduced.

As shown in FIG. 15(a), only the picture 441 corresponding to the first frame is initially displayed. Then when the picture 442 corresponding to the next frame is to be displayed, the picture 442 is affine-transformed using the affine transformation parameter associated with that frame. Of the pictures shown in FIG. 15(b), the picture 442 is transformed only in angle. And the picture 441 corresponding to the preceding frame is overwritten with the picture 442 affine-transformed using the affine transformation parameter. That is, of the areas in the picture 441, an area 450 overlapping with the picture 442 is overwritten with the picture 442. And of the areas in the picture 441, areas 451 and 452 not overlapping with the picture 442 are synthesized with the picture 441. That is, when the picture 442 corresponding to the second frame is to be displayed, the entire picture 442 and those areas in the picture 441 which correspond to the areas 451 and 452 are synthesized into a picture being displayed, as shown in FIG. 15(b). Also, a picture framework pattern indicating the most recent of the pictures being displayed may be made to appear around the picture corresponding to the current frame. In FIG. 15(b), the picture framework pattern is displayed around the picture 442. And the affine transformation parameter by which the picture 442 was affine-transformed is held in the picture conversion section 140.

Subsequently, when the picture 443 corresponding to the next frame is to be displayed, the picture 443 is affine-transformed using the affine transformation parameter associated with that frame. That is, the picture 443 is affine-transformed using the affine transformation parameter obtained by multiplying the matrix of affine transformation parameters corresponding to the picture 443 by the matrix of affine transformation parameters corresponding to the picture 442 and used in the preceding affine transformation. Of the pictures shown in FIG. 15(c), the picture 443 is transformed only in angle. And the synthesized picture derived from the pictures 441 and 442 corresponding to the preceding frame is overwritten with the picture 443 affine-transformed using the affine transformation parameter. That is, of the areas making up the synthesized picture derived from the pictures 441 and 442, areas 453 through 457 overlapping with the picture 443 are overwritten with the picture 443. And of the areas constituting the synthesized picture derived from the pictures 441 and 442, areas 458 through 461 that do not overlap with the picture 443 are further synthesized with the synthesized picture derived from the pictures 441 and 442. That is, when the picture 443 corresponding to the third frame is to be displayed, the entire picture 443, that area in the picture 441 which corresponds to the area 459, and those areas in the picture 442 which correspond to the areas 458 and 460 are synthesized into a picture being displayed, as shown in FIG. 15(c). And when a picture framework pattern indicating the most recent of the pictures being displayed is to be displayed around the picture corresponding to the current frame, the picture framework pattern is made to appear around the picture 443 shown in FIG. 15(c).

Also, the affine transformation parameter by which the picture 443 was affine-transformed is held in the picture conversion section 140. That is, the affine transformation parameter obtained by multiplying the matrices of affine transformation parameters corresponding to the pictures 442 and 443 is held in the picture conversion section 140.

FIG. 16 gives views showing typical displays in effect when the moving picture including the pictures 441 through 443 shown in FIG. 13 is reproduced. The differences between typical displays in FIGS. 15 and 16 are the same as the differences between typical displays in FIGS. 7 and 8; the typical displays in FIGS. 15 and 16 differ in terms of the pictures displayed in fixed positions and the pictures to be affine-transformed, but are common in the other portions. For this reason, the portions common to FIG. 15 are designated by common reference numerals for explanation purposes.

As shown in FIG. 16(a), only the picture 441 corresponding to the first frame is initially displayed. When the picture 442 corresponding to the next frame is to be subsequently displayed, the preceding picture 441 is affine-transformed in the reverse direction of affine transformation parameters by use of the affine transformation parameter associated with that frame. Of the pictures shown in FIG. 16(b), the picture 441 is transformed only in angle. And the picture 441 affine-transformed in the reverse direction of affine transformation parameters is overwritten with the picture 442 corresponding to the current frame. The synthesized picture obtained by overwriting the picture 441 with the picture 442 differs in angle from the synthesized picture shown in FIG. 15(b) but is the same as the latter in the other aspects and thus will not be discussed further.

Then, where the picture 443 corresponding to the next frame is to be displayed, the synthesized picture derived from the pictures 441 and 442 corresponding to the preceding frame is affine-transformed in the reverse direction of affine transformation parameters by use of the affine transformation parameter associated with the next frame. Of the pictures shown in FIG. 16(c), the synthesized picture derived from the pictures 441 and 442 is transformed only in angle. And the synthesized picture derived from the pictures 441 and 442 affine-transformed in the reverse direction of affine transformation parameters is overwritten with the picture 443 corresponding to the current frame. It is to be noted that the synthesized picture obtained by overwriting the pictures 441 and 442 with the picture 443 differs in angle from the synthesized picture shown in FIG. 15(c) but is the same as the latter in the other aspects and thus will not be discussed further.

The foregoing paragraphs explained the cases in which the pictures making up the moving picture are changed successively in position, in scaling factor, and in angle. However, the explanations also apply to cases where such changes are made in combination.

Here, explained below is a typical process of calculating the center position, angle, and scaling factor of the picture corresponding to the current frame. As discussed above, the picture corresponding to the current frame is transformed using what is obtained by multiplying the matrices of affine transformation parameters corresponding the frames ranging from the frame of a reference picture to the current frame. For this reason, the amount of movement, rotation angle, or scaling factor of the picture corresponding to the current frame may be calculated relative to the reference picture using the affine transformation parameter obtained through multiplications. Specifically, the center position, angle, and scaling factor of the picture corresponding to the current frame may be calculated using reference information indicative of the center position, angle, and scaling factor of the first frame regarded as the reference for transformation and held in the picture conversion section 140, as well as what is obtained by multiplying the matrices of affine transformation parameters corresponding to the frames up to the current frame. The center position of the picture corresponding to the current frame is calculated by the expression 1 using the center position found in the reference information and the calculated matrices of affine transformation parameters. The angle θ and the scaling factor "z" of the picture corresponding to the current frame are calculated illustratively by the following expressions using the multiplied affine transformation parameters:

$$\theta = \tan^{-1}\left(\frac{d}{a}\right)$$ [Expression 3]

$$z = \sqrt{\sqrt{a^2 + d^2} \times \sqrt{b^2 + e^2}}$$

Figure 17:
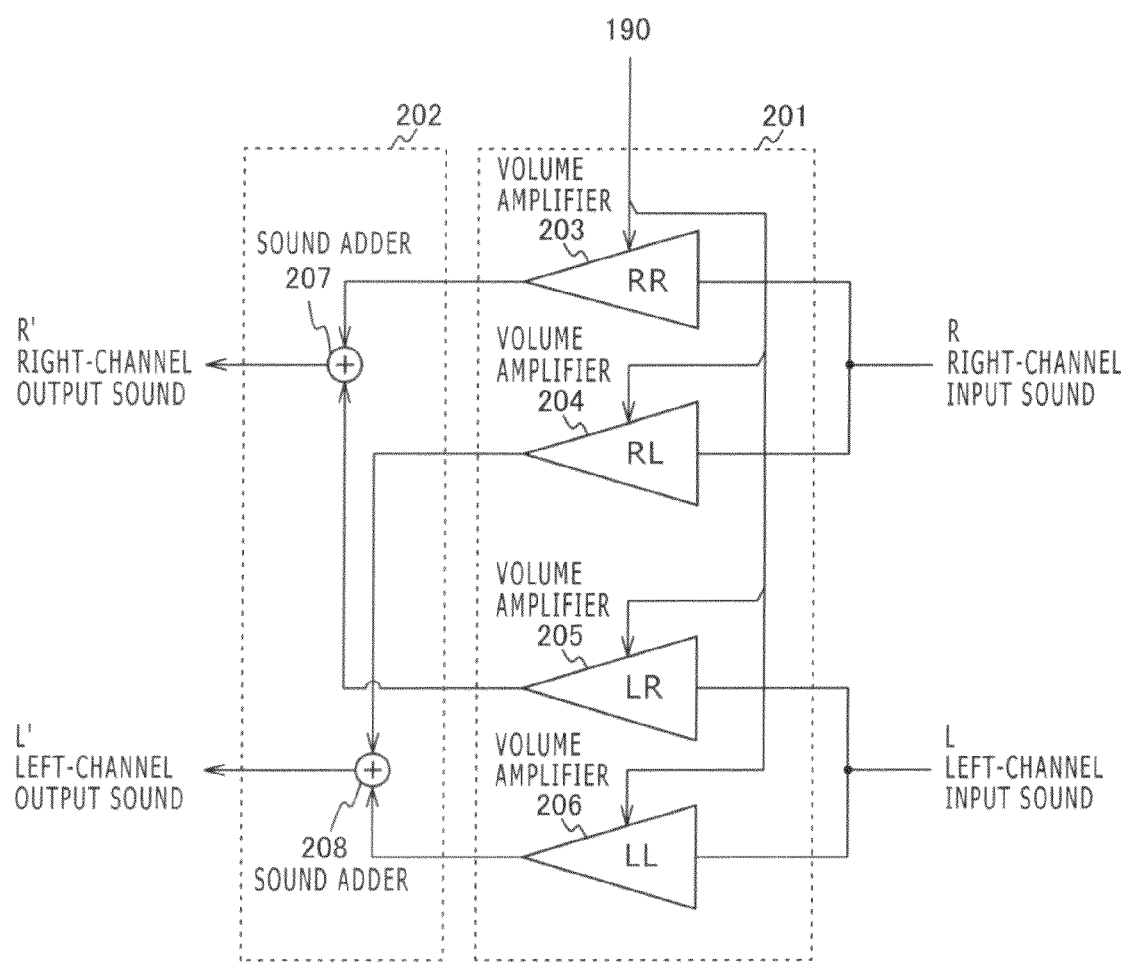
[FIG. 17]

FIG. 17 is a block diagram showing a typical structure of the sound conversion processing section 200 in the embodiment of the present invention. In this example, the input sound on the right and left channels is shown converted to the output sound on the right and left channels.

The volume control section 201 has volume amplifiers 203 through 206. The volume amplifier 203 amplifies the right-channel input sound based on sound conversion information RR coming from the sound conversion information calculation section 190. The volume amplifier 204 amplifies the right-channel input sound based on sound conversion information RL coming from the sound conversion information calculation section 190. The volume amplifier 203 amplifies the left-channel input sound based on sound conversion information LR coming from the sound conversion information calculation section 190. The volume amplifier 204 amplifies the left-channel input sound based on sound conversion information LL coming from the sound conversion information calculation section 190. The sound conversion information in this context is information which is calculated from the center position, angle, and scaling factor of the current frame on the display screen of the display section 180 and which indicates volume control values for each of the channels.

The sound addition section 202 has sound adders 207 and 208. The sound adder 207 adds up the right-channel input sound amplified by the volume amplifier 203 and the left-channel input sound amplified by the volume amplifier 205. The sound adder 207 outputs the added-up sound as the right-channel output sound to the sound output control section 210. The sound adder 208 adds up the right-channel input sound amplified by the volume amplifier 204 and the left-channel input sound amplified by the volume amplifier 206. The sound adder 208 outputs the added-up sound as the left-channel output sound to the sound output control section 210. In this manner, the input sound is converted in accordance with the sound conversion information and output as the output sound to the sound output control section 210.

Next, explained hereunder in detail with reference to the drawings is the sound conversion process performed by the embodiment of the invention in connection with the movement of the picture corresponding to the current frame.

FIG. 18 gives views showing examples in which a moving picture that was taken is reproduced by an ordinary reproduction method. FIG. 18(a) shows a range of pictures 511 through 513 taken by an imaging apparatus 500 of a vehicle moving from right to left as an imaging object. The range of pictures 511 through 513 is taken in such a manner that vehicles 514 through 516 are each positioned at the center of the range of pictures 511 through 513. In order to facilitate the understanding of the drawings here, the vehicles 514 through 516 are shown relatively enlarged compared with the areas of the taken pictures 511 through 513. However, as discussed above with reference to FIG. 3, in order to extract the movement of the imaging apparatus without being affected by moving objects, the moving objects should preferably be pictured in a relatively small size compared with the area of the picture. And in the ensuing description, the taken pictures corresponding to the range of pictures 511 through 513 will be designated by like reference numerals 511 through 513. The imaging apparatus 500 has a right microphone 501 and a left microphone 502 which acquire the right-channel and left-channel input sound while the pictures 511 through 513 are being taken. The input sound thus acquired generally fits the picture appearing in a finder of the imaging apparatus 500. FIG. 18(b) shows an example in which the taken pictures 511 through 513 indicated in FIG. 18(a) are reproduced by the ordinary reproduction method. The taken pictures 511 through 513 are displayed over the entire display screen of the display section 180. In the taken pictures 511 through 513, the vehicles 514 through 516 are displayed at the center of the display screen. Here, the output sound to be output in keeping with the display of the taken pictures 511 through 513 is constituted by the right-channel and left-channel input sound being output unmodified to a right speaker 221 and a left speaker 222 respectively. Under this ordinary reproduction method, the input sound accompanying the taken pictures may be output unmodified and it serves as the output sound that fits the taken pictures. Volume indications 517 and 518 show the volumes of the right-channel and left-channel input sound respectively. The volume of the right-channel input sound is expressed in white, and the volume of the left-channel input sound is in black.

Figure 19:
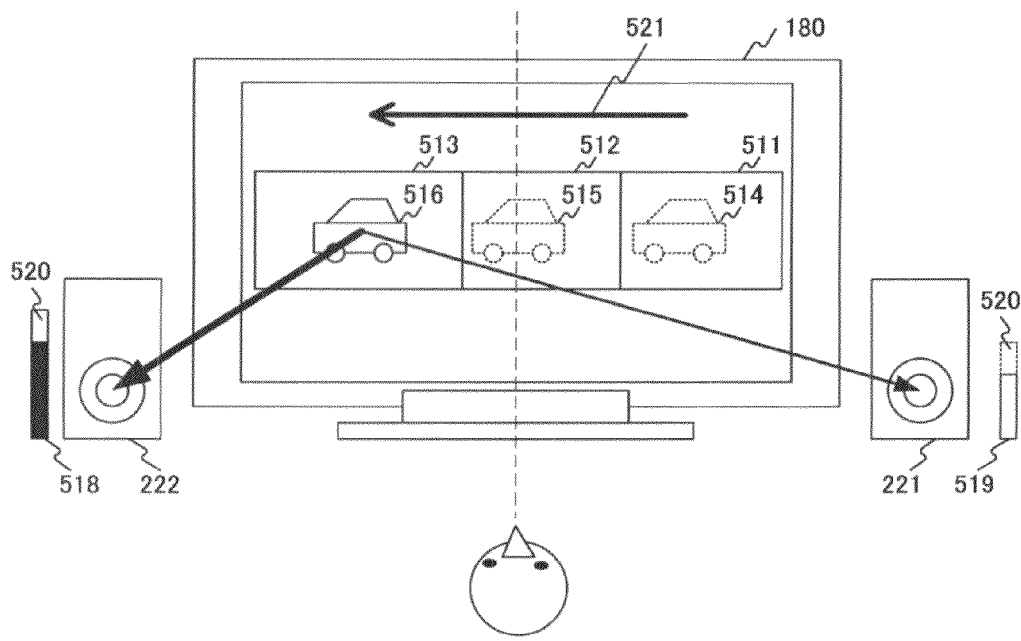
[FIG. 19]

FIG. 19 is a view outlining an example of reproduction performed by the picture processing apparatus 100 as the embodiment of the present invention. This is an example in which the picture corresponding to the current frame is transformed and reproduced using the affine transformation parameter supplied by the picture conversion information supply section 130 while the synthesized picture derived from the pictures preceding the current frame is being fixed. The taken pictures 511 through 513 shown in FIG. 19 are the same as the taken pictures 511 through 513 shown in FIG. 18(a). In this example, however, the taken pictures 511, 512, and 513 are displayed from right to left, in that order, on the display screen of the display section 180 based on the affine transformation parameter obtained from the direction of movement 521 of the imaging apparatus 500. For purpose of explanation in FIG. 19, the taken pictures 511 through 513 are shown with no gap therebetween. In this case, as opposed to the case of FIG. 18(b), the taken pictures 511 through 513 move across the display screen. For this reason, if the acquired input sound is output as is, it is impossible to obtain natural sound effects fitting the movement of the taken pictures 511 through 513. Thus as the embodiment of the present invention, the picture processing apparatus 100 controls the rate at which to add up the left-channel and right-channel input sound in keeping with the center position of the taken pictures 511 through 513 on the display screen for output per output channel. Specifically, in accordance with the center position of the taken pictures 511 through 513 on the display screen, the rate of the volume of the right-channel input sound to the volume of the left-channel input sound is controlled, and the added-up volumes are output to the respective speakers. If it is assumed that the taken picture 513 is being displayed on the display screen, the sound with a volume 519 representing an attenuated right-channel input sound is output as the output sound to the right speaker 221. Here, the left-channel input sound is added to the attenuated volume 519. However, since the center position of the taken picture 513 is located on the left-hand side of the display screen, the volume rate of the left-channel input sound is set to "0." For this reason, only the right-channel input sound is output to the right speaker 221. What is output to the left speaker 222 as the output sound is the sound obtained by adding the volume 520 obtained by subtracting the attenuated volume 519 from the volume of the right-channel input sound to the volume 518 of the left-channel input sound.

Next, described below in detail with reference to the drawings is an example in which the sound conversion information calculation section 190 in the embodiment of the present invention calculates the sound conversion information regarding movements.

Figure 20:
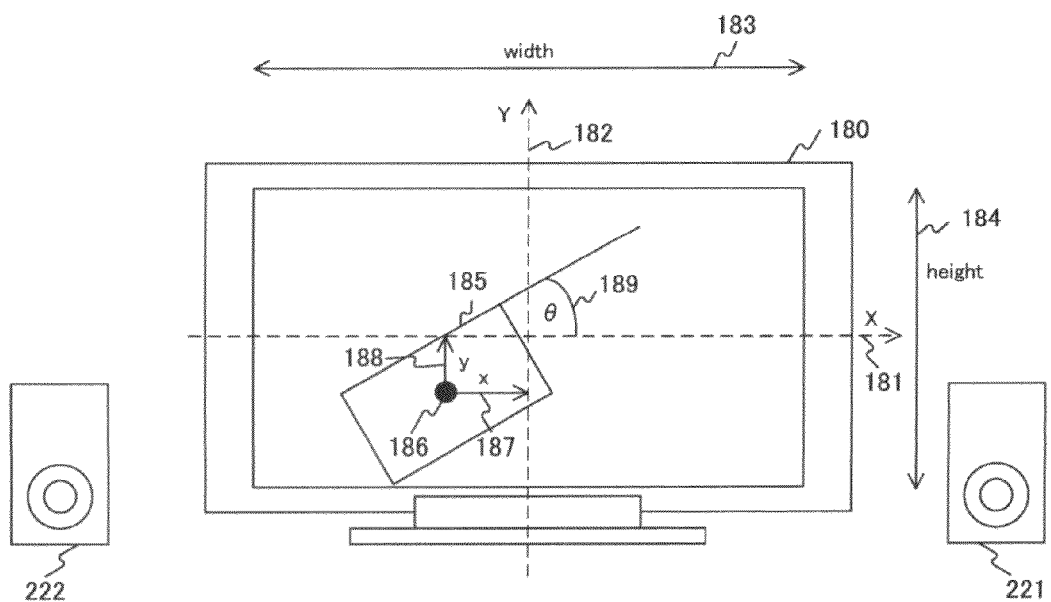
[FIG. 20]

FIG. 20 is a block diagram showing a coordinate system of the display screen on the display section 180 in the embodiment of the present invention. In this example, a picture 185 on the display screen is used for explanation purposes.

An X-axis 181 and a Y-axis 182 are assumed to exist in the horizontal and the vertical directions respectively. The origin of these axes is assumed to be at the center of the display screen on the display section 180. And the horizontal and vertical lengths 183 and 184 of the display screen on the display section 180 are represented by "width" and "height" respectively. In this coordinate system, the amount of movement 187 of the center position 186 of the picture 185 corresponding to the current frame relative to the origin is represented by "x" in the X-axis direction and "y" in the Y-axis direction. The angle 189 of the picture 185 relative to the X-axis is represented by θ.

Using the coordinate system thus defined, the graphs and relational expressions regarding the calculation of sound conversion information will be provided in the ensuing description.

FIG. 21 gives graphs illustrating the relations between the center position of the picture corresponding to the current frame on the one hand and the output sound on the other hand according to the embodiment of the present invention. In FIGS. 21(a) and (b), the horizontal axis represents the amount of movement (x) of the picture on the display screen, and the vertical axis denotes the rate of the output sound to the input sound. Solid lines 611 and 621 represent the output rate of the output sound on the right channel, and broken lines 612 and 622 denote the output rate of the output sound on the left channel. FIG. 21(a) shows the rate at which the input sound on the right channel is allotted to the output sound on the right and left channels in keeping with the amount of movement "x." FIG. 21(b) shows the rate at which the input sound on the left channel is allotted to the output sound on the respective channels in keeping with the amount of movement "x." Ultimately, the output sound on the right channel is added to the sound of the right and left channels as determined by the solid lines 611 and 621, before being output. The output sound on the left channel, too, is added to the sound of the respective channels as determined by the broken lines 612 and 622 before being output.

The relation between the amount of movement "x" along the solid line 611 on the one hand and the rate f(x) of the output sound to the input sound on the other hand may be defined using the following expression:

$$f(x) = (\alpha/(\text{width}/2)) \cdot x + 1 \quad (-\text{width}/2 \le x < 0)$$
$$1 \quad (0 \le x < \text{width}/2)$$

where, "width" stands for the horizontal length of the display screen. Preferably, the value of the parameter a may be between 0.3 and 0.4.

Using the preceding expression, the relational expressions of the broken line 612, solid line 621, and broken line 622 are given as 1−f(x), 1−f(−x), and f(−x), respectively.

Here, the relational expression regarding the conversion of input sound is given as the following expression 2:

$$R'=R \cdot RR+L \cdot LR \quad \text{(expression 2)}$$

$$L'=R \cdot RL+L \cdot LL$$

where, RR=f(x), RL=(1−f(x)), LR=(1−f(−x)), and LL=f(−x); "x" stands for the amount of movement of the picture corresponding to the current frame (i.e., distance from the origin in the horizontal direction to the center position of the picture corresponding to the current frame); R' and L' represent the output sound of the right and left channels respectively; and R and L denote the input sound of the right and left channels respectively.

RR, RL, LR and LL above constitute sound conversion information. The sound conversion information calculation section 190 calculates RR, RL, LR, and LL from the center position of the picture corresponding to the current frame.

It should be noted that, for the example above, it was assumed that the speakers 220 are set up on the right and the left sides of the display screen. Based on the positional relation of the picture corresponding to the current frame in the horizontal direction of the screen, the explanation above was made of how to calculate the sound conversion information about the sound regarding the picture corresponding to the current frame. Alternatively, the embodiment may be applied to speaker systems in which the speakers are located in the middle of the display screen or to speaker systems in which the speakers are positioned at the top and at the bottom of the display screen. For example, if the embodiment is applied to the speaker system with its speakers located at the top and at the bottom of the display screen, it is possible to calculate the sound conversion information about the sound regarding the picture corresponding to the current frame on the basis of the positional relation of the picture corresponding to the current frame in the vertical direction of the screen. If the embodiment is applied to the speaker system with its speakers located in the middle of the screen, it is possible to calculate the sound conversion information about the sound regarding the picture corresponding to the current frame on the basis of the positional relation of the picture corresponding to the current frame in the horizontal direction of the screen. That is, the sound conversion information about the sound regarding the picture corresponding to the current frame is calculated based on the affine transformation parameter, and the output sound is generated by converting the sound based on the sound conversion information thus calculated.

Next, explained below in detail with reference to the drawings is the sound conversion process performed by the embodiment of the present invention regarding the rotation of the picture corresponding to the current frame.

FIG. 22 gives views showing the relations between the imaging apparatus 500 and the objects being pictured. FIG. 22(a) shows a state in effect upon start of taking pictures. Here, the imaging apparatus 500 equipped with the right microphone 501 and left microphone 502 is shown taking pictures of a person 531 who is vocalizing and an alarm clock 532 currently sounding. In this case, the voice of the person 531 is input to the right microphone 501 at a relatively high rate, and the sound of the alarm clock 532 is input to the left microphone 532 at a relatively high rate. FIG. 22(b) shows a picture 551 taken in the state of FIG. 22(a). A volume indication 543 indicates the volume of the right-channel input sound acquired by the right microphone 501, and a volume indication 544 indicates the volume of the left-channel input sound acquired by the left microphone 502. An R mark 541 and an L mark 542 in the taken picture 551 are given as signs to help understand the positional relations between the right microphone 501 and the left microphone 502 in the taken picture. FIG. 22(c) is a view showing the state of FIG. 22(a) as viewed from behind the imaging apparatus 500. Here, a moving picture is taken by the imaging apparatus 500 being rotated 180 degrees in the clockwise direction 545. In this case, the right-channel input sound acquired by the right microphone 501 involves the rate of the voice of the person 531 dropping gradually and the rate of the bell sound of the alarm clock 532 rising gradually as the rotation angle increases. By contrast, the left-channel input sound acquired by the left microphone 502 involves the rate of the bell sound of the alarm clock 532 dropping gradually and the rate of the voice of the person 531 rising gradually as the rotation angle increases. The moving picture taken in this manner is reproduced illustratively as explained below with reference to the next drawings.

Figure 23:
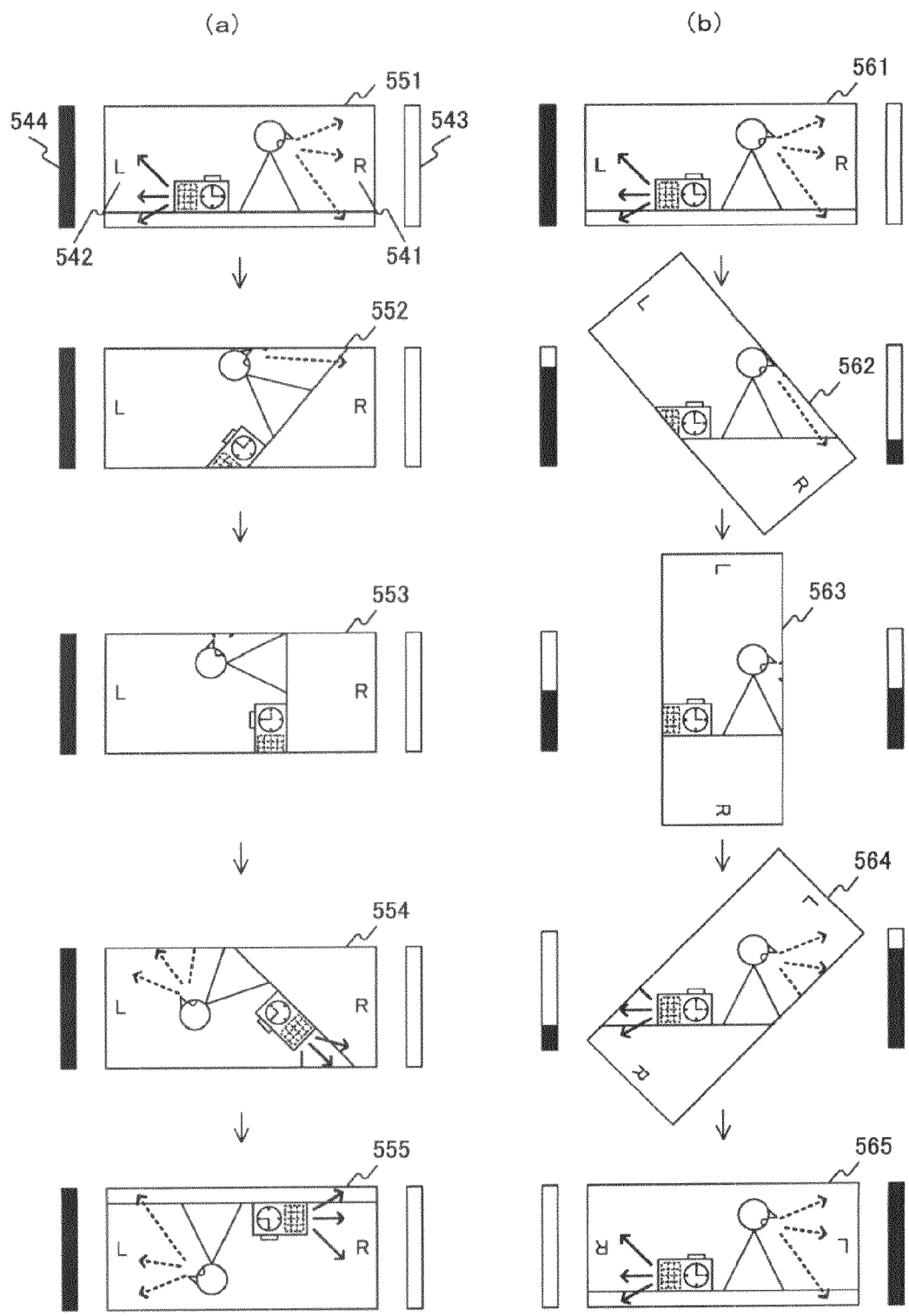
[FIG. 23]

FIG. 23 gives views outlining examples of reproduction performed by the picture processing apparatus 100 embodying the present invention. FIG. 23(a) shows a series of pictures 551 through 555 displayed by the ordinary reproduction method when the moving picture taken by the imaging apparatus 500 found in FIG. 22 is reproduced. FIG. 23(b) illustrates a series of display pictures 561 through 565 reproduced by the picture processing apparatus 100 embodying the invention. This example of reproduction involves converting the picture corresponding to the current frame using the affine transformation parameter supplied by the picture conversion information supply section 130 with the synthesized picture fixed. Here, the framework pattern of the display screen is omitted for purpose of simplification. The taken pictures are each assumed to be displayed at the center of the display screen.

In FIG. 23(a), the positional relations between the R mark 541 and the L mark 542 in the display pictures 551 through 555 remain unchanged. For this reason, the input sound for the display pictures 551 through 555 may be output unmodified as the output sound that fits the display pictures 551 through 555 as is.

In FIG. 23(b), on the other hand, the positional relations between the R mark 541 and the L mark 542 in the display pictures 561 through 565 are changed, so that the acquired input sound will not provide natural sound effects if output as is. Thus as the embodiment of the present invention, the picture processing apparatus 100 controls the rate at which to add up the right-channel and left-channel input sound in keeping with the angle of the picture displayed in the display screen, before outputting the added-up sound to the respective output channels. Specifically, the right-channel output sound is constituted by the right-channel input sound being attenuated in volume and by the left-channel input sound being raised gradually in volume and added to the volume-attenuated right-channel input sound for output in keeping with the angles of the display pictures 561 through 565. The left-channel output sound is constituted by the attenuated input volume of the right channel in the right-channel output sound and by the remainder of the added-up input volume of the right channel in the right-channel output sound for output.

FIG. 24 gives views showing graphs illustrating the relations between the angle of the picture corresponding to the current frame on the one hand and the output sound on the other hand according to the embodiment of the present invention. In FIGS. 24(a) and (b), the horizontal axis represents the angle (θ) relative to the horizontal direction and the vertical axis denotes the rate of output sound to input sound. Solid lines 711 and 721 stand for the output rate of the right-channel output sound and broken lines 712 and 722 denote the output rate of the left-channel output sound. FIG. 24(a) shows the rate at which the right-channel input sound is allocated to the output sound on each of the channels in keeping with the angle θ. FIG. 24(b) shows the rate at which the left-channel input sound is allotted to the output sound on each of the channel in keeping with the angle θ. Ultimately, the right-channel output sound is constituted by the input sound on each of the channels being added up at the rate determined by the solid lines 711 and 721 for output. The left-channel output sound is constituted likewise by the input sound on each of the channels being added up at the rate determined by the broken lines 712 and 722 for output.

The relations between the angle θ of the picture corresponding to the current frame as determined by the solid line 711 on the one hand, and the rate g(θ) of the output sound to the input sound on the other hand, may be defined by the following expression:

$$g(\theta)=(1+\cos\theta)/2$$

Where the above expression is used, the relational expressions of the broken line 712, solid line 721, and broken line 722 are given as 1−g(θ), 1−g(θ), and g(θ), respectively. Here, RR, RL, and LL constituting sound conversion information and shown in the expression 2 are expressed as RR=g(θ), RL=(1−g(θ)), LR=(1−g(θ)), and LL=g(θ), respectively.

It should be noted that, in the above example, the speakers 220 were assumed to be positioned on the right and the left sides of the display screen. Alternatively, as in the case of FIG. 21, the embodiment may be applied to the speaker system of which the speakers are located at the top and at the bottom of the display screen.

Next, explained below in detail with reference to the drawings is the sound conversion process performed by the embodiment of the present invention regarding the scaling factor of the picture corresponding to the current frame.

Figure 25:
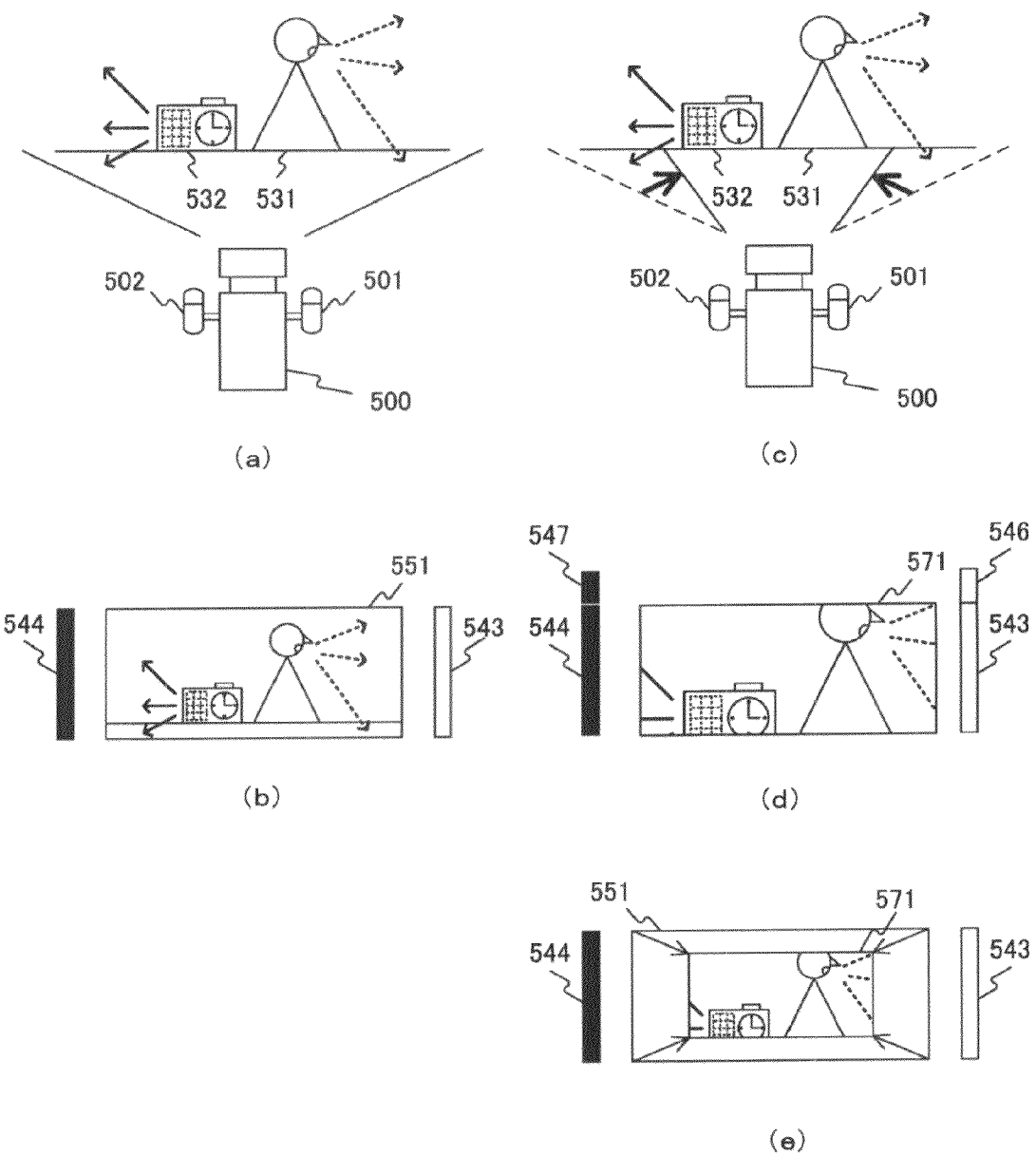
[FIG. 25]

FIG. 25 gives views outlining examples of reproduction performed by the picture processing apparatus 100 embodying the present invention. FIGS. 25(a) and (c) show a state in which the imaging apparatus 500 furnished with the right microphone 501 and left microphone 502 is shown taking pictures of the person 531 and alarm clock 532. FIGS. 25(b), (d) and (e) show typical taken pictures being displayed. Here, the pictures are each assumed to be displayed in a partial area at the center of the display screen on the display section 180. FIG. 25(b) shows the taken picture 551 taken by the imaging apparatus 500 indicated in FIG. 25(a). The volume indication 543 indicates the volume of the right-channel input sound acquired by the right microphone 501, and the volume indication 544 indicates the volume of the left-channel input sound acquired by the left microphone 502. FIG. 25(c) shows a state in which the imaging apparatus 500 taking pictures as indicated in FIG. 25(a) zooms in on the objects being pictured.

FIGS. 25(d) and (e) show examples of reproduction performed by the picture processing apparatus 100 embodying the present invention. FIG. 25(d) is an example of converting the synthesized picture using the affine transformation parameter supplied by the picture conversion information supply section 130 while fixing the size of the picture corresponding to the current frame. In this case, the person 531 and alarm clock 532 in a taken picture 571 are shown enlarged due to a zoom-in operation of the imaging apparatus 500. Thus as the embodiment of the present invention, the picture processing apparatus 100 controls the volumes of the left-channel and the right-channel input sound at the same rate respectively in accordance with the scaling factor of the picture corresponding to the current frame for output to each of the output channels. Specifically, in keeping with the scaling factor of the objects being pictured in the taken picture 571 relative to the taken picture 551, the volumes 543 and 544 of the input sound on each of the channels are amplified (i.e., volume indications 546 and 547 are added up) at the same rate for output.

On the other hand, FIG. 25(e) shows an example of reproduction in which the picture corresponding to the current frame is converted using the affine transformation parameter supplied by the picture conversion information supply section 130 with the synthesized picture fixed. In this case, the objects pictured in the taken picture 571 on the display screen are the same in size as the objects shown in FIG. 25(b). Thus as the embodiment of the present invention, the picture processing apparatus 100 outputs the input sound as is, without changing the volume rate of the input sound. Specifically, when this display mode is in effect, the picture conversion section 140 outputs to the sound conversion information calculation section 190 the center position and angle, except for the scaling factor, of the picture corresponding to the current frame.

FIG. 26 gives graphs illustrating the relations between the scaling factor and the output sound regarding the picture corresponding to the current frame according to the embodiment of the present invention. In FIGS. 26(a) and (b), the horizontal axis represents the scaling factor (z) of the picture and the vertical axis denotes the rate of output sound to input sound. FIG. 26(a) shows the rate of the right-channel output sound to the right-channel input sound in keeping with the scaling factor "z," and FIG. 26(b) shows the rate of the left-channel output sound to the left-channel input sound in keeping with the scaling factor "z."

In the graphs, the relations between the scaling factor "z" as determined by a solid line 713 and the rate h(z) of the output sound to the input sound may be defined using the following expression:

$$h(z) = \begin{cases} 1 - \beta & (0 < z \le z1) \\ (2\beta/(z2-z1))\cdot(z-z1) + 1 - \beta & (z1 \le z < z2) \\ 1 + \beta & (z2 \le z) \end{cases}$$

where, "z" denotes the scaling factor of the picture corresponding to the current frame. Preferably, the value of the parameter β may be between 0.1 and 0.2 in order not to influence the volume greatly. The values of z1 and z2 may be determined suitably in consideration of the value of β.

Here, RR and LL constituting sound conversion information and shown in the expression 2 are expressed as RR=LL=h(z). Explained above with reference to FIG. 25 was the case where the input sound on each of the channels is not added to the output sound on each of the channels. If the input sound on each of the channels is added to the output sound on each of the channels, then the volume of the input sound for each added channel is amplified at the same rate, so that RL and LR are also expressed in terms of h(z) as in the case of RR and LL. And h(z) may alternatively be given by a sigmoid function in which 1+β and 1−β constitute an asymptote as defined by the following expression:

$$h(z)=(1/(1+e^{-(z-1)})-0.5)\cdot\beta+1$$

The preceding paragraphs explained the cases where the center position, angle, and scaling factor of the picture corresponding to the current frame are changed one after another. If such changes occur in combination, the respective relational expressions may be multiplied to provide similar effects. Specifically, RR, RL, LR, and LL constituting sound conversion information and found in the expression 2 may be expressed as RR=f(x)·g(θ)·h(z), RL=(1−f(x))·(1−g(θ))·h(z), LR=(1−f(−x))·(1−g(θ))·h(z), and LL=f(−x)·g(θ)·h(z), respectively. In the preceding example, the explanation was made of the input sound on the right and left channels. Alternatively, the embodiment may be applied to the input sound on an additional center channel as well.

The workings of the picture processing apparatus 100 embodying the present invention are explained below with reference to the drawings.

Figure 27:
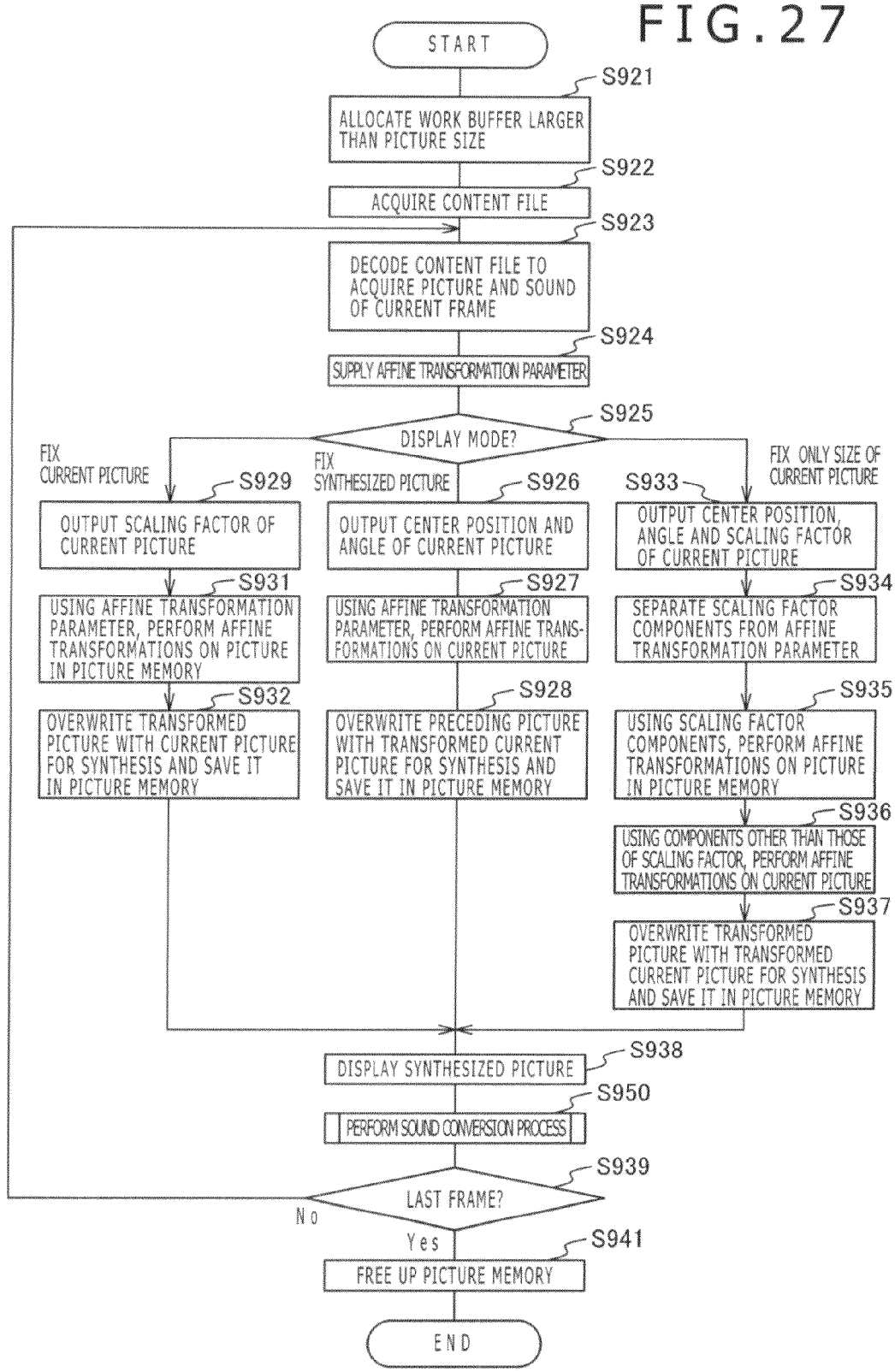
[FIG. 27]

FIG. 27 is a flowchart showing the steps constituting the moving picture reproduction process performed by the picture processing apparatus 100 as the embodiment of the present invention.

First, a work buffer larger than the size of the pictures making up the moving picture is allocated in the picture memory 160 (step S921). Then a content file is acquired from the content storage section 110 (step S922). Then the content file is decoded and the picture and the sound corresponding to the current frame are acquired (step S923). Then the picture conversion information supply section 130 supplies the affine transformation parameter corresponding to the current frame to the picture conversion section 140 (step S924). Here, if the current frame is the first frame, then a unit matrix affine transformation parameter is supplied. Then the picture conversion section 140 determines which one of three reproduction display modes is being selected (step S925).

And if the moving picture is reproduced and displayed by fixing the synthesized picture derived from the pictures corresponding to the frames preceding the current frame, then the center position and the angle, except for the scaling factor, of the picture corresponding to the current frame are output by the picture conversion section 140 to the sound conversion information calculation section 190 (step S926). Then the picture conversion section 140 affine-transforms the picture corresponding to the current frame using the affine transformation parameter obtained by multiplication (step S927). Here, if the current frame is the first frame, then the unit matrix affine transformation parameter is used for affine transformation, so that no picture is actually transformed. Then the picture held in the picture memory 160 is overwritten with the affine-transformed picture corresponding to the current frame, and the resulting synthesized picture is held in the picture memory 160 (step S928). Here, if the current frame is the first frame, the picture corresponding to the first frame is held in the picture memory 160.

Subsequently, the resulting synthesized picture is displayed on the display section 180 (step S938). Then a sound conversion process is carried out (step S950). This sound conversion process will be explained later in detail by referring to the next drawings. Then a check is made to determine whether the current frame is the last of the frames making up the acquired moving picture (step S939). If the current frame is not the last frame (step S939), then step S923 is reached again, and the synthesized picture display process is repeated.

Meanwhile, if in step S925 the reproduction display mode is found selected in which the moving picture is reproduced and displayed by fixing the picture corresponding to the current frame, the picture conversion section 140 outputs only the scaling factor of the picture corresponding to the current frame to the sound conversion information calculation section 190 (step S929). Then using the affine transformation parameter obtained by multiplication, the picture conversion section 140 affine-transforms the synthesized picture held in the picture memory 160 in the reverse direction of affine transformation parameters (step S931). Here, if the current frame is the first frame, then there is no synthesized picture held in the picture memory 160 and thus no picture is transformed. Then the synthesized picture affine-transformed in the reverse direction of affine transformation parameters is overwritten with the picture corresponding to the current frame, and the resulting synthesized picture is held in the picture memory 160 (step S932). Here, if the current frame is the first frame, the picture corresponding to the first frame is held in the picture memory 160. Then step S938 is reached.

If in step S925 the reproduction display mode is found selected in which the moving picture is reproduced and displayed by fixing the display scaling factor of the picture corresponding to the current frame, the picture conversion section 140 outputs the center position, angle, and scaling factor of the picture corresponding to the current frame to the sound conversion information calculation section 190 (step S933). The elements regarding scaling factor are separated from the elements of the affine transformation parameter supplied by the picture conversion information supply section 130 (step S934). Then using the scaling factor-related elements thus separated, the synthesized picture held in the picture memory 160 is affine-transformed in the reverse direction of affine transformation parameters (step S935). Here, if the current frame is the first frame, there is no synthesized picture held in the picture memory 160 and thus no picture is transformed. Then the picture corresponding to the current frame is affine-transformed using the separated elements regarding movement or rotation (step S936). Here, if the current frame is the first frame, the picture is affine-transformed using a unit matrix affine transformation parameter and thus no picture is actually transformed. Then the synthesized picture affine-transformed in the reverse direction of affine transformation parameters is overwritten with the affine-transformed picture corresponding to the current frame, and the resulting synthesized picture is held in the picture memory 160 (step S937). Step S938 is then reached.

If in step S939 the current frame is found to be the last frame (step S939), the work buffer allocated in the picture memory 160 is freed up (step S941), and the moving picture reproduction process is terminated.

Figure 28:
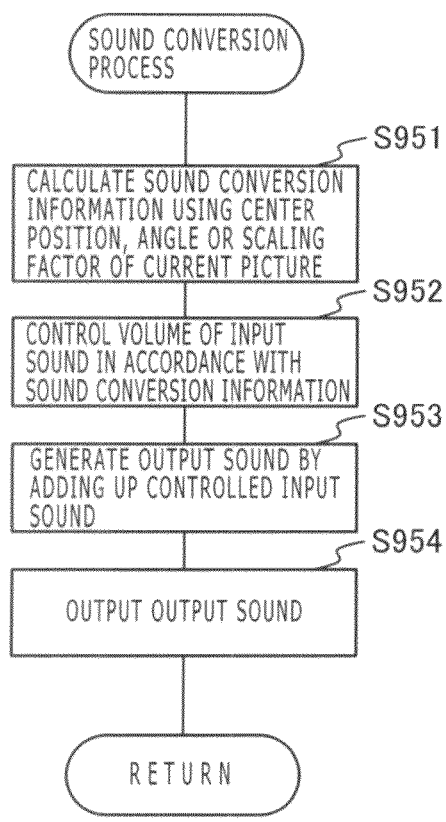
[FIG. 28]

FIG. 28 is a flowchart illustratively showing the steps constituting the sound conversion process (i.e., procedure in step S950) performed by the picture processing apparatus 100 as the embodiment of the present invention.

First, the sound conversion information calculation section 190 calculates sound conversion information based on the center position, angle, or scaling factor of the picture corresponding to the current frame output by the picture conversion section 140 (step S951). Then based on the sound conversion information calculated by the sound conversion information calculation section 190, the volume control section 201 controls the volumes of a plurality of channels making up the sound output by the content acquisition section 120 (step S952). Then the sound addition section 202 adds up the controlled volumes for each of the channels for output as the output sound of each channel (step S953). Then the added-up output sound of each of the channels is output to the speakers 220 (step S954).

Explained below with reference to the drawings is a first variation of the embodiment of the present invention.

Figure 29:
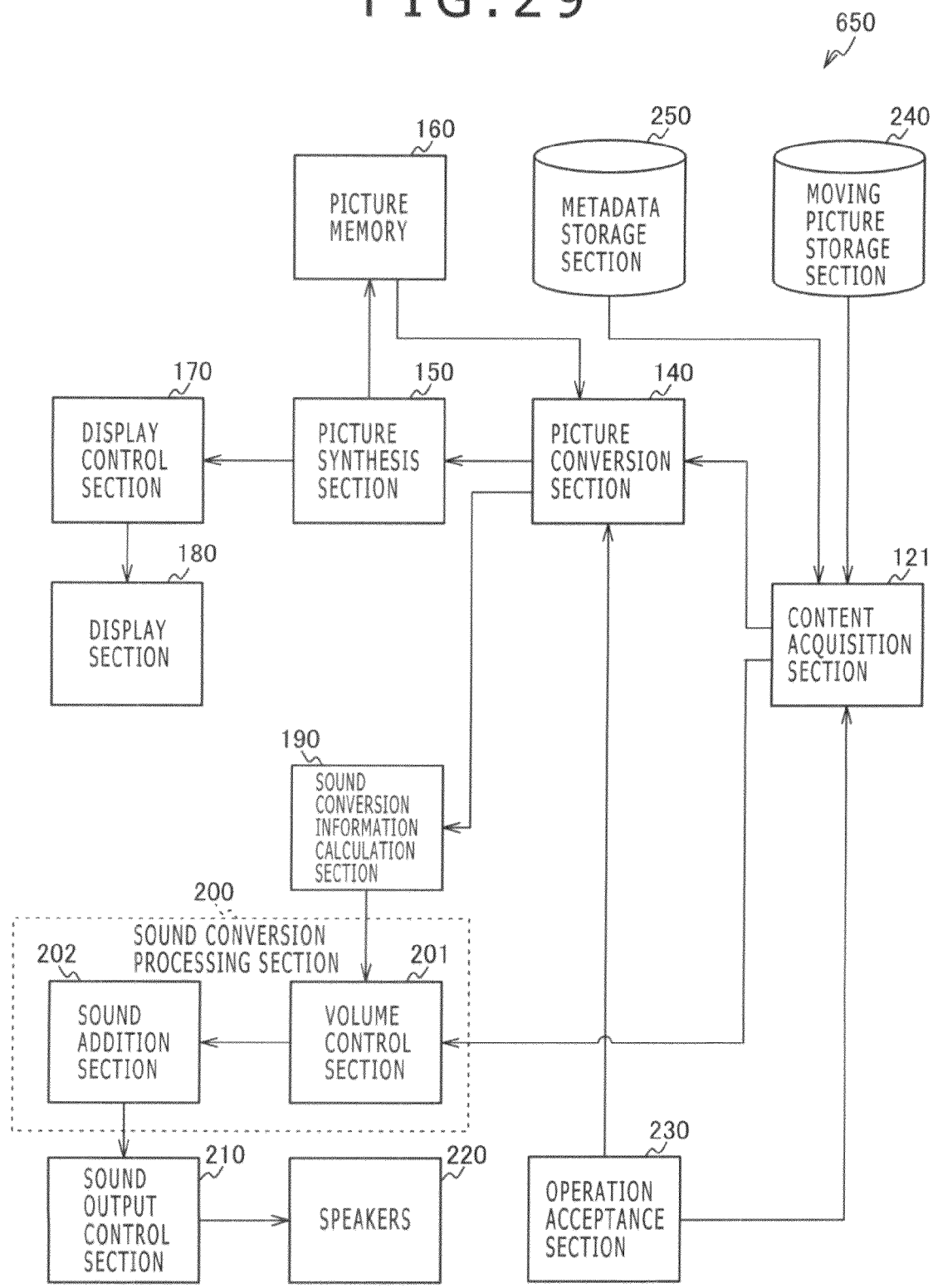
[FIG. 29]

FIG. 29 is a block diagram showing a typical functional structure of a picture processing apparatus 650 as an embodiment of the present invention. The picture processing apparatus 650 is a partially modified variation of the picture processing apparatus 100 shown in FIG. 1. In the picture processing apparatus 650, a moving picture storage section 240, a metadata storage section 250, and a content acquisition section 121 replace the content storage section 110, content acquisition section 120, and picture conversion information supply section 130 of the picture processing apparatus 100, respectively. The components other than the moving picture storage section 240, metadata storage section 250 and content acquisition section 121 are the same as those of the picture processing apparatus 100 in FIG. 1, so that these common components will not be discussed further.

The moving picture storage section 240 stores moving pictures as moving picture files. Also, the moving picture storage section 240 supplies a moving picture file to the content acquisition section 120 upon request by the content acquisition section 120. The moving picture files stored in the moving picture storage section 240 will be explained later in detail with reference to FIG. 30.

The metadata storage section 250 stores as metadata files the affine transformation parameters calculated on the basis of the motion information obtained by analyzing moving pictures. Also, the metadata storage section 250 supplies a metadata file to the content acquisition section 120 upon request by the content acquisition section 120. The metadata files stored in the metadata storage section 250 will be discussed later in detail with reference to FIG. 30.

In response to the operations input through the operation acceptance section 230 for reproduction of a moving picture, the content acquisition section 121 acquires a moving picture file stored in the moving picture storage section 240 and a metadata file stored in the metadata storage section 250 in relation to that moving picture file. The content acquisition section 121 outputs the moving picture of the acquired moving picture file and the affine transformation parameters of the metadata file to the picture conversion section 140. Also, the content acquisition section 121 outputs the sound corresponding to the moving picture of the acquired moving picture file to the sound conversion processing section 200.

FIG. 30 gives views showing schematically the files recorded in the moving picture storage section 240 and in the metadata storage section 250 in the embodiment of the present invention. FIG. 30(a) shows moving picture files 241 through 244 stored in the moving picture storage section 240, and metadata files 251 through 253 stored in the metadata storage section 250 in relation to the moving picture files 241 through 244. Here, it is assumed that each moving picture file is furnished with a moving picture ID as identification information for identifying the moving picture file in question stored in the moving picture storage section 240. For example, the moving picture file 241 is furnished with the ID "#1," the moving picture file 242 with "#2," and the moving picture file 244 with "#n."

FIG. 30(b) is a view showing schematically the moving picture file 241 stored in the moving picture storage section 240, and the metadata file 251 stored in the metadata storage section 250 in relation to the moving picture file 241. Here, the moving picture file 241 is made up of as many as "n" frames, and these "n" frames are indicated as frames 1 (245) through n (248).

Also, the metadata file 251 contains a moving picture ID 254, frame numbers 255, and affine transformation parameters 256 in relation to one another.

The moving picture ID 254 is attached to the corresponding moving picture file. For example, what is contained here is "#1" attached to the moving picture file 241.

The frame numbers 255 are serial numbers of the frames that make up the moving picture of the corresponding moving picture file. For example, what is contained here are "1" through "n" corresponding to the frames (1) 245 through (n) 248 constituting the moving picture of the moving picture file 241.

The affine transformation parameters 256 are those parameters that are calculated for each of the frames corresponding to the frame numbers 255 and making up the moving picture. The affine transformation parameter 256 "a1, b1, c1, d1, e1, f1" corresponding to the frame number 255 "1" is a unit matrix affine transformation parameter. And the affine transformation parameter 256 "am, bm, cm, dm, em, fm" corresponding to the frame number 255 "m (m is an integer of at least 2)" is an affine transformation parameter that corresponding to the frame "m−1" preceding the frame "m."

The foregoing paragraphs explained the case where the picture corresponding to the current frame is affine-transformed and a synthesized picture is created therefrom depending on whether or not the moving picture is reproduced while the picture corresponding to the current frame is being fixed at the center of the display section 180, and the case where the synthesized picture corresponding to the preceding frames is affine-transformed in the reverse direction of affine transformation parameters and a synthesized picture is created therefrom. However, it is also possible to create the synthesized picture by successively performing affine transformations on the current picture corresponding to the current frame, to save the synthesized pictures thus created into the picture memory, and to extract the display area to be displayed from the synthesized pictures in the picture memory. This makes it possible to change the manner in which the display section provides its display during moving picture reproduction. Such moving picture reproduction processes will be explained below in detail with reference to the drawings.

Explained next with reference to the drawings is a second variation of the embodiment of the present invention.

Figure 31:
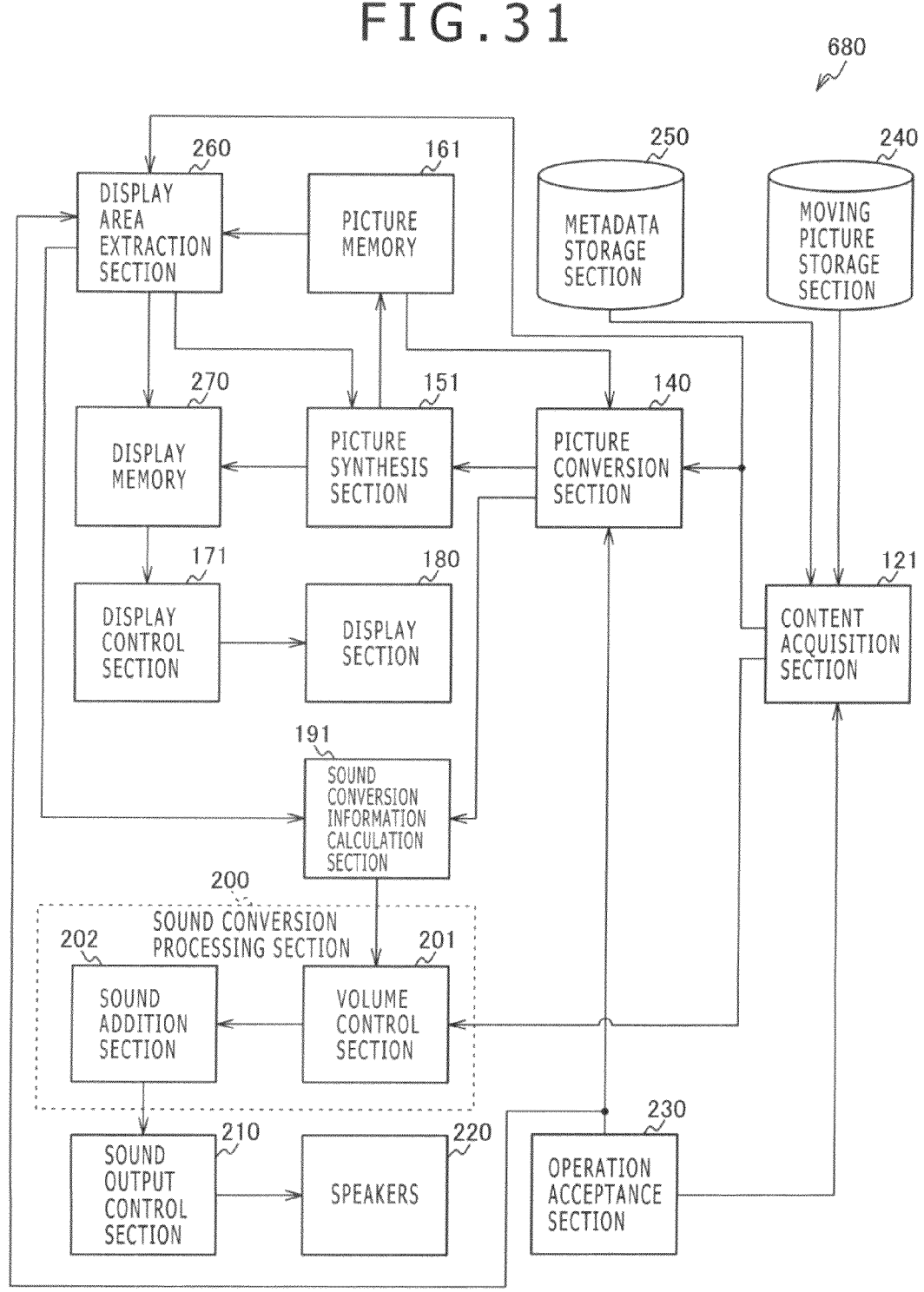
[FIG. 31]

FIG. 31 is a block diagram showing a typical functional structure of a picture processing apparatus 680 as an embodiment of the present invention. The picture processing apparatus 680 is a partially modified variation of the picture processing apparatus 650 shown in FIG. 29. The picture processing apparatus 680 is implemented by supplementing the functional structure of the picture processing apparatus 650 in FIG. 29 with a display area extraction section 260 and a display memory 270 and by replacing the picture synthesis section 150, picture memory 160 and sound conversion information calculation section 190 with a picture synthesis section 151, a picture memory 161 and a sound conversion information calculation section 191 respectively. The picture processing apparatus 680 is capable of placing the picture corresponding to the current frame into the display screen and carrying out the sound conversion processing accordingly. The structures of the moving picture storage section 240, metadata storage section 250, picture conversion section 140, sound conversion processing section 200, sound output control section 210, and speakers 220 are the same as those of the picture processing apparatus shown in FIG. 29 and thus will not be discussed further. Whereas this example will explain the variation of the invention obtained by partially modifying the picture processing apparatus 650 in FIG. 29, the modification may be likewise made of the picture processing apparatus 100 shown in FIG. 1.

Based on the position of the picture corresponding to the current frame in the display area output by the display area extraction section 260, the picture synthesis section 151 overwrites the synthesized picture held in the display memory 270 with the picture corresponding to the current frame received from the picture conversion section 140 for picture synthesis. Specifically, where the display mode in which to fix the picture corresponding to the current frame is being designated, the picture synthesis section 151 overwrites the center portion of the synthesized picture held in the display memory 270 with the picture corresponding to the current frame and yet to be affine-transformed by the picture conversion section 140 for picture synthesis. On the other hand, where the display mode in which to fix the synthesized picture preceding the picture corresponding to the current frame is being designated, the picture synthesis section 151 overwrites the synthesized picture held in the display memory 270 with the picture corresponding to the current frame and affine-transformed by the picture conversion section 140 for picture synthesis based on the position of the picture corresponding to the current frame in the display area output by the display area extraction section 260. Here, the size of the picture corresponding to the current frame and synthesized in the display memory 270 is determined by the value of the display scaling factor in effect. And the picture synthesis section 151 has the function of the picture synthesis section 150. The function of the picture synthesis section 150 is the same as that discussed above and thus will not be described further.

The picture memory 161 is a work buffer that retains the synthesized pictures synthesized by the picture synthesis section 151. The picture memory 161 supplies the synthesized pictures held therein to the picture conversion section 140 or to the display area extraction section 260.

From the synthesized pictures held in the picture memory 161, the display area extraction section 260 extracts a picture located within the range of the display area targeted for display. The display area extraction section 260 causes the display memory 270 to hold the extracted picture. And if at least part of the picture corresponding to the current frame from among the synthesized pictures held in the picture memory 161 extends off the display area, then the display area extraction section 260 moves the display area so that the picture corresponding to the current frame will be entirely accommodated within the display area, before extracting the picture located within the range of the display area from the synthesized pictures held in the picture memory 161. Furthermore, if the display mode in which to fix the synthesized picture preceding the current frame is being designated, the display area extraction section 260 calculates the position of the picture corresponding to the current frame in the display area, and outputs the calculated position of the picture corresponding to the current frame in the display area to the picture synthesis section 151. Also, the display area extraction section 260 calculates the affine transformation parameter regarding the current display area with reference to the area of the picture memory 161, and outputs the calculated affine transformation parameter to the sound conversion information calculation section 191. How to extract the picture from within the range of the display area will be explained in detail by referring to FIGS. 32 through 38 and other drawings, and how to move the display area will be described in detail with reference to FIGS. 33, 34 and other drawings. And how to calculate the position of the picture corresponding to the current frame in the display area will be explained in detail by referring to FIG. 37. Also, how to calculate the affine transformation parameter regarding the current display area will be discussed with reference to FIGS. 32 and 35.

The display memory 270 is a display buffer that holds the picture extracted from the picture memory 161 by the display area extraction section 260. The picture held in the display memory 270 is displayed on the display area 180.

A display control section 171 causes the display section 180 to sequentially display per frame the synthesized picture held in the display memory 270.

Under control of the display control section 171, the display section 180 displays the synthesized picture held in the display memory 270. For example, the display section 180 may be implemented in the form of a personal computer display or a television display.

The sound conversion information calculation section 191 calculates sound conversion information based on the center position, angle, or scaling factor of the picture corresponding to the current frame in the display area. Specifically, the sound conversion information calculation section 191 calculates the center position, angle, and scaling factor of the picture corresponding to the current frame in the display area using the center position, angle, or scaling factor of the picture corresponding to the current frame in the display area and held in the picture memory 161 following output from the picture conversion section 140, as well as by use of the inverse matrix of the affine transformation parameter regarding the current display area and output by the display area extraction section 260. Also, the sound conversion information calculation section 190 has the function of the sound conversion information calculation section 190. The function of the sound conversion information calculation section 190 is the same as that discussed above and thus will not be described further. Also, the sound conversion information calculation section 191 may receive directly from the display area extraction section 260 the center position, angle, or scaling factor of the picture corresponding to the current frame in the display area.

An operation acceptance section 231 has a variety of operation keys. Upon accepting the operations input through these keys, the operation acceptance section 231 outputs what is contained in the accepted operation inputs to the display area extraction section 260. Illustratively, the operation acceptance section 231 includes a reproduction designation key for designating the reproduction of a moving picture, a display scaling factor designation key for designating the display scaling factor of the moving picture, and a setting key for setting the display mode in which to reproduce the moving picture. The display mode may be a mode in which, when the synthesized picture corresponding to the frames preceding the current frame is fixed, the picture corresponding to the current frame is displayed while being affine-transformed; or a mode in which, when the picture corresponding to the current frame is fixed, the synthesized picture is displayed while being affine-transformed in the reverse direction of affine transformation parameters. These display modes may be changed even during the reproduction of a moving picture. The operation acceptance section 231 also has the function of the operation acceptance section 230. The function of the operation acceptance section 230 is the same as that described above and thus will not be discussed further.

FIG. 32 gives views showing schematically the relations between the frames of a moving picture stored in the moving picture storage section 240 on the one hand and the display area on the other hand according to the embodiment of the present invention. Here, only the picture memory 161, metadata storage section 250, and operation acceptance section 231 are illustrated and the other components are omitted. Explained below is an example in which the affine transformation parameters 256 stored in the metadata file 251 are used to create in the picture memory 161 a synthesized picture regarding frames "1" through "3" making up the moving picture file 241 shown in FIG. 30(b). FIG. 32 shows cases where the synthesized picture corresponding to the frames preceding the current frame is fixed on the display section 180.

FIG. 32(a) shows the case in which the frame 1 (245), the first frame of the frames making up the moving picture file 241 indicated in FIG. 30(b), is held in the picture memory 161. For example, the operation acceptance section 231 may accept the input of reproduction designation operations for designating the reproduction of the moving picture file 241 stored in the moving picture storage section 240 while the synthesized picture corresponding to the frames preceding the current frame is being fixed. In this case, as shown in FIG. 32(a), a picture 351 corresponding to the frame 1 (245) of the moving picture file 241 is held in the picture memory 161. Here, the position in which to save the picture 351 corresponding to the first frame in the picture memory 161 may be either determined beforehand or designated by the user operating the operation acceptance section 231. Alternatively, the size of the synthesized picture ranging from the frame "1" to the frame "n" may be calculated using the affine transformation parameters 256 regarding the moving picture file 241 stored in the metadata file 251, and the position in which to save the picture 351 may be determined based on the calculations. For this example, it is assumed that the top left corner of the picture 351 in the picture memory 161 is set as the origin and that the horizontal direction (horizontal axis) is denoted by the x-axis and the vertical direction (vertical axis) by the y-axis.

As shown in FIG. 32(a), the display area in effect when the picture 351 is placed in the picture memory 161 is assumed to be a display area 361. Illustratively, the display area 361 is determined based on the position and size of the retained picture 351 and in accordance with the value of the display scaling factor accepted through the operation acceptance section 320. For example, if a display scaling factor of "0.5" is designated for a zoom-out operation of the picture corresponding to the current frame, then the size of the display area 361 is twice that of the picture 351 that is positioned at the center of the area. The position of the display area 361 relative to the picture 351 may be determined by an affine transformation parameter. If the display scaling factor of "0.5" is designated for a zoom-out operation of the picture corresponding to the current frame, the display area is set using the affine transformation parameter whereby the zoom components in the x and y directions are doubled. And where the display area is to be parallelly translated or rotated relative to the picture corresponding to the current frame, the position and range of the display area can be determined also by use of affine transformation parameters.

Figure 34:
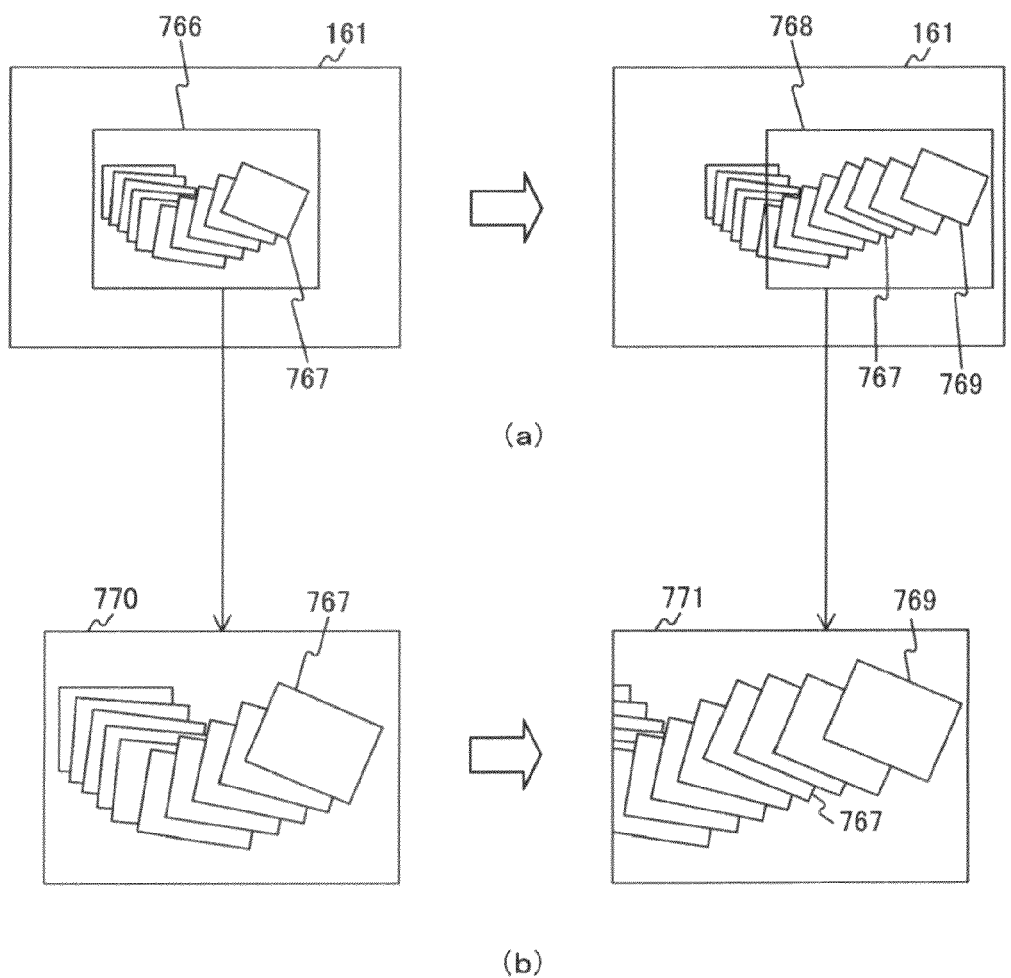
[FIG. 34]

FIG. 32(b) shows the case where a frame 2 (246), one of the frames constituting the moving picture file 241 indicated in FIG. 30(b), is held in the picture memory 161. In this case, as discussed above, a picture 352 corresponding to the frame 2 (246) is transformed using the affine transformation parameters 256 stored in the metadata file 251 in relation to the frame numbers "1" and "2" (255), and the picture 351 is overwritten with the transformed picture 352 for synthesis. In this case, for example, if the picture 352 corresponding to the current frame does not extend off the range of the display area 361, then the position and size of the display area 361 remain unchanged. Explained below in detail with reference to FIGS. 33 and 34 is a case where the picture corresponding to the current frame extends off the range of the current display area. The display area 361 may be parallelly moved or otherwise manipulated in keeping with the movement of the picture 352 relative to the picture 351.

FIG. 32(c) shows the case where a frame 3, one of the frames making up the moving picture file 241 indicated in FIG. 30(b), is held in the picture memory 161. Also in this case, as discussed above, a picture 353 corresponding to the frame 3 is transformed using the affine transformation parameters 256 stored in the metadata file 251 in relation to the frame numbers "1" through "3" (255), and the pictures 351 and 352 are overwritten with the transformed picture 353 for synthesis.

Described below in detail with reference to the drawings is a process whereby the display area is moved in keeping with the movement of the current picture.

FIG. 33 gives views showing schematically the process of moving the display area when the picture corresponding to the current frame extends off the display area. FIG. 33(a) is a view showing the relations between a plurality of pictures including a picture 760 corresponding to the current frame and held in the picture memory 161 on the one hand, and a display area 759 on the other hand. Since the current picture 760 is entirely included within the range of the display area 759 as shown in FIG. 33(a), the display section 180 displays the current picture 760 in its entirety together with other pictures.

FIG. 33(b) is a view showing the relations between a plurality of pictures including a current picture 762 held in the picture memory 161 on the one hand, and the display area 759 on the other hand. Here, the current picture 762 is a picture corresponding to the frame subsequent to the current picture 760 shown in FIG. 33(a). If the current picture 762 partially extends off the range of the display area 759 as indicated in FIG. 33(b), then part of the current picture 760 is not displayed on the display section 180. In such a case, as shown in FIG. 33(b), the display area extraction section 260 calculates a difference value 763 between one side of the display area 759 and the current picture 762 extending off the range of the display area 759. The display area 759 is then moved by the value obtained by adding an additional value 764 to the calculated difference value 763. Here, the additional value 764 may illustratively be 5 pixels. Alternatively, the display area may be moved only by the difference value to which no additional value is added. Whereas FIG. 33(b) shows the case where the current picture 762 extends off the right side of the display area 761, the same method can be used to move the display area if the current picture extends off the top side, bottom side, or left side of the display area. If the current picture extends off at least two of the top, bottom, left, and right sides of the display area, the difference value may be calculated for each of the exceeded sides, and the display area may be moved in the direction of each of the exceeded sides based on the difference values thus calculated.

FIG. 33(c) shows a display area 765 moved on the basis of the difference value 763 calculated in the state indicated in FIG. 33(b).

FIG. 34 gives views showing examples of transition in effect when the display area is moved by the process of movement indicated in FIG. 33. FIG. 34(a) shows an example of transition of the display area in the picture memory 161 when the display area is moved, and FIG. 34(b) shows an example of transition of the pictures displayed on the display section 180 when the display area is moved. As shown in these figures, even when the pictures subsequent to a current picture 767 extend off a display area 766, the display area 766 can be moved successively in keeping with the position of the current picture. For example, when a movement takes place from the picture 767 to the current picture 769 in the picture memory 161, the display area 766 is moved to the position of a display area 768 in keeping with that movement. In this case, transition is effected from a picture 770 to a picture 771 as the pictures displayed on the display section 180. In this manner, when the pictures displayed on the display section 180 are enlarged or contracted, the current picture can always be displayed in its entirety on the display section 180.

Explained below in detail with reference to the drawings is the case where the current picture corresponding to the current frame is fixed on the display section 180.

Figure 35:
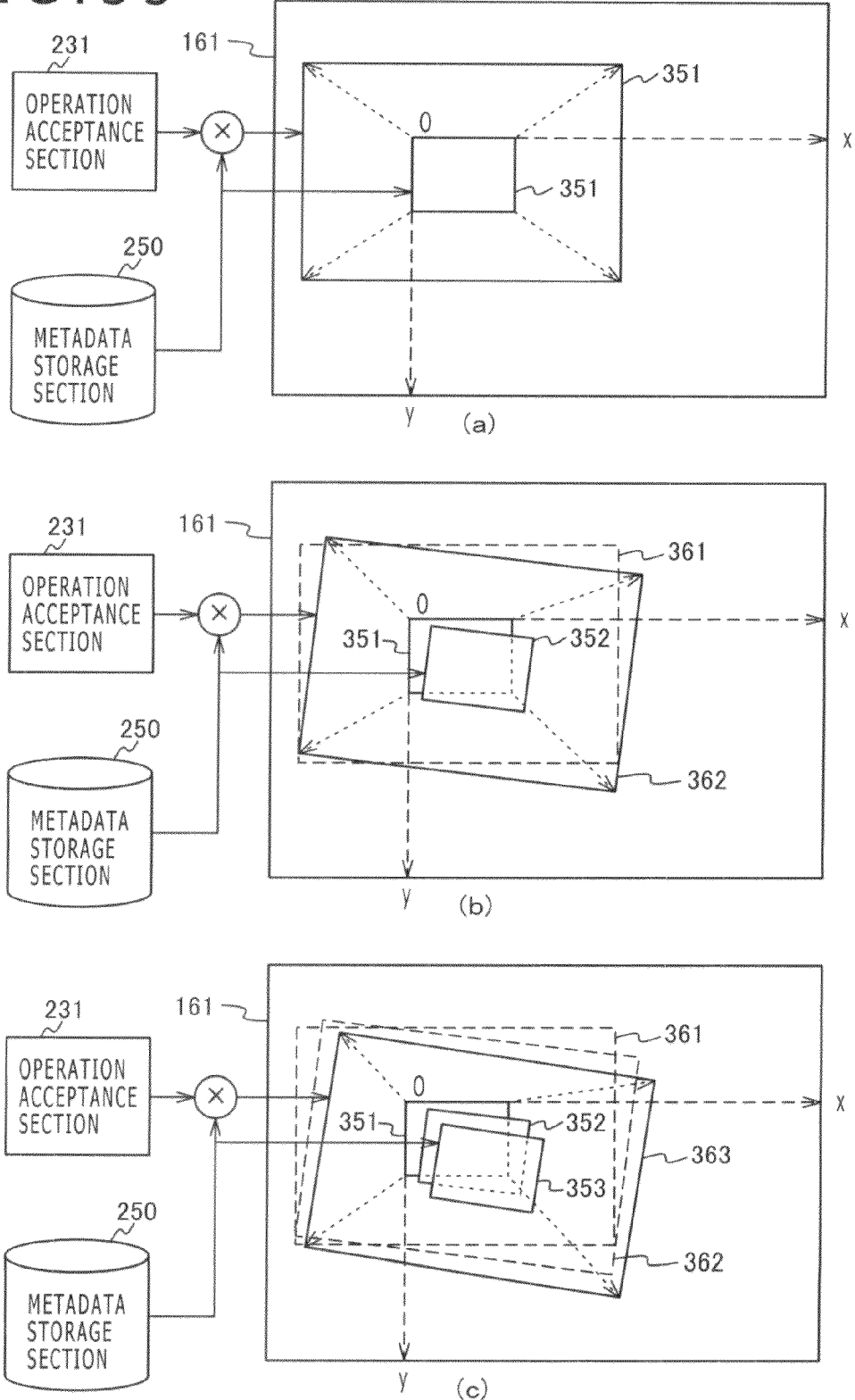
[FIG. 35]

FIG. 35 gives views showing illustratively the relations between the frames in a moving picture file stored in the moving picture storage section 240 on the one hand, and the display area on the other hand according to the embodiment of the present invention. As with FIG. 32, these views show only the picture memory 161, metadata storage section 250, and operation acceptance section 231 and the other components are omitted. Explained below is an example in which a synthesized picture is created in the picture memory 161 with regard to the frames "1" through "3" making up the moving picture file 241 shown in FIG. 30(*b*), by use of the affine transformation parameters 256 stored in the metadata file 251.

As with FIG. 32(*a*), FIG. 35(*a*) shows the case where the frame "1" (245) is held in the picture memory 161. The position and size of the picture 351 and display area 361 shown in FIG. 35(*a*) are the same as those in FIG. 32(*a*) and thus will not be further explained in detail. In this example, the display area is transformed in accordance with the transformation of the picture corresponding to the current frame, whereas the affine transformation parameter corresponding to the frame 1 (245) is a unit matrix parameter. For this reason, the display area 361 corresponding to the frame 1 (245) is determined solely in consideration of the display scaling factor designated through the operation acceptance section 231.

As with FIG. 32(*b*), FIG. 35(*b*) shows the case where the frame 2 (246) is held in the picture memory 161. In this case, as in FIG. 32(*b*), the picture 352 corresponding to the frame 2 (246) is transformed, the picture 351 is overwritten with the transformed picture 352, and the display area is affine-transformed as well. That is, with reference to the position and size of the picture 351, the picture 352 corresponding to the frame 2 (246) is transformed using the affine transformation parameters 256 stored in the metadata file 251 in relation to the frame numbers "1" and "2" (255). And the position and size of the picture 352 are transformed using the affine transformation parameter determined in accordance with the value of the display scaling factor accepted through the operation acceptance section 231. The area determined by the transformed position and size becomes a display area 362. Specifically, if it is assumed that the affine transformation parameter matrices corresponding to the frame numbers "1" and "2" (255) are represented by A1 and A2 respectively and that the affine transformation parameter matrix determined by the value of the display scaling factor accepted through the operation acceptance section 231 is denoted by B, then the value of "A1×A2×B" is obtained. And with reference to the position and size of the picture 351, the display area 362 is determined using the matrix of "A1×A2×B" thus obtained.

As with FIG. 32(*a*), FIG. 35(*c*) shows the case where the frame 3 is held in the picture memory 161. Also in this case, as discussed above, the picture 353 corresponding to the frame 3 is transformed, the pictures 351 and 352 are overwritten with the transformed picture 353 for synthesis, and the display area is affine-transformed to determine the display area 363 with regard to the picture 353. Specifically, if it is assumed that the affine transformation parameter matrices corresponding to the frame numbers "1" through "3" (255) are represented by A1 through A3 respectively and that the affine transformation parameter matrix determined by the value of the display scaling factor accepted through the operation acceptance section 231 is denoted by B, then the value of "A1×A2×A3×B" is obtained. And with reference to the position and size of the picture 351, the display area 363 is determined using the matrix of "A1×A2×A3×B" thus obtained.

Figure 36:
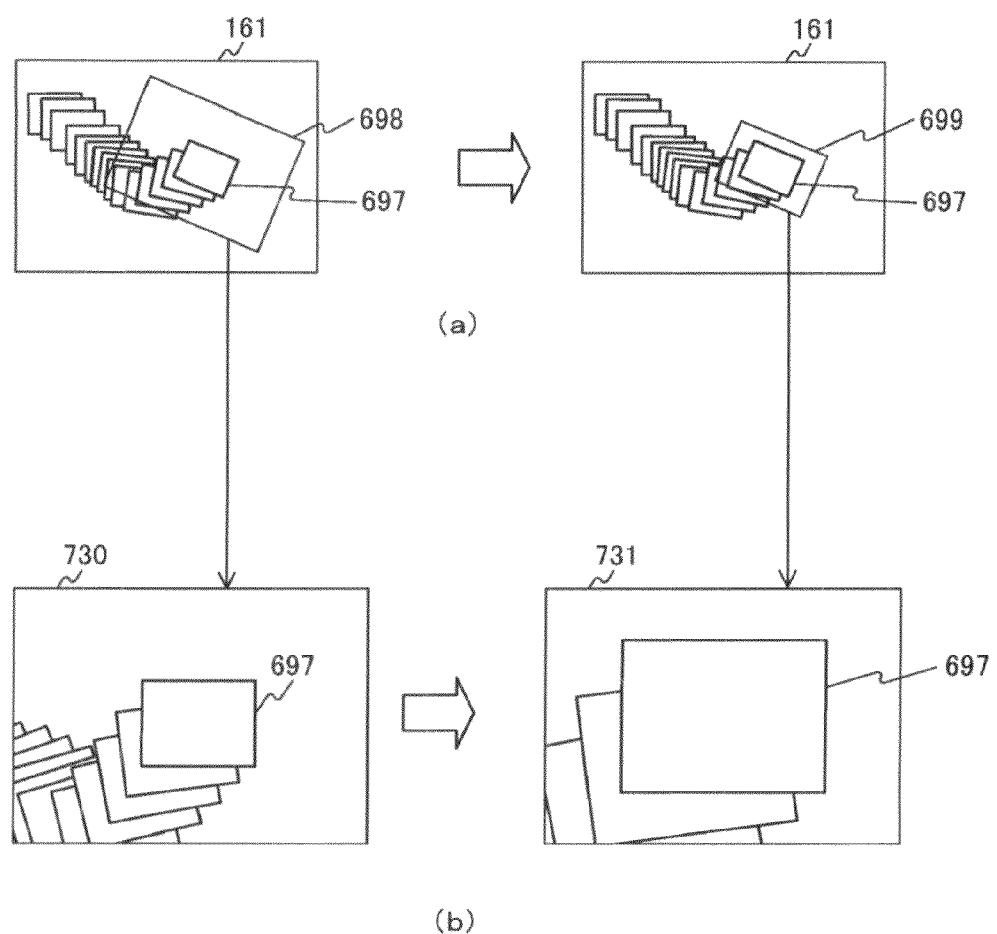
[FIG. 36]

FIG. 36 gives views outlining the method for displaying a moving picture in enlarged form on the display section 180 when the display mode is designated in which to fix the picture corresponding to the current frame on the display section 180. FIG. 36(*a*) is a view outlining the transition of the display area in effect when the moving picture displayed on the display section 180 is enlarged. FIG. 36(*b*) is a view showing a typical display in effect when the pictures within display areas 698 and 699 of FIG. 36(*a*) are displayed on the display section 180.

FIG. 36(*b*) shows a picture 730 displayed on the display section 180 following retrieval from the picture memory 161 by the display area 698 indicated in FIG. 36(*a*). If, with the picture 730 of FIG. 36(*b*) being displayed, operations are accepted through the operation acceptance section 231 to designate enlarged display, then the display area extraction section 260 reduces the size of the display area 698 in keeping with the operations to designate enlarged display. The size reduction process is carried out in a manner having the current picture 697 staying at the center of the area. That is, as described above, the position and size of the picture 679 are transformed using the affine transformation parameter determined by the value of the display scaling factor accepted through the operation acceptance section 231, and the display area 698 is determined by the transformed position and size. Since the operations to enlarge the display scaling factor have been input in this example, the zoom component of the affine transformation parameter is determined in keeping with the display scaling factor being enlarged.

Illustratively, as shown in FIG. 36(*a*), the display area 698 is reduced in size to become the display area 699. FIG. 36(*b*) shows a picture 731 displayed on the display section 180 following retrieval from the picture memory 161 by the display area 699 indicated in FIG. 36(*a*). In this manner, simply changing the size of the display area makes it possible to enlarge or contract the pictures including the one corresponding to the current frame when they are displayed.

As discussed above, the synthesized picture being reproduced can be displayed successively by displaying the pictures which exist within the range of the display area and which are placed in the picture memory 161. Here, the size reduction process or the like may be carried out when the current picture is affine-transformed and synthesized into the picture memory 161. Thus when the current picture is to be displayed in enlarged form by raising the display scaling factor, the synthesized picture including the picture corresponding to the current frame could become blurred. In such a case, the synthesized picture including the current picture being reproduced is displayed using the picture yet to be synthesized into the picture memory 161. This method of display will be explained below in detail by referring to the drawings.

Figure 37:
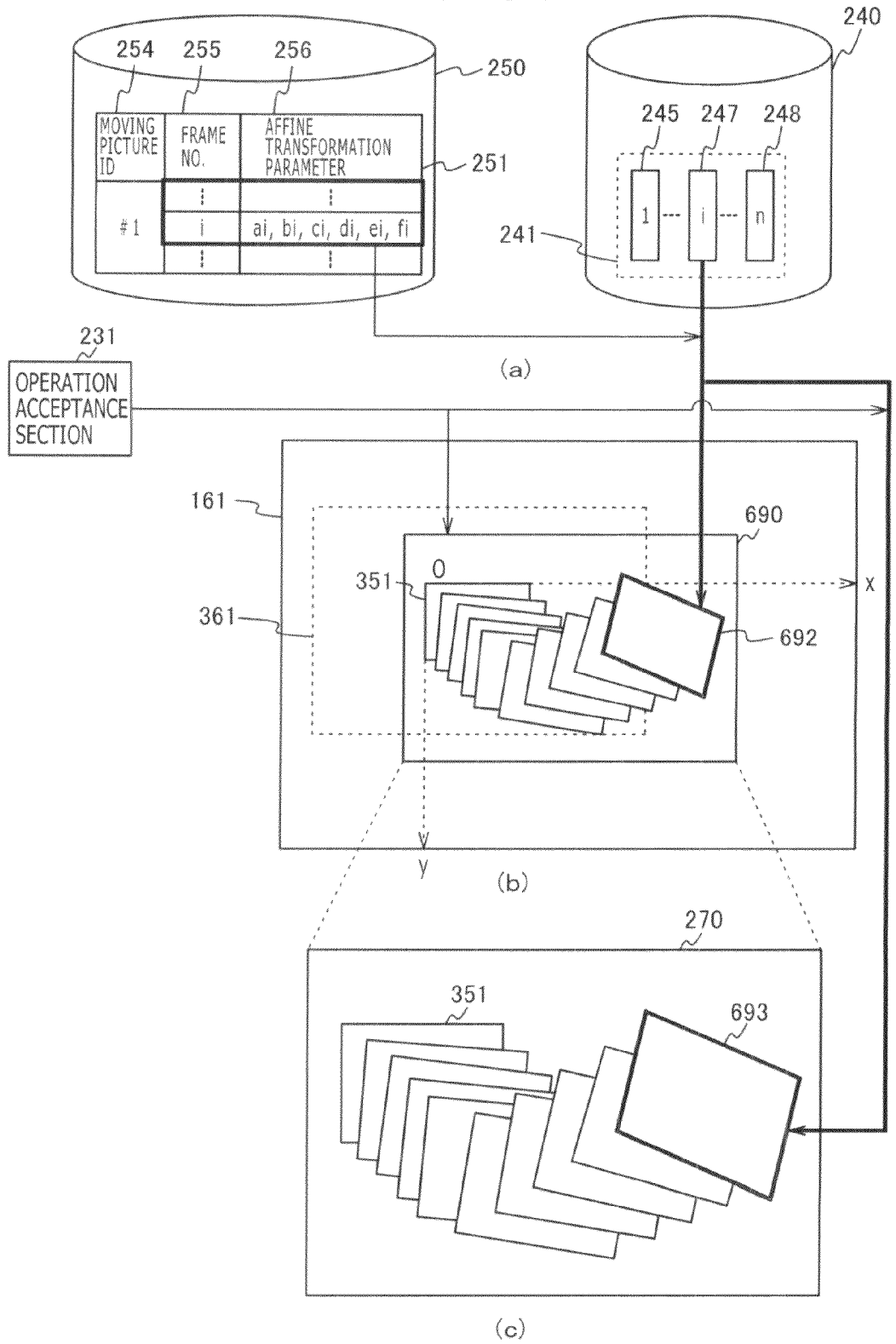
[FIG. 37]
Figure 38:
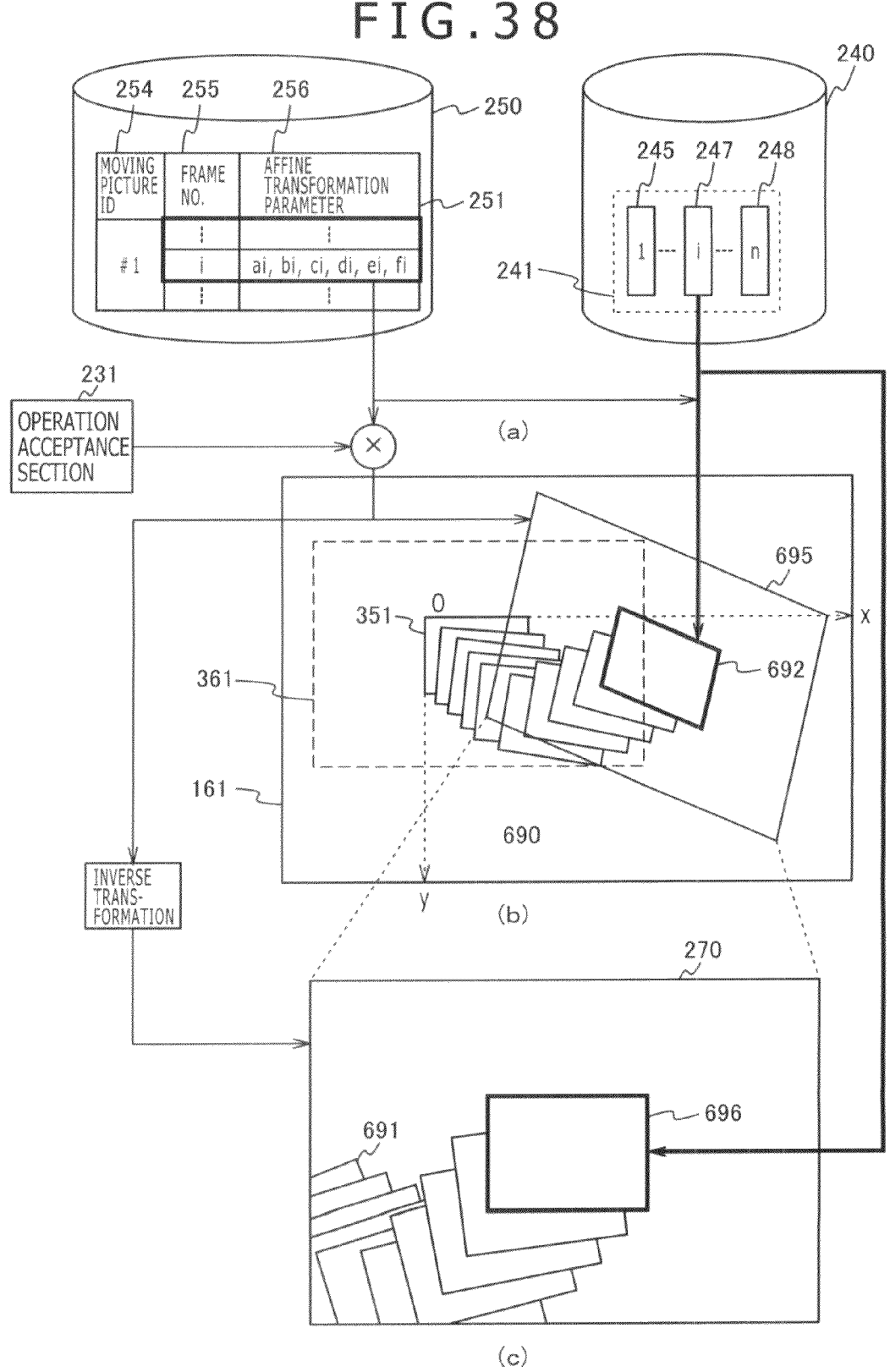
[FIG. 38]

FIGS. 37 and 38 give views showing schematically the flows of the frames of a moving picture file stored in the moving picture storage section 240 in the embodiment of the present invention. In these figures, only what is related to the moving picture storage section 240, metadata storage section 250, picture memory 161, and display memory 270 is illustrated, and the other components are omitted. FIG. 37 shows the case where the synthesized picture corresponding to the frames preceding the current frame is fixed on the display section 180, and FIG. 38 indicates the case where the picture corresponding to the current frame is fixed on the display section 180.

FIG. 37($a$) gives a simplified view of the moving picture file 241 and metadata file 251 indicated in FIG. 30($b$). What follows is an explanation of an example in which the picture corresponding to a frame i (247), one of the frames making up the moving picture file 241, is displayed. That is, it is assumed that the synthesized picture corresponding to the frames 1 through "i–1" making up the moving picture file 241 has been created. It is also assumed that the display area 361 shown in FIG. 32 has been moved to the right in keeping with the movement of the current picture.

FIG. 37($b$) gives a schematic view of the picture memory 161 retaining the synthesized picture made of the pictures corresponding to the frames making up the moving picture file 241. As shown in FIG. 32($b$), the picture 351 corresponding to the frame 1 (245) constituting the moving picture file 241 is first held in the picture memory 161. After the picture 351 is held in the picture memory 161, the pictures corresponding to the frames 2 through "i–1" constituting the moving picture file 241 are affine-transformed successively using the affine transformation parameters 256 stored in the metadata file 251 in relation to the frames 2 through "i–1," and the picture memory 161 is overwritten successively with the affine-transformed pictures; the resulting picture is held in the memory. From the synthesized picture held in the picture memory 161, the display area extraction section 260 extracts per frame the picture that exists within the display area determined in accordance with the operations input through the operation acceptance section 231 to designate display scaling factor.

While the synthesized pictures derived from the pictures corresponding to the frames 1 through "i–1" are being held in the picture memory 161, the picture corresponding to the frame (247) constituting the moving picture file 241 is affine-transformed using the values "ai, b1, ci, di, ei, fi" of the affine transformation parameter 256 stored in the metadata file 251 in relation to the frame "i," and the picture memory 161 is overwritten with an affine-transformed current picture 692 that is held in the memory. From the synthesized pictures held in the picture memory 161, the display area extraction section 260 extracts the pictures that exist within a display area 690 determined in accordance with the operations input through the operation acceptance section 231 to designate display scaling factor, and causes illustratively the display memory 270 to hold the extracted pictures as shown in FIG. 37($c$).

FIG. 37($c$) shows schematically the display memory 270 that retains the pictures extracted by the display area extraction section 260. Here, a current picture 693 corresponding to the current frame from among the pictures extracted by the display area extraction section 260 is not the current picture 692 extracted by the display area extraction section 260 from the picture memory 161 but the picture which was acquired from the moving picture storage section 240 and affine-transformed by the picture conversion section 140. Here, the location in which the current picture 693 is held in the picture memory 270 may be determined by the position and size of the current picture 692 in the picture memory 161 as well as by the position and size of the display area 690 in the picture memory 161. For example, if it is assumed that the affine transformation parameter matrices stored in the metadata file 251 in relation to the frame numbers "1" through "i" (255) are represented by A1, . . . , Ai and that the affine transformation parameter matrix for determining the display area 690 (e.g., matrix with reference to the picture memory 161) is denoted by C, then inv(C)×(A1× . . . ×Ai) may be used with reference to the position of the picture 351 in order to determine the location in which to retain the current picture 693 in the display memory 270.

As shown in FIG. 37($c$), the pictures extracted by the display area extraction section 260 are held in the picture memory 270, and the pictures extracted by the display area extraction section 260 are overwritten with the picture acquired from the moving picture storage section 240 and affine-transformed by the picture conversion section 140; the affine-transformed picture is held in the display memory 270. And the picture held in the display memory 270 is displayed on the display section 180. In this manner, a relatively clear current picture can be displayed through the use of the picture yet to be held in the picture memory 161 following contraction or other processing subsequent to affine transformation. Also, the current picture can be displayed clearly even when the picture is enlarged or otherwise manipulated by the user's operations.

FIG. 38($a$) gives a simplified view of the moving picture file 241 and metadata file 251 shown in FIG. 30($b$). The moving picture storage section 240 and metadata storage section 250 shown in FIG. 38($a$), and the synthesized pictures held in the picture memory 161 indicated in FIG. 38($b$), are the same as those in FIGS. 37($a$) and ($b$) and thus will not be discussed further.

FIG. 38($b$) shows schematically the picture memory 161 holding the synthesized pictures ranging from the picture 351 to the current picture 692 shown in FIG. 37($b$), and indicates by broken lines the display area 361 shown in FIG. 35($b$). In this example, as shown in FIG. 35, the display area is calculated through affine transformations in keeping with the current picture 692 so as to fix the position of the picture corresponding to the current frame on the display section 180. That is, with reference to the picture 351 corresponding to the current frame, the picture corresponding to the frame i (247) is transformed into the picture 692 using the affine transformation parameters 256 stored in the metadata file 251 in relation to the frame numbers "1" through "i" (255), and the transformed picture 692 is held in the picture memory 161. And as for a display area 695 corresponding to the frame i (247), the display area 692 is determined by the position and size of the picture 692 transformed using the affine transformation parameter determined by the value of the display scaling factor accepted through the operation acceptance section 231. The determination of the display area is accomplished by the display area extraction section 260.

FIG. 38($c$) shows schematically the display memory 270 holding the pictures extracted by the display area extraction section 260. Here, the pictures held in the display memory 270 (i.e., pictures other than a current picture 696) are the pictures which were extracted by the display area extraction section 260 (i.e., pictures found within the range of the display area 695) and transformed using the inverse matrix of the affine transformation parameter matrix used to transform the display area 695. That is, the display area placed in the picture memory 161 could be shaped into a parallelogram through affine transformation. In order to get the display section 180 to display the synthesized pictures within the display area thus affine-transformed, the synthesized pictures within the display area are transformed using the inverse matrix of the affine transformation parameter matrix used to affine-transform the current picture. For example, if it is assumed that the affine transformation parameter matrices stored in the metadata file 251 in relation to the frame numbers "1" through "i" (255) are represented by A1, . . . , Ai and that the affine transformation parameter matrix for determining the display area 695 (e.g., matrix with reference to the picture corresponding to the current frame) is designated by B, then inv (A1× . . . ×Ai×B) is used as the matrix for transforming the synthesized pictures in the display area. In this manner, as shown illustratively in FIG. 38(c), the picture transformed into a parallelogram can be further transformed into a rectangle that can be displayed on the display section 180. And the picture 696 corresponding to the current frame from among the pictures extracted by the display area extraction section 260 is not the picture extracted by the display area extraction section 260 from the picture memory 161 but the picture yet to be affine-transformed following acquisition from the moving picture storage section 240. Here, the location in which the picture 696 is held in the display memory 270 and the size of that picture 696 in the memory 270 are determined by the display scaling factor coming from the operation acceptance section 231.

As shown in FIG. 38(c), the pictures extracted by the display area extraction section 260 are held in the display memory 270, and the pictures extracted by the display area extraction section 260 are overwritten with the picture acquired from the moving picture storage section 240; the acquired picture is held in the display memory 270. In this manner, where the display mode is designated in which to display the picture corresponding to the current frame in a fixed position, the affine-transformed synthesized pictures may be reverted to the state yet to be affine-transformed for display purposes through the use of reverse matrices. Also, the picture corresponding to the current frame can be displayed in a relatively clear manner as in the case of FIG. 37.

As described above, the synthesized pictures to be held in the picture memory 161 can be created by a single method for reproducing a moving picture in one of two display modes, so that the two display modes can be changed from one to the other during moving picture reproduction. It follows that while viewing a moving picture being reproduced, the viewer can switch to a desired display mode. For example, suppose that during moving picture reproduction in the display mode shown in FIG. 37, a favorite personality appears in the middle of the current picture so that it is desired to position that personality at the center of the display section 180 for viewing purposes. In that case, display mode changing operations accepted through the operation acceptance section 231 can switch the moving picture reproduction to the display mode shown in FIG. 38. And since the current picture can be the picture that was affine-transformed following acquisition from the moving picture storage section 240 instead of the synthesized picture held in the picture memory 161, relatively clear pictures can be viewed.

Figure 39:
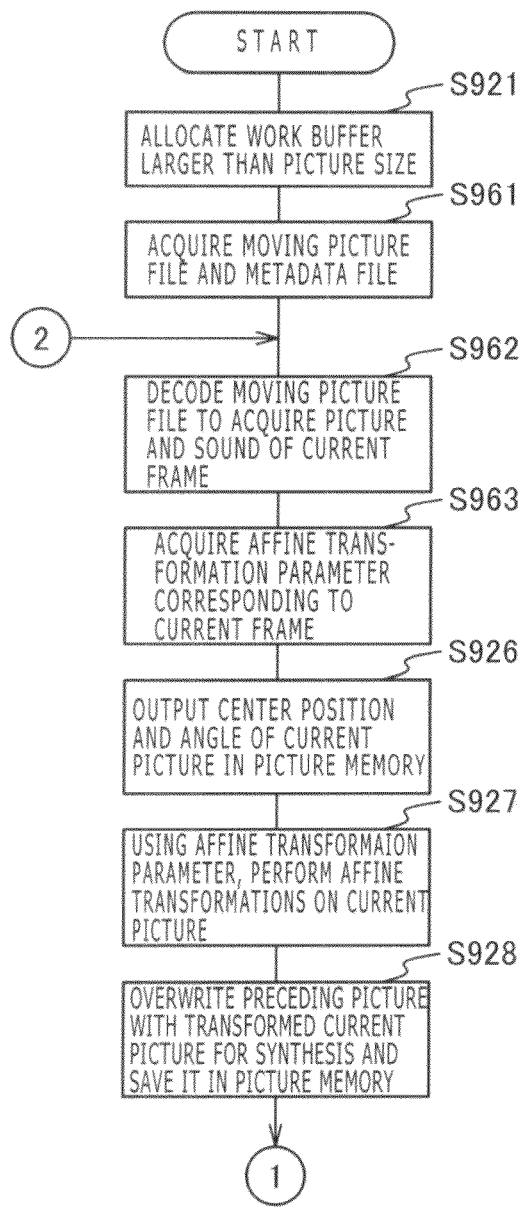
[FIG. 39]
Figure 40:
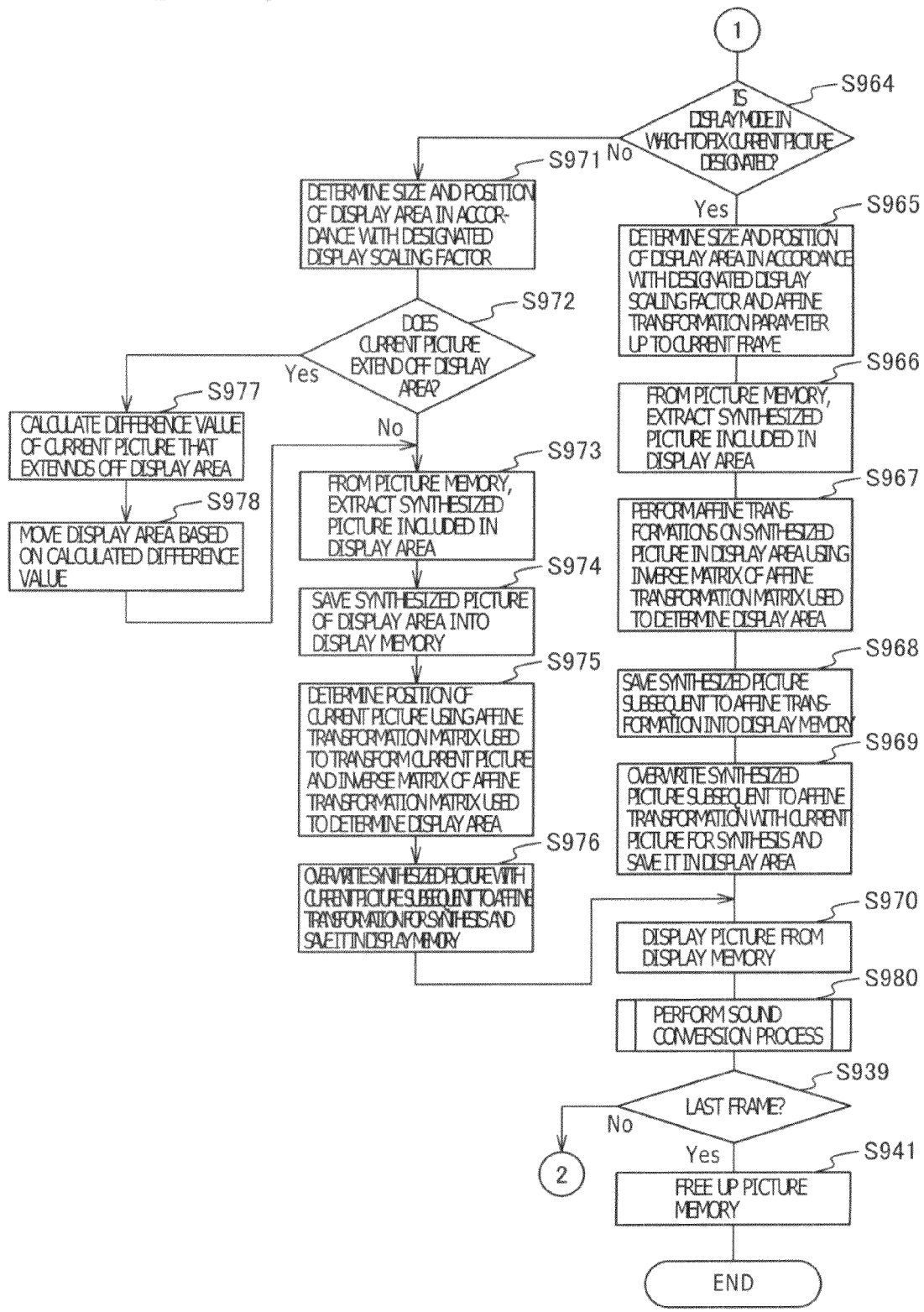
[FIG. 40]

FIGS. 39 and 40 are flowcharts showing the steps constituting the moving picture reproduction process performed by the picture processing apparatus 680 as the embodiment of the present invention. Of the steps shown in FIGS. 39 through 41, steps S921, S926, S927, S928, S939 and S941 are the same as those in FIG. 27 so that they will be designated by like reference characters but will not be discussed further.

In response to the operations input through the operation acceptance section 231, the content acquisition section 120 acquires the moving picture file stored in the moving picture storage section 240, along with the metadata file associated with this moving picture file and stored in the metadata storage section 250 (step S961). Then the content acquisition section 120 decodes the moving picture file and acquires therefrom the picture of the current frame constituting the moving picture file and the sound corresponding to the picture (step S962). Then the content acquisition section 120 acquires from the metadata file the affine transformation parameter corresponding to the acquired current frame (step S963).

Then the synthesized picture is overwritten with the affine-transformed picture corresponding to the current frame, and the resulting picture is held in the picture memory 161 (step S928). Thereafter, the display area extraction section 260 determines whether the display mode is designated in which to fix the picture corresponding to the current frame (step S964). If the display mode is designated in which to fix the picture corresponding to the current frame, the display area extraction section 260 determines the position and size of the display area using the affine transformation parameters ranging from the first frame to the current frame and the affine transformation parameter corresponding to the display scaling factor in effect (step S965). Then the display area extraction section 260 extracts the synthesized picture included in the display area from the picture memory 161 (step S966). Then the display area extraction section 260 affine-transforms the synthesized picture extracted from the picture memory 161 by use of the inverse matrix of the affine transformation parameter matrix used to determine the display area (step S967).

Then the display area extraction section 260 saves the synthesized picture extracted from the picture memory 161 and affine-transformed into the display memory 270 (step S968). Then the picture synthesis section 151 overwrites the synthesized picture held in the display memory 270 with the current picture for synthesis (step S969). Then the display section 180 displays the synthesized picture held in the picture memory 270 (step S970). Then the sound conversion process is carried out (step S980).

If in step S964 the display mode in which to fix the picture corresponding to the current frame is not found designated, the display area extraction section 260 determines the position and size of the display area using the affine transformation parameter corresponding to the scaling factor (step S971). If the display area is found to have moved in keeping with the transformation of the current picture, the position of the proximately moved display area may be used instead.

Then the display area extraction section 260 determines whether the current picture held in the picture memory 161 extends off the display area (step S972). If the picture held in the picture memory 161 and corresponding to the current frame is not found extending off the display area (i.e., the entire current picture is included within the range of the display area), the display area extraction section 260 extracts the synthesized picture included in the display area from the picture memory 161 (step S973). Then the display area extraction section 260 saves the synthesized picture extracted from the picture memory 161 into the display memory 270 (step S974).

Then the display area extraction section 260 determines the location of the picture corresponding to the current frame in the display memory 270 using the affine transformation parameter matrix used to transform the picture corresponding to the current frame, and the inverse matrix of the affine transformation parameter matrix used to determine the display area (step S975). Then the picture synthesis section 151 overwrites the synthesized picture held in the display memory 270 with the picture corresponding to the current frame for synthesis (step S976). Step S970 is then reached.

If in step S972 the current picture held in the picture memory 161 is found extending off the display area (i.e., at least part of the current picture is not included in the range of the display area), the display area extraction section 260 calculates the difference value between one side of the display area and the current picture extending off the display area (step S977). Then the display area extraction section 260 moves the display area based on the calculated difference value (step S978). Step S973 is then reached.

Figure 41:
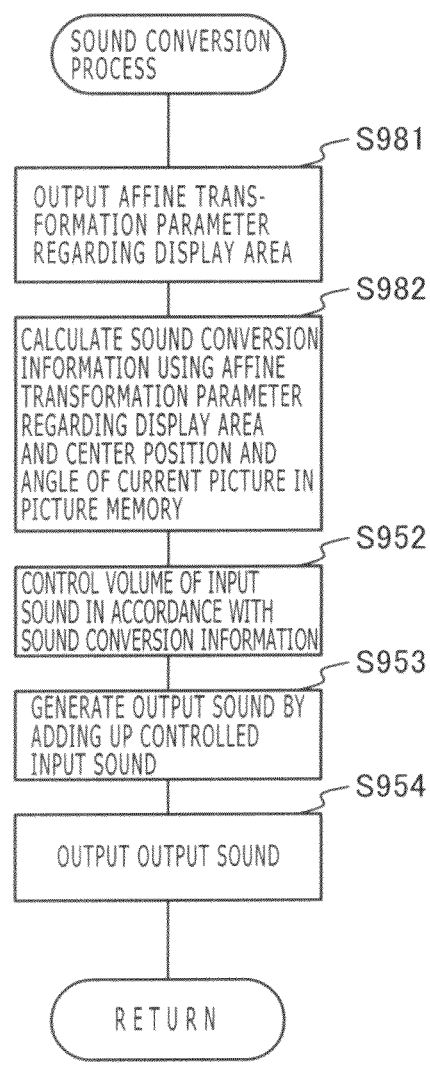
[FIG. 41]

FIG. 41 is a flowchart showing the typical steps constituting the sound conversion process (i.e., procedure in step S980) performed by the picture processing apparatus 680 as the embodiment of the present invention. Of the steps shown here, steps S952, S953 and S954 are the same as those shown in FIG. 28 so that they will be designated by like reference characters but will not be discussed further.

First, the display area extraction section 260 outputs the affine transformation parameter regarding the current display area with reference to the area of the picture memory 161 (step S981). Sound conversion information is calculated using the affine transformation parameter regarding the display area and by use of the center position, angle, and scaling factor of the picture corresponding to the current frame and output by the picture conversion section 140 (step S982).

Explained next with reference to the drawings is a third variation of the embodiment of the present invention.

Figure 42:
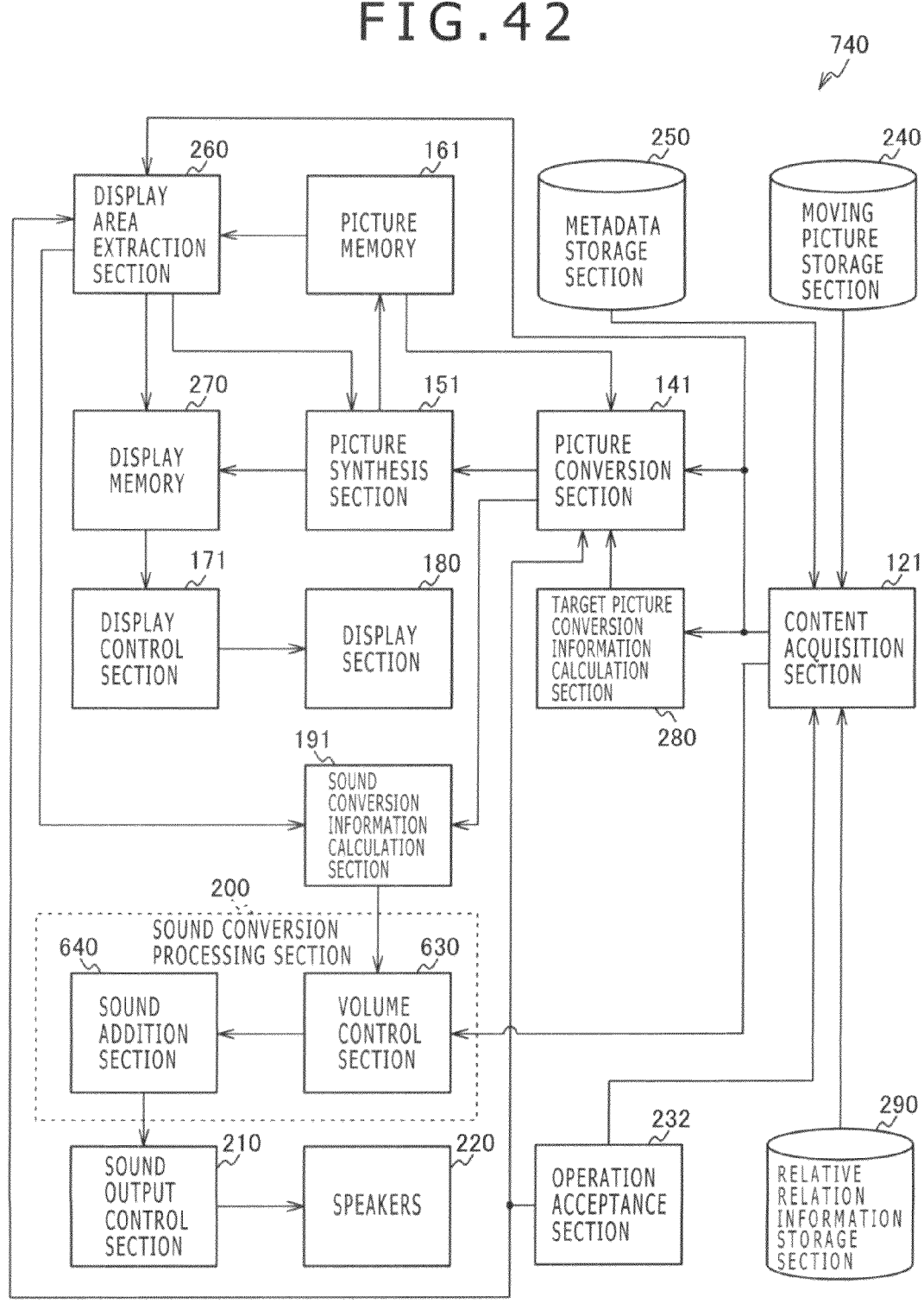
[FIG. 42]

FIG. 42 is a block diagram showing a typical functional structure of the picture processing apparatus 740 as an embodiment of the present invention. Here, the picture processing apparatus 740 is a partially modified variation of the picture processing apparatus 680 shown in FIG. 31. The picture processing apparatus 740 is implemented by supplementing the functional structure of the picture processing apparatus 680 in FIG. 31 with a target picture conversion information calculation section 280 and a relative relation information storage section 290 and by replacing the content acquisition section 120, picture conversion section 140, volume control section 201, and sound addition section 202 with a content acquisition section 121, a picture conversion section 141, a volume control section 630, and a sound addition section 640 respectively. This structure allows the picture processing apparatus 740 to convert sound in relation to a plurality of moving pictures which are being reproduced on a single display screen. The configuration of the moving picture storage section 240, metadata storage section 250, picture synthesis section 151, sound conversion information calculation section 191, sound output control section 210, and speakers 220 are the same as those of the picture processing apparatus shown in FIG. 31 and thus will not be discussed further.

In response to the input operations accepted through the operation acceptance section 232, the content acquisition section 121 acquires one or a plurality of moving picture files stored in the moving picture storage section 240, metadata files stored in the metadata storage section 250 in relation to these moving picture files, and at least one relative relation metadata file stored in the relative relation information storage section 290 in common relation to these moving pictures files, and supplies the information of the acquired files to the relevant sections. Specifically, if the operation acceptance section 232 accepts input operations to designate a multiple moving picture synthesis and reproduction mode in which a plurality of moving pictures are reproduced while being synthesized, then the content acquisition section 121 acquires a plurality of moving picture files stored in the moving picture storage section 240, metadata files stored in the metadata storage section 250 in relation to these moving picture files, and a relative relation metadata file stored in the relative relation information storage section 290 in common relation to these moving picture files; and outputs the moving pictures of the acquired moving picture files and the affine transformation parameters of the metadata files to the picture conversion section 141. Also, the content acquisition section 121 outputs what is contained in the acquired metadata files and relative relation metadata file to the target picture conversion information calculation section 280. And the content acquisition section 121 has the function of the content acquisition section 120. The function of the content acquisition section 120 is the same as that discussed above and thus will not be described further.

The picture conversion section 141 performs affine transformations per frame on the pictures making up the moving pictures of the moving picture files output by the content acquisition section 121, using the affine transformation parameters corresponding to the pictures. The picture conversion section 141 outputs the affine-transformed pictures to the picture synthesis section 151. Here, if the multiple moving picture synthesis and reproduction mode is designated, the picture conversion section 141 regards one of the multiple moving pictures targeted for reproduction as a reference moving picture, and performs affine transformations per frame on the reference moving picture using the affine transformation parameters corresponding to the pictures making up the reference moving picture. On the other hand, the picture conversion section 141 performs affine transformations per frame on the multiple moving pictures other than the reference moving picture targeted for reproduction, using the target picture conversion information (affine transformation parameters) calculated by the target picture conversion information calculation section 280, and the affine transformation parameters corresponding to the pictures making up the moving pictures. Also, the picture conversion section 141 has the function of the picture conversion section 140. The function of the picture conversion section 140 is the same as that discussed above and thus will not be described further. Another method for converting moving pictures will be discussed later in detail in reference to FIG. 44 and other drawings.

The operation acceptance section 232 has a variety of input keys. After accepting the operations input through these keys, the operation acceptance section 232 outputs what is contained in the input operations to the content acquisition section 121, picture conversion section 141, or display area extraction section 260. Illustratively, the operation acceptance section 232 includes an operation selection key for selecting a desired moving picture from one or a plurality of moving picture files stored in the moving picture storage section 240, a reproduction designation key for designating ordinary moving picture reproduction, a stop key for stopping the moving picture being reproduced, a display scaling factor designation key for designating the display scaling factor of the moving picture, and a multiple moving picture synthesis and reproduction setting key for setting the multiple moving picture synthesis and reproduction mode. Each of these keys may be assigned a plurality of functions. Also, at least part of the operation acceptance section 232 and the display section 180 may be integrated into a touch-sensitive panel.

Where the multiple moving picture synthesis and reproduction mode is designated, the target picture conversion information calculation section 280 regards at least one picture constituting one of the multiple moving pictures targeted for reproduction as a reference picture and the pictures making up the other moving pictures as target pictures based on the affine transformation parameters in the metadata files and relative relation metadata file output by the content acquisition section 121, and calculates target picture conversion information for use in transforming the target pictures. And the calculated target picture conversion information is output to the picture conversion section 141. Illustratively, the reference picture of a given moving picture may be the picture corresponding to the first frame from among the pictures making up the moving picture in question. And the target picture conversion information is typically made of the affine transformation parameters used to transform the target pictures with regard to the reference picture.

Figure 43:
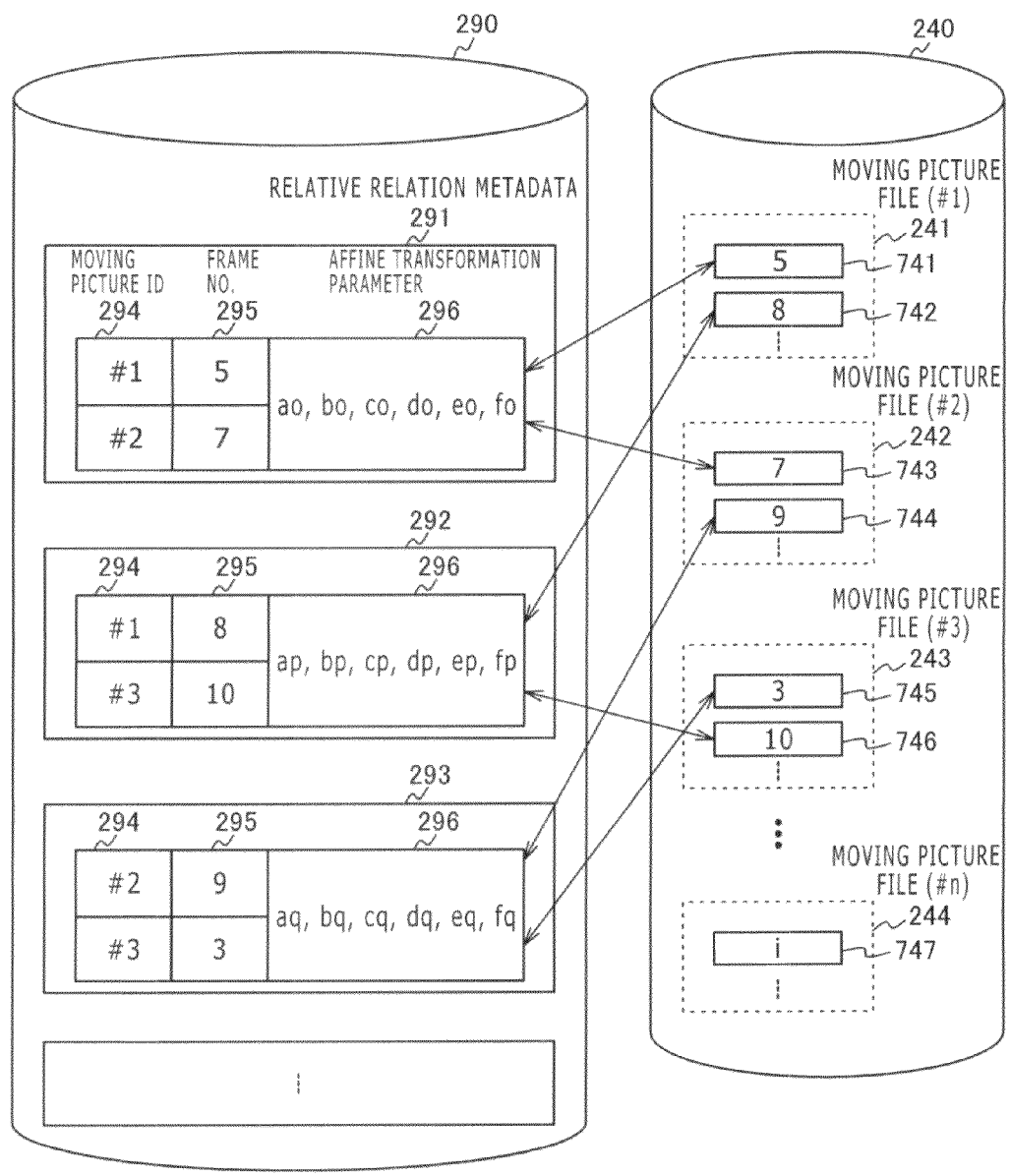
[FIG. 43]

FIG. 43 is a view schematically showing files recorded in the moving picture storage section 240 and in the relative relation information storage section 290 in the embodiment of the present invention. Shown schematically in this example are the moving picture files 241 through 244 stored in the moving picture storage section 240 and relative relation metadata files 291 through 293 stored in the relative relation information storage section 290 in relation to the moving picture files 241 through 244. Explained in this example is how frames "5" 741 and "8" 742 making up the moving picture file (#1) 241, frames "7" 743 and "9" 744 making up the moving picture file (#2) 242, and frames "3" 745 and "10" 746 making up the moving picture file (#3) 243 are stored in relation to the relative relation metadata files 291 through 293 stored in the relative relation information storage section 290. The moving picture files stored in the moving picture storage section 240 are the same as those shown in FIG. 30 and thus will not be discussed further.

Moving picture IDs 294, frame numbers 295, and affine transformation parameters 296 are stored in relation to one another in the relative relation metadata files 291 through 293, respectively.

The moving picture IDs 294 are attached to two moving picture files corresponding to two pictures having at least three points of coincidence therebetween. For example, "#1" attached to the moving picture file 241 and "2" attached to the moving picture file 242 are stored in the relative relation metadata file 291.

The frame numbers 295 are serial numbers for two frames corresponding to two pictures having at least three points of coincidence therebetween. For example, the frame number "5" of the frame constituting the moving picture of the moving picture file 241 and the frame number "7" of the frame constituting the moving picture of the moving picture file 242 are stored in the relative relation metadata file 291.

The affine transformation parameters 296 are calculated regarding at least two pictures corresponding to the moving picture IDs 294 and frame numbers 295. For example, the relative relation metadata file 291 contains the affine transformation parameter of "ao, bo, co, do, eo, fo" corresponding to the frame "5" constituting the moving picture of the moving picture file 241 and to the frame "7" constituting the moving picture of the moving picture file 242. For this variation of the present invention, it is assumed that the affine transformation parameter 296 applies when, of the two pictures corresponding to two moving picture IDs 294 and two frame numbers 295, the picture corresponding to the lower-tier frame number in FIG. 43 is regarded as the reference picture and the picture corresponding to the upper-tier frame number as the target picture. For example, the affine transformation parameters 296 contained in the relative relation metadata file 291 are the affine transfer motion parameters for the frame "5" (741) constituting the moving picture of the moving picture file (#1) 241 and for the frame "7" (743) constituting the moving picture of the moving picture file (#2) 242.

Figure 44:
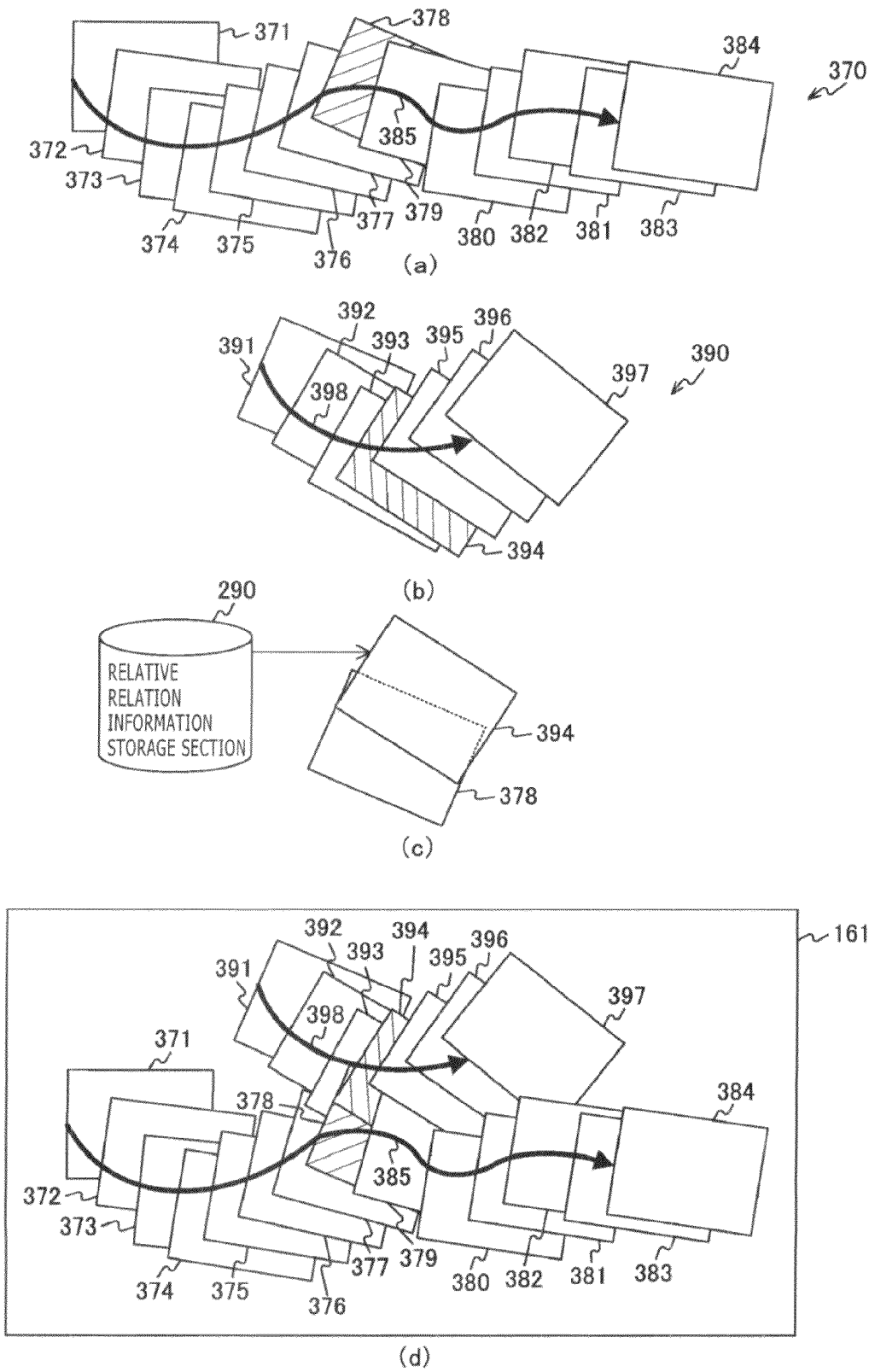
[FIG. 44]

FIG. 44 gives views showing schematically examples of synthesizing two moving pictures. Explained in these examples is how to synthesize pictures 371 through 384 making up a moving picture 370 as well as pictures 391 through 397 making up a moving picture 390. The pictures 378 and 394 with their inside shown shaded are assumed to correspond to the frame numbers contained in the relative relation metadata about the moving pictures 370 and 390.

FIG. 44(*a*) shows the case where the pictures 371 through 384 making up the moving picture 370 are affine-transformed successively using the affine transformation parameters stored in relation to the corresponding frames and are synthesized into the picture memory 161. For example, the picture 371 corresponding to the first frame is first held in the picture memory 161. And the pictures 372 through 384 are affine-transformed successively with reference to the picture 371 and synthesized into the picture memory 161. The flow of the current pictures resulting from the affine transformations is indicated by an arrow 385. That is, the pictures 371 through 384 are synthesized successively along the arrow 385.

FIG. 44(*b*) shows the case where the pictures 391 through 397 making up the moving picture 390 are affine-transformed successively using the affine transformation parameters stored in relation to the corresponding frames and synthesized into the picture memory 161. FIG. 44(*c*) shows relative positional relations between the pictures 378 and 394 resulting from the affine transformations performed on the picture 394 with the picture 391 regarded as the reference picture using the affine transformation parameters included in the relative relation metadata regarding the moving pictures 370 and 390. Here, the synthesized picture shown in FIG. 44(*b*) results from the pictures 391 through 397 synthesized with the relative positional relations between the pictures 378 and 394 in FIG. 44(*c*) regarded as the reference. The flow of the current pictures derived from the affine transformations is indicated by an arrow 398. That is, the pictures 391 through 397 are synthesized successively along the arrow 398. FIG. 44(*d*) shows an example in which the synthesized pictures in FIGS. 44(*a*) and 44(*b*) are synthesized, with the relative positional relations between the pictures 378 and 384 in FIG. 44(*c*) regarded as the reference as described above. The example of FIG. 44(*d*) shows that the pictures 378 and 394 are reproduced simultaneously and that the moving picture 370 is overwritten with the moving picture 390 with regard to the pictures reproduced simultaneously.

Below is an explanation of the calculations about specific positions in which to hold moving pictures. First, the position of at least one of the moving pictures making up one of a plurality of moving pictures is determined. For example, the position of the picture 371 corresponding to the first frame making up the moving picture 370 is determined. That determined position may be either designated by the user operating the operation acceptance section 232 or determined by use of the position obtained through the above-described calculations. Then the position in which to hold at least one of the pictures making up another moving pictures is calculated. For example, suppose that the affine transformation parameter matrices related to the frames corresponding to the pictures 371 through 384 are represented by A1 through A14; that the affine transformation parameter matrices related to the frames corresponding to the pictures 391 through 397 are denoted by B1 through B7; that the affine transformation parameter matrix of the relative relation metadata stored in relation to the moving pictures 370 and 390 is indicated by C1; and that the reference picture is the picture 371. In this case, with reference to the position in which to hold the picture 371 in the picture memory 161, the location in which to hold the picture 378 is calculation by multiplication of A1 through A8, i.e., by use of A1× . . . ×A8. And with reference to the position in which to hold the picture 371 in the picture memory 161, the position in which to hold the picture 394 is calculated by multiplication of A1 through A8 and C1, i.e., by use of A1× . . . ×A8×C1. Here, the position in which to hold the picture 391 corresponding to the first frame of the moving picture 390 may illustratively be calculated by multiplication of A1 through A8 and C1 and of the inverse matrix of B1 through B4, i.e., by use of "A1× . . . ×A8×C1×Inv(B1× . . . ×B4)" for calculating the position in which to hold the picture 391. Also, the positions in which to hold the other pictures constituting the moving picture 390 may each be calculated likewise using A1 through A8 and C1, and the inverse matrix of B1 through B4 or B5 through B7.

And the pictures making up the moving pictures other than the moving picture containing the reference picture are affine-transformed using the matrices utilized for calculating the position in which to hold the picture corresponding to the first frame, and the affine transformation parameters related to the pictures. For example, if the picture 392 in the moving picture 390 is to be affine-transformed, the matrix B2 corresponding to the picture 392 is used for the transformation involving the matrix of "A1× . . . ×A8×C1×Inv(B3×B4)." As another example, a picture 523 in the moving picture 390 is likewise affine-transformed using the matrix of "A1× . . . ×A8×C1×Inv(B4)." In like manner, each of the pictures in the moving picture 390 is transformed.

As described above, when a plurality of moving pictures are synthesized and reproduced, the position and size of the reference picture in the picture memory 161 regarding a given moving picture may be initially determined. Then the position and size of each of the other pictures may be calculated using the metadata files related to each of the moving pictures and relative relation metadata file related to the moving pictures. Thus, this makes it possible, where a plurality of moving pictures are synthesized and reproduced, to start the reproduction from any position in any moving picture. For example, the example of FIG. 44(d) shows that in the picture memory 161, the pictures 371 through 374 making up the moving picture 370 are first synthesized followed by synthesis of the picture 391 constituting the moving picture 390. That is, the pictures 375 and 391 are synthesized simultaneously, followed by the pictures 376 and 392 being synthesized simultaneously. This also applies to the following pictures. Although this example shows that the moving picture 370 is overwritten with the moving picture 390 with regard to the pictures being reproduced simultaneously, the operation acceptance section 230 may be operated to designate a desired moving picture with which to overwrite another moving picture.

Explained below is the sound conversion process performed by the picture processing apparatus 740 as the embodiment of the present invention.

Figure 45:
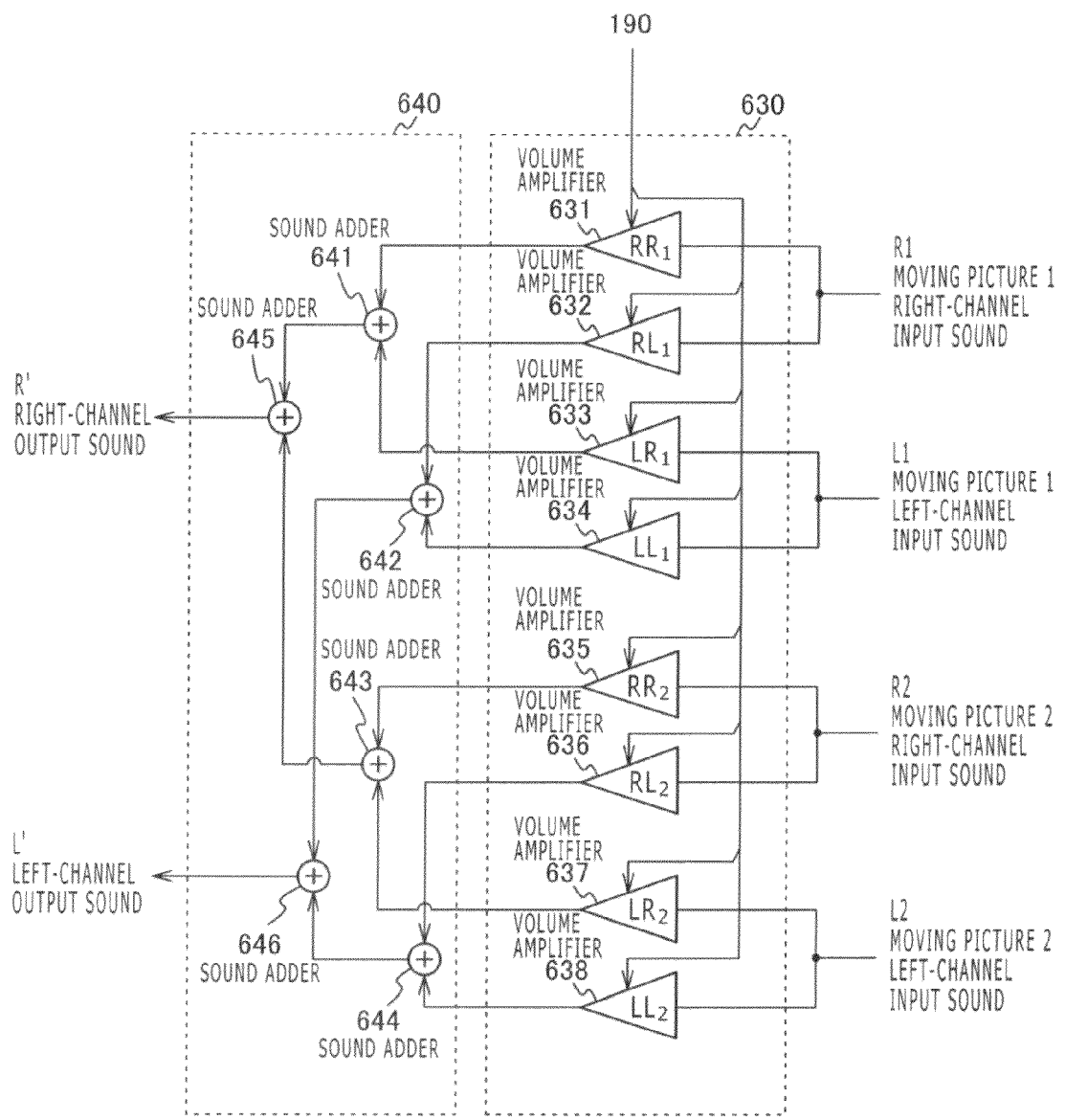
[FIG. 45]

FIG. 45 is a block diagram showing a typical structure of the sound conversion processing section 200 in the picture processing apparatus 740 as the embodiment of the present invention. Explained hereunder is a typical conversion process whereby, when a first moving picture and a second moving picture are reproduced simultaneously, the output sound of the right and the left channels is generated. It is assumed that the input sound of the first and the second moving pictures is constituted by the right and the left channels. Thus the functions of the sound conversion processing section 200 with its volume control section 630 and its sound addition section 640 replacing respectively the volume control section 201 and sound addition section 202 in FIG. 31 will be explained below. The basic structure of the section 200 is the same as that shown in FIG. 17 and thus will be mentioned briefly hereunder.

The volume control section 630 has volume amplifiers 631 through 638. The volume amplifiers 631 through 634 amplify the input sound of the right and the left channels of the first moving picture based on sound conversion information $RR_1$, $RL_1$, $LR_1$ and $LL_1$ regarding the first moving picture and supplied by the sound conversion information calculation section 191. The volume amplifiers 635 through 638 amplify the input sound of the right and the left channels of the second moving picture based on sound conversion information $RR_2$, $RL_2$, $LR_2$ and $LL_2$ regarding the second moving picture and supplied by the sound conversion information calculation section 191.

The sound addition section 640 has sound adders 641 through 646. The sound adders 641 and 642 add up the input sound of the right and the left channels of the first moving picture. The sound adders 643 and 644 add up the input sound of the right and the left channels of the second moving picture. The sound adder 645 adds up the output sound of the right channel of the first and the second moving pictures. The sound adder 646 adds up the output sound of the left channel of the first and the second moving pictures.

Figure 46:
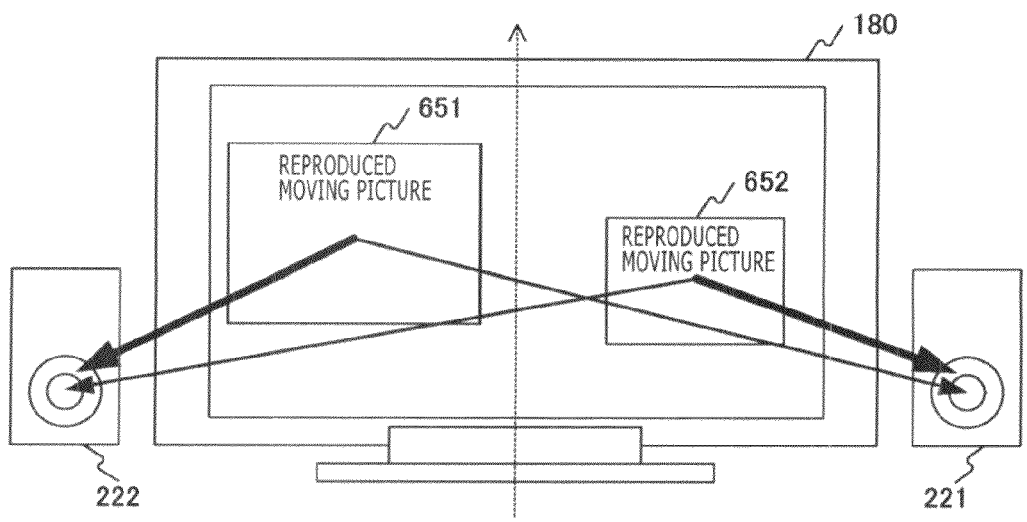
[FIG. 46]

FIG. 46 is a view showing an example of the sound conversion process performed when two moving pictures are reproduced simultaneously by the picture processing apparatus 740 as the embodiment of the present invention. The example of FIG. 46 shows that two reproduced moving pictures 651 and 652 are displayed on the display screen of the display section 180. In this case, as discussed above, the output sound is first generated by converting the input sound of each of the channels in keeping with the center position, angle, or scaling factor of the picture corresponding to the current frame for the reproduced moving pictures 651 and 652. The output sound regarding the reproduced moving picture 651 and 652 is then added up on each of the same channels before being output to the right speaker 221 and left speaker 222. And the relational expressions regarding the output sound thus generated are given as follows:

$$R'=(R1'+R2')/2$$

$$L'=(L1'+L2')/2$$

where, $R1'=R1 \cdot RR_1+L1 \cdot LR_1$, $L1'=R1 \cdot RL_1+L1 \cdot LL_1$, $R2'=R2 \cdot RR_2+L2 \cdot LR_2$, and $L2'=R2 \cdot RL_2+L2 \cdot LL_2$. R1 and L1 stand for the input sound of the right and the left channels of the first moving picture, and R2 and L2 represent the input sound of the right and the left channels of the second moving picture. $RR_1$, $RL_1$, $LR_1$ and $LL_1$ correspond to the sound conversion information about the first moving picture, and $RR_2$, $RL_2$, $LR_2$ and $LL_2$ correspond to the sound conversion information about the second moving picture.

The typical steps constituting the sound conversion process performed by the picture processing apparatus 740 as the embodiment of the present invention are the same as those discussed above except that in step S982, the output sound of the multiple moving pictures is added up on each of the same channels. The remaining steps of the process are the same and thus will not be described further.

Described above was the example in which sound is converted based on the motion information about moving pictures. However, the embodiment of the present invention can also be applied to cases where sound is converted based on information other than motion information about moving pictures. As an example of such application, a fourth variation of the embodiment of the present invention will be explained below by referring to the drawings. In the ensuing description, only the functions of the content acquisition section 120 and picture conversion section 140 shown in FIG. 1 will be explained; the other structures are the same as those functions discussed above and thus will not be explained further.

The content acquisition section 120 acquires template information indicative of the display area of moving pictures on the display section 180. The template information defines the display area for displaying diverse information on the display screen. Illustratively, a moving picture display area for displaying moving pictures and a character display area for displaying characters in text form are defined.

The picture conversion section 140 converts pictures based on the template information output by the content acquisition section 120. That is, this conversion is designed to display a moving picture in the display area on the display screen as defined by the template information. And the picture conversion section 140 outputs to the sound conversion information calculation section 190 the center position, angle, or scaling factor of the picture corresponding to the current frame following their acquisition from the template information.

FIG. 47 gives views showing examples of the process of converting sound in accordance with information other than motion information about a moving picture according to the embodiment of the present invention. FIG. 47(*a*) shows an example in which a moving picture 653 is displayed to the left and information about the moving picture is displayed in text form to the right on the display screen of the display section 180. Here, the center position of the moving picture 653 on the display screen is located on the left side of the display screen so that the output rate of the output sound for the left speaker 222 is made higher than that for the right speaker 221. In this case, the picture conversion section 140 obtains the center position and scaling factor of the moving picture 653 from the template information indicative of the display area of the moving picture, and outputs what is obtained to the sound conversion information calculation section 191. FIG. 47(*b*) shows an example in which the display area of the display section 180 is split into two for moving picture display. Here, a moving picture 654 is displayed on the left half of the display screen and a moving picture 655 on the right half, so that the output sound on each of the channels of the moving pictures 654 and 655 is generated in keeping with the center positions of the moving pictures 654 and 655. And the output sound on each of the same channels of the moving pictures 654 and 655 is added up and output to the right speaker 221 and left speaker 222. In this case, the picture conversion section 140 obtains the center positions and scaling factors of the moving pictures 654 and 655 from the template information about the splitting of the display area and outputs what is obtained to the sound conversion information calculation section 191.

Explained hereunder in detail by referring to the drawings is a camera work detection section 480 configured to detect the affine transformation parameters stored in the metadata storage section 250 shown in FIGS. 29, 31 and 42. The picture conversion information supply section 130 shown in FIG. 1 has a structure similar to that of the camera work detection section 480 and thus can detect affine transformation parameters as well.

Figure 48:
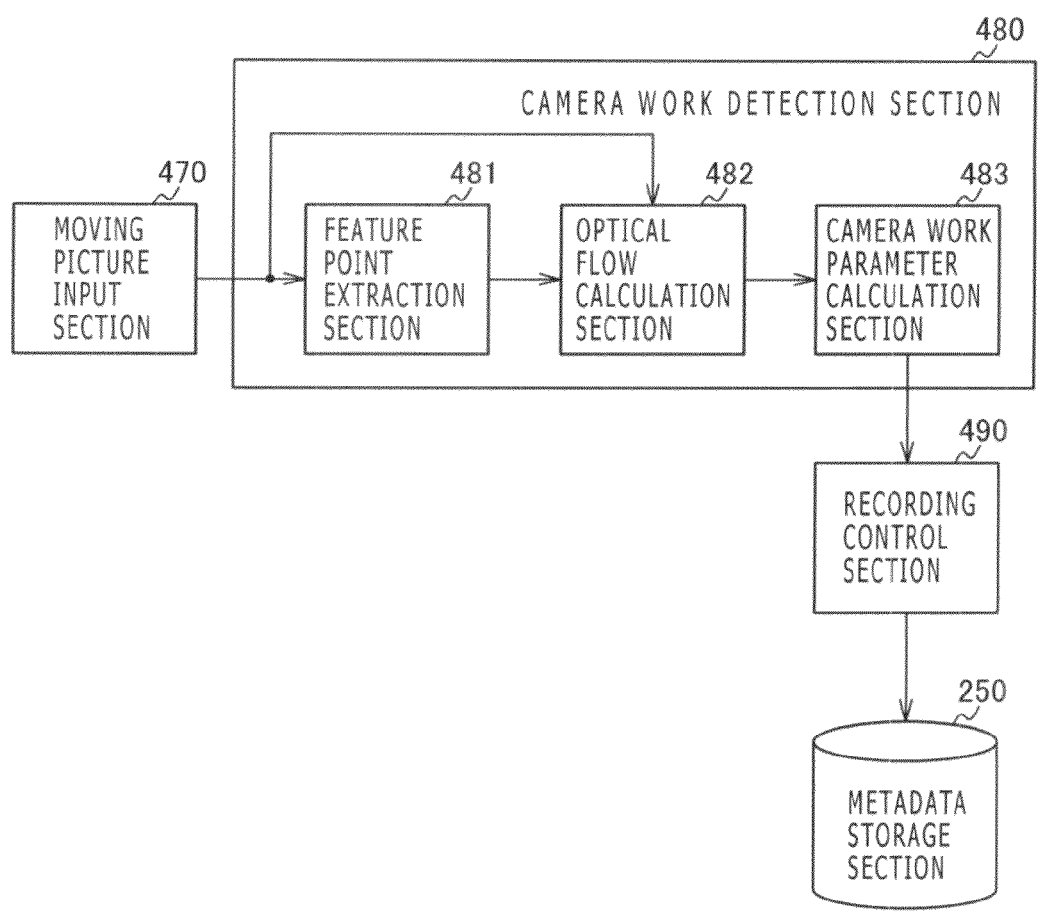
[FIG. 48]

FIG. 48 is a block diagram showing a typical functional structure of the camera work detection section 480 in the embodiment of the present invention. The camera work detection section 480 has a feature point extraction section 481, an optical flow calculation section 482, and a camera work parameter calculation section 483, and is connected to a moving picture input section 470 and a recording control section 490. In this example, only the structure related to the camera work detection section 480 is illustrated; the other structures will not be indicated or explained further.

The moving picture input section 470 inputs moving pictures taken by imaging apparatus such as a digital video camera. The moving picture input section 470 outputs the input moving picture to the camera work detection section 480.

The recording control section 490 records the affine transformation parameters output by the camera work detection section 480 as metadata files to the metadata storage section 250 in relation to corresponding moving pictures and frames.

The feature point extraction section 481 extracts feature points from the pictures corresponding to the frames making up the moving picture output by the moving picture input section 470, and outputs the extracted feature points to the optical flow calculation section 482. Here, the feature point extraction section 481 extracts feature points from the entire picture corresponding to the first frame of the frames making up the moving picture output by the moving picture input section 470. With regard to each of the pictures corresponding to the frames other than the first frame, the feature point extraction section 481 extracts feature points from the picture area portions pictured anew compared with the picture corresponding to the preceding frame. Illustratively, those points each having a steep edge gradient in the vertical or horizontal direction (generally called corner points) may be extracted as the feature points (which will be called the corner points hereunder). The corner points are feature points being highly conducive to letting optical flows be calculated and may be obtained through edge detection. For example, the corner points can be obtained using the extraction method shown in FIGS. 2 and 3. And in this example, the feature point extraction section 481 extracts feature points from the entire picture corresponding to the first frame and, regarding each of the pictures corresponding to the frames other than the first frame, extracts feature points from the picture area portions pictured anew compared with the picture corresponding to the preceding frame. However, depending on the throughput available, the feature points may be extracted also from the entire picture corresponding to each of the frames other than the first frame.

The optical flow calculation section 482 calculates optical flows of the feature points output by the feature point extraction section 481, and outputs the calculated optical flows to the camera work parameter calculation section 483. Specifically, a comparison is made between the pictures corresponding to two consecutive frames (current frame and the preceding frame) making up the moving picture output by the moving picture input section 470, whereby optical flows corresponding to the feature points in the picture corresponding to the preceding frame are obtained as the optical flows of the current frame. And optical flows are obtained regarding each of the frames making up the moving picture. As the method for detecting optical flows, the gradient method or block matching method may be utilized. Illustratively, optical flows can be obtained through the calculations shown in FIGS. 2 and 3.

The camera work parameter calculation section 483 performs a camera work parameter calculation process for calculating camera work parameters using the optical flows corresponding to the feature points and output by the optical flow calculation section 482. The camera work parameters thus calculated are stored into the metadata storage section 250.

Here, the embodiment of the present invention transforms and displays the pictures constituting a plurality of moving pictures targeted for reproduction, in keeping with the motion of the imaging apparatus. In order to perform the picture transformation, the embodiment extracts the motion of the imaging apparatus using the optical flows calculated by the optical flow calculation section 482 and calculates the camera work parameters (transformation parameters) based on the extracted motion. For the embodiment of the present invention, affine transformation is utilized as a typical picture transformation method which is explained herein and which transforms the pictures making up the moving pictures targeted for reproduction. And explained herein as typical camera work parameters are the affine transformation parameters corresponding to the inverse matrices of the affine transformation parameter matrices calculated based on the optical flows. That is, according to the embodiment of the present invention, the affine transformation parameters used as conversion information are defined not as the affine matrices representative of the motion of the feature points between consecutive pictures, but as affine transformation parameters corresponding to the affine matrices indicative of where the picture subsequent to a given reference picture moves to, the reference picture being one of the consecutive pictures. And although affine transformation parameters are explained herein as the typical camera work parameters, some other picture conversion method such as projective transformation may be utilized instead. An affine transformation parameter may be calculated and obtained using a three-point vector, while a projective transformation parameter may be calculated and obtained using a four-point vector. Here, the camera work parameters constitute conversion information for converting taken pictures with reference to at least one of the taken pictures making up a taken moving picture, and include position information and attitude information described at least in the coordinate system of the imaging apparatus. That is, the camera work parameters include information about the position and attitude of the imaging apparatus being handled by the picture-taking person. It is also possible to estimate the motion of the imaging apparatus due to operations by the picture-taking person such as zoom-in, zoom-out, pan, tilt, and rotation on the basis of the affine transformation parameters obtained by the camera work parameter calculation section 483. For example, the affine transformation parameters may be obtained by the calculations shown in FIGS. 2 and 3.

Explained hereunder in detail by referring to the drawings is how a feature point extraction process and an optical flow calculation process are performed by a multi-core processor 800 in the embodiment of the present invention. Here, the feature point extraction process carried out by the feature point extraction section 481 and the optical flow calculation process executed by the optical flow calculation section 482 will be explained as examples.

Figure 49:
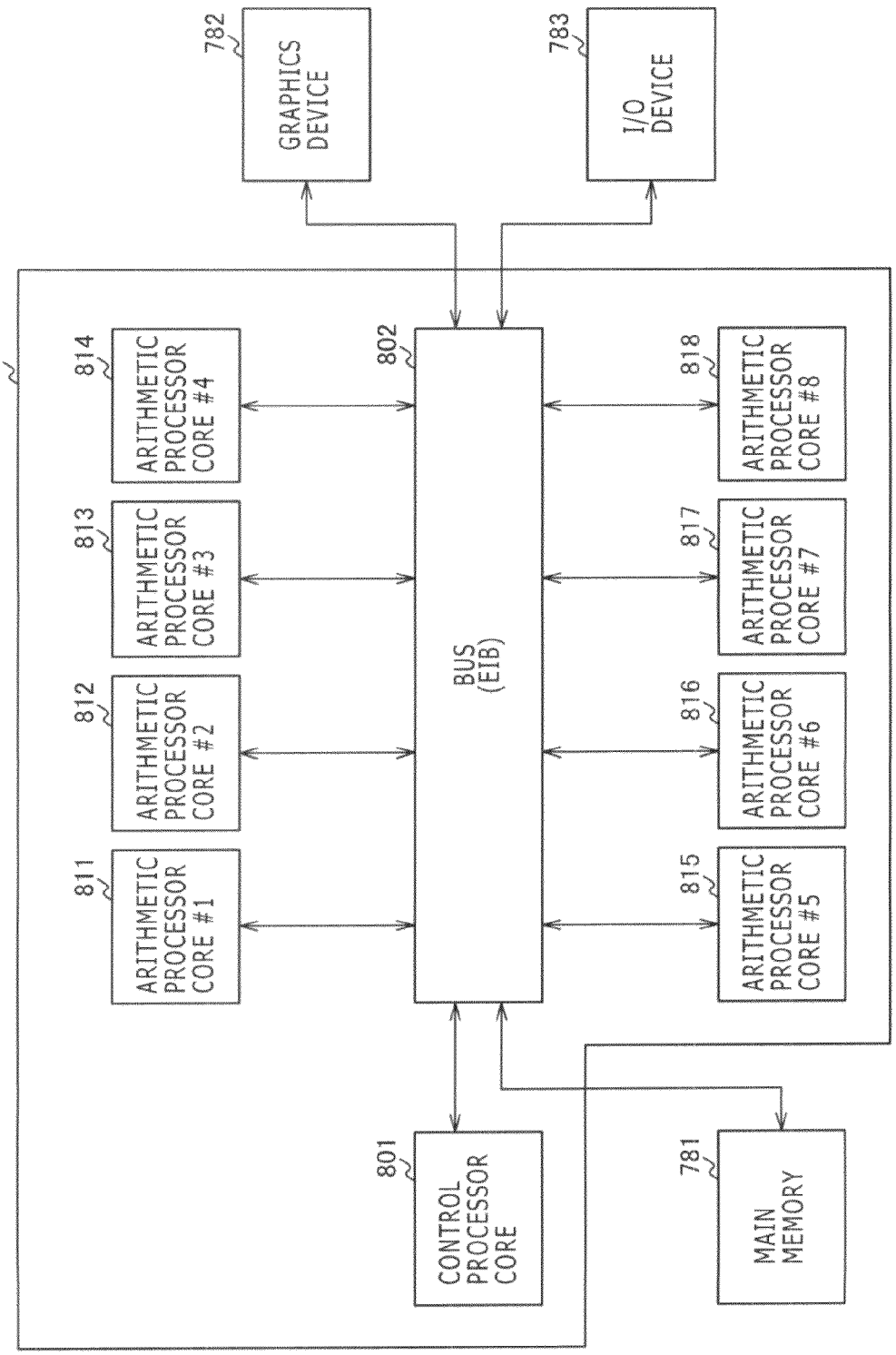
[FIG. 49]

FIG. 49 is a block diagram showing a typical structure of the multi-core processor 800 in the embodiment of the present invention. The multi-core processor 800 is a processor that incorporates a plurality of processor cores of different types in a single CPU (Central Processing Unit) package. That is, in order to maintain the performance of individual processor cores in a simplified structure, the multi-core processor 800 contains two types of multiple processor cores: one type addressing universal applications, the other type being optimized to a certain extent so as to better deal with a specific application.

The multi-core processor 800 has a control processor core 801, arithmetic processor cores (#1) 811 through (#8) 818, and a bus 802 and is connected to a main memory 781. Also, the multi-core processor 800 is connected to other devices such as a graphics device 782 and an I/O device 783. As the multi-core processor 800, a microprocessor called "Cell (Cell Broadband Engine)" developed by this applicant and others may be adopted.

The control processor core 801 primarily carries out frequent thread switching as is done by the operating system. The control processor core 801 will be explained later in detail by referring to FIG. 50.

The arithmetic processor cores (#1) 811 through (#8) 818 are simple, small-size arithmetic processor cores particularly suited for multimedia processing. The arithmetic processor cores (#1) 811 through (#8) 818 will be discussed later in detail by referring to FIG. 51.

The bus 802 is a high-speed bus called an EIB (Element Interconnect Bus) to which the control processor core 801 and the arithmetic processor cores (#1) 811 through (#8) 818 are connected. Data access operations by each of the processor cores are carried out by way of the bus 802.

The main memory 781 is connected to the bus 802. The main memory 781 stores various types of programs to be loaded into each of the processor cores and data necessary for the processing to be performed by the processor cores as well as the data processed by the processor cores.

The graphics device 782 is a graphics device connected to the bus 802. The I/O device 783 is an external input/output device connected to the bus 802.

Figure 50:
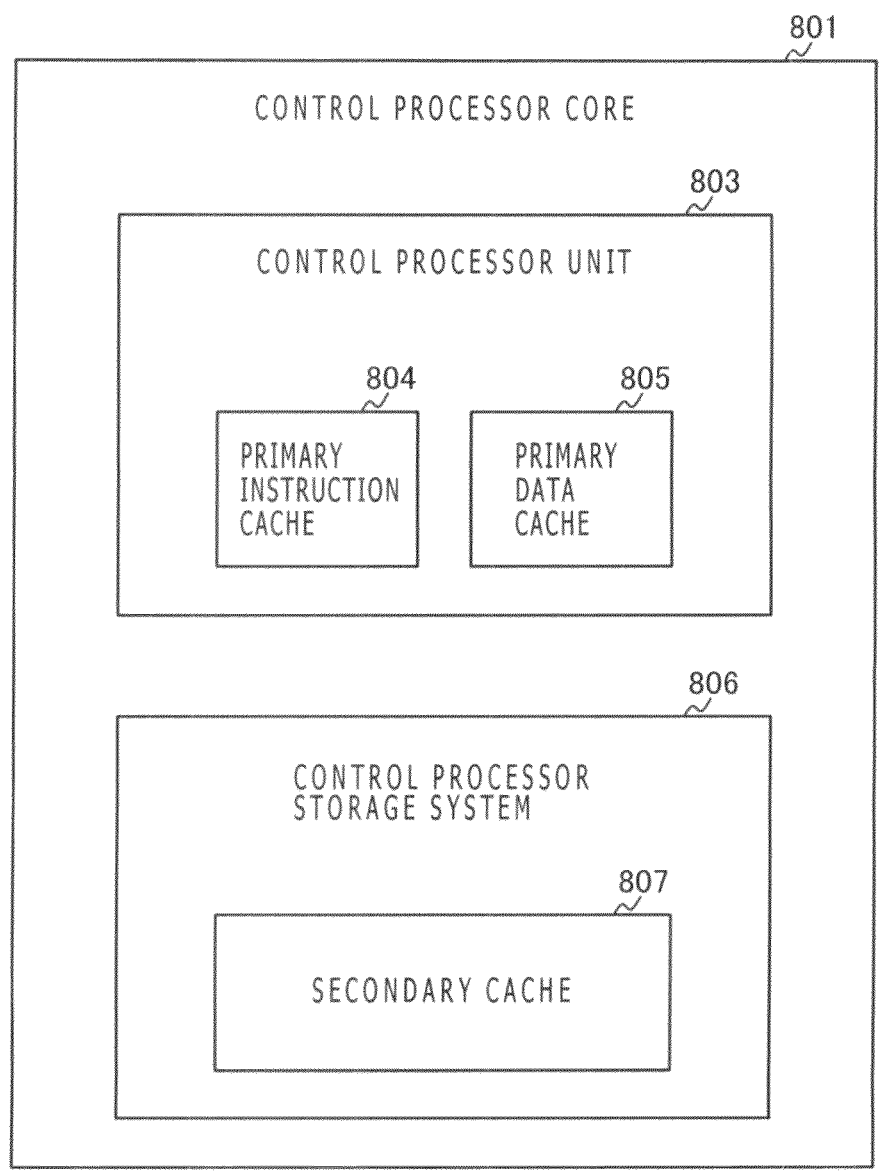
[FIG. 50]

FIG. 50 is a view showing a typical structure of the control processor core 801 in the embodiment of the present invention. The control processor core 801 has a control processor unit 803 and a control processor storage system 806.

The control processor unit 803 is a unit that serves as the core for carrying out arithmetic processing of the control processor core 801. The control processor unit 803 has an instruction set based on a microprocessor architecture, and incorporates an instruction cache 804 and a data cache 805 as primary caches. The instruction cache 804 is illustratively a 32-KB instruction cache, and the data cache 805 is typically a 32-KB data cache.

The control processor storage system 806 is a unit that controls data access operations made from the control processor unit 803 to the main memory 781. The control processor storage system 806 incorporates a 512-KB secondary cache 807 to permit high-speed memory access from the control processor unit 803.

Figure 51:
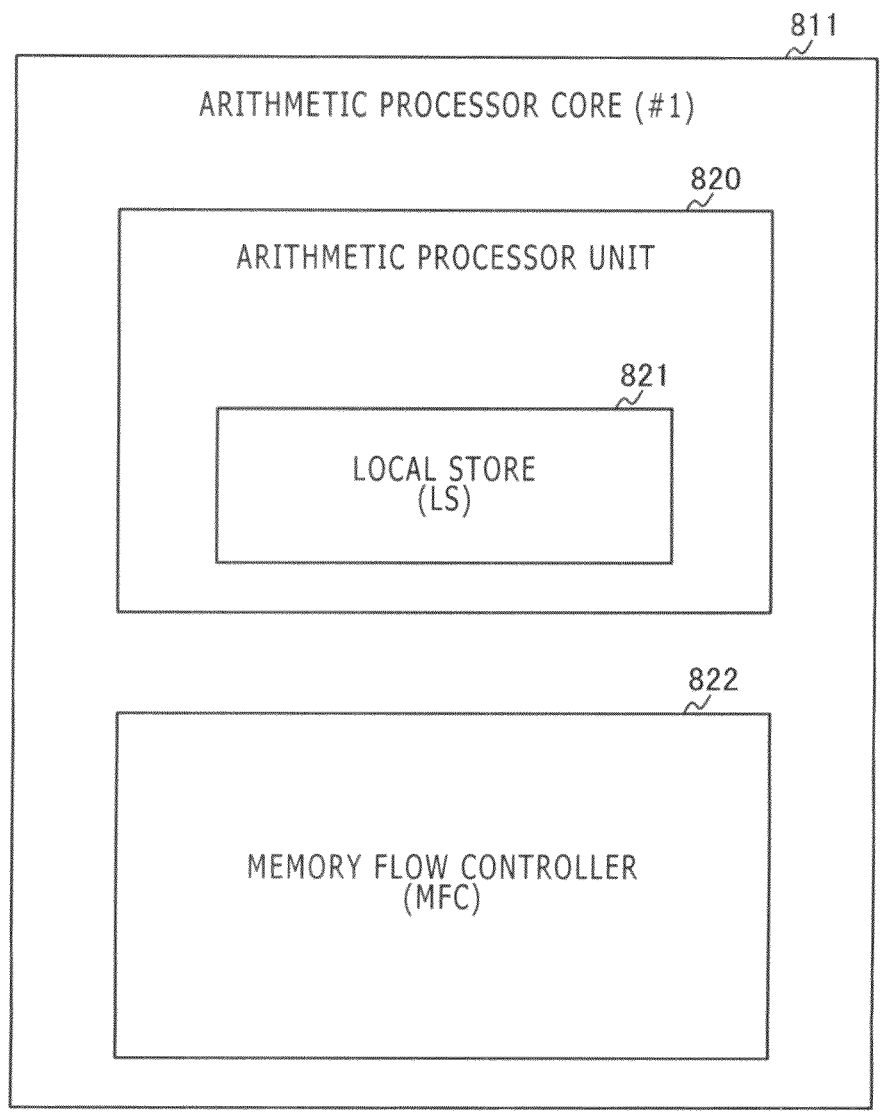
[FIG. 51]

FIG. 51 is a view showing a typical structure of the arithmetic processor core (#1) 811 in the embodiment of the present invention. The arithmetic processor core (#1) 811 has an arithmetic processor unit 820 and a memory flow controller 822. The arithmetic processor cores (#2) 812 through (#8) 818 have the same structure as that of the arithmetic processor core (#1) 811 and thus will not be described further.

The arithmetic processor unit 820 is a unit that serves as the core for performing arithmetic processing of the arithmetic processor core (#1) 811. The arithmetic processor unit 820 has its unique instruction set different from that of the control processor unit 803 in the control processor core 801. Also, the arithmetic processor unit 820 incorporates a local store (LS) 821.

The local store 821 is a dedicated memory of the arithmetic processor unit 820 and is the only memory that can be directly referenced by the arithmetic processor unit 820. Illustratively, a memory with a capacity of 256 kilobytes may be used as the local store 821. When gaining access to the main memory 781 or to the local store of any of the other arithmetic processor cores (i.e., arithmetic processor cores (#2) 812 through (#8) 818), the arithmetic processor unit 820 needs to use the memory flow controller 822.

The memory flow controller 822, called MFC, is a unit that exchanges data with the main memory 781 and other arithmetic processor cores. The arithmetic processor unit 820 requests the memory flow controller 822 to perform data transfers and other operations by way of the interface called channels.

Various programming models have been proposed for the above-described multi-core processor 800. The most basic of the programming models involves getting the control processor core 801 to execute a main program and causing the arithmetic processor cores (#1) 811 through (#8) 818 to carry out subprograms. Described below in detail by referring to the drawings is a computing method by which the multi-core processor 800 in the embodiment of the present invention performs its arithmetic processing using this model.

Figure 52:
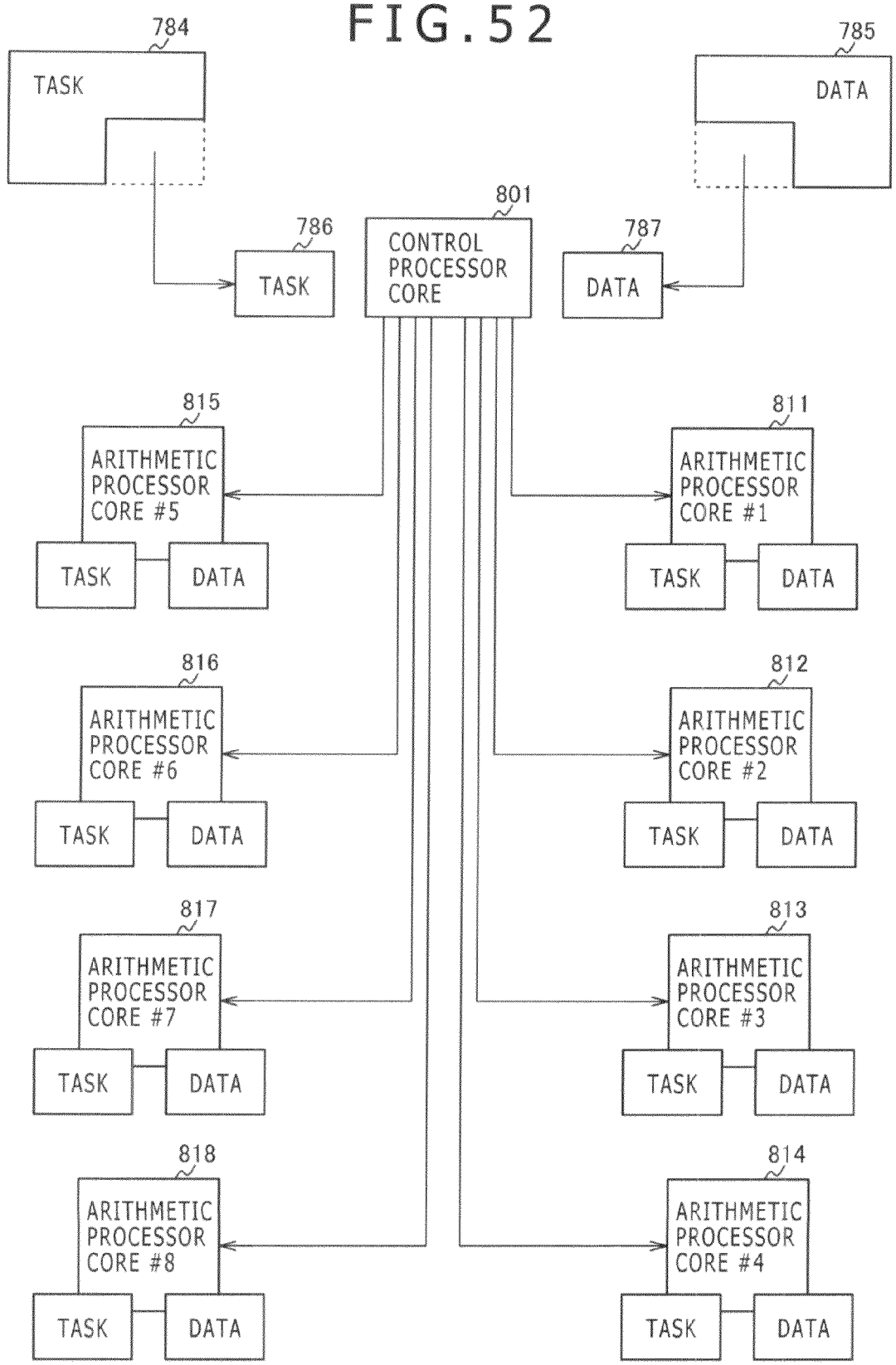
[FIG. 52]

FIG. 52 is a view schematically showing the computing method of the multi-core processor 800 in the embodiment of the present invention. In this example, when carrying out a task 784 using data 785, the control processor core 801 gets the arithmetic processor cores to execute a task 786 which is part of the task 784 using data 787 (part of the data 785) necessary for processing the task 786.

As shown in FIG. 52, when executing the task 784 using the data 785, the control processor core 801 causes the arithmetic processor cores to carry out the task 786 using the data 787 (part of the data 785) necessary for processing the task 786 which is part of the task 784. According to the embodiment of the present invention, the processing is performed by the arithmetic processor cores for each of the frames making up a moving picture.

As shown in FIG. 52, when the multi-core processor 800 performs its processing, the arithmetic processor cores (#1) 811 through (#8) 818 are operated in parallel to accomplish much of the processing in a relatively short time period. It is also possible to carry out relatively large amounts of processing using a more limited number of instructions through the use of SIMD (Single Instruction/Multiple Data) computations on the arithmetic processor cores (#1) 811 through (#8) 818. The SIMD computations will be discussed later in detail by referring to FIGS. 56 through 59 and others.

Figure 53:
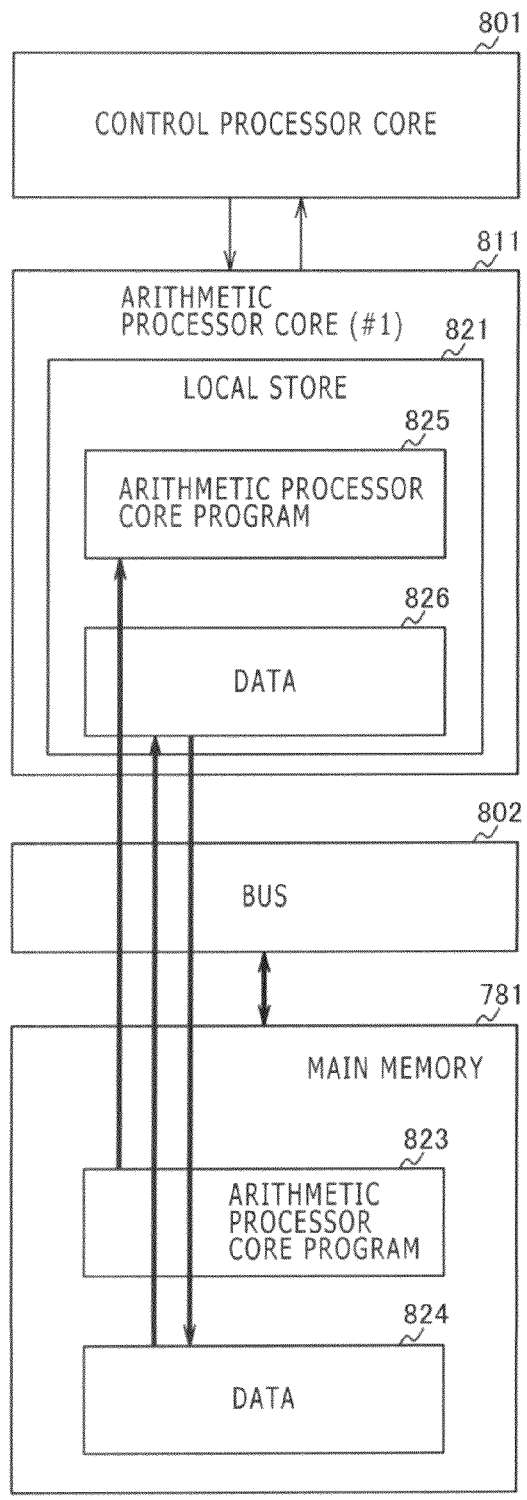
[FIG. 53]

FIG. 53 is a view schematically showing flows of programs and data in effect when the multi-core processor 800 in the embodiment of the present invention performs operations. Here, the arithmetic processor core (#1) 811 out of the arithmetic processor cores (#1) 811 through (#8) 818 is picked up as an example. The same flows hold for the arithmetic processor cores (#2) 812 through (#8) 818 as well.

First, the control processor core 801 gives the arithmetic processor core (#1) 811 an instruction to load an arithmetic processor core program 823 held in the main memory 781 into the local store 821 of the arithmetic processor core (#1) 811. In turn, the arithmetic processor core (#1) 811 loads into the local store 821 the arithmetic processor core program 823 held in the main memory 781.

The control processor core 801 then instructs the arithmetic processor core (#1) 811 to execute the arithmetic processor core program 825 stored into the local store 821.

The arithmetic processor core (#1) 811 then transfers data 824 from the main memory 781 to the local store 821, the data 824 being needed for the execution of the arithmetic processor core program 825 held in the local store 821.

Then on the basis of the arithmetic processor core program 825 held in the local store 821, the arithmetic processor core (#1) 811 processes the data 826 transferred from the main memory 781, carries out subsequent processes under the conditions in effect, and places the result of the processing into the local store 821.

The arithmetic processor core (#1) 811 then transfers the result of the processing executed based on the arithmetic processor core program 825 held in the local store 821, from the local store 821 to the main memory 781.

The arithmetic processor core (#1) 811 then notifies the control processor core 801 that the arithmetic processing has ended.

SIMD computation performed by use of the multi-core processor 800 is explained below in detail by referring to the drawings. The SIMD computation is a computing method whereby processes on a plurality of data are carried out using a single instruction.

FIG. 54($a$) is a view schematically outlining the computing method whereby processes on a plurality of data are carried out using respective instructions. The computing method shown in FIG. 54($a$) is the ordinary computing method illustratively called scalar computation. For example, an instruction to add up data "A1" and data "B1" provides the resulting data "C1." For each of the other three computations, the instruction to likewise add up each of data "A2," "A3" and "A4" and each of data "B2," "B3" and "B4" on the same line is carried out to obtain the resulting data "C2," "C3" and "C4." In this manner, scalar computation requires using an individual instruction for each of the processes to be performed on a plurality of data.

FIG. 54($b$) is a view schematically outlining the SIMD computation, which is a computing method whereby a single instruction is used to perform processes on a plurality of data. Here, the data formed into groups (enclosed by broken lines 827 and 828) for SIMD computation purposes may be called vector data. And SIMD computations performed using such vector data may be called vector computations.

For example, an instruction to add up the vector data enclosed by broken lines 827 ("A1," "A2," "A3," "A4") and the vector data enclosed by broken lines 828 ("B1," "B2," "B3," "B4") provides the processed result "C1," "C2," "C3" and "C4" (data enclosed by broken lines 829). In this manner, SIMD computation involves getting a single instruction to carry out processes on a plurality of data, so that arithmetic processing can be performed at high speed. The instructions for such SIMD computations are executed by the control processor core 801 of the multi-core processor 800, and the processes on a plurality of data under these instructions are carried out in parallel by the arithmetic processor cores (#1) 811 through (#8) 818.

On the other hand, processing illustratively involving adding up the data "A1" and "B1," subtracting the data "A2" and "B2," multiplying the data "A3" and "B3," and dividing the data "A4" and "B4" cannot be performed by SIMD computation. That is, different processes on a plurality of data cannot be accomplished by SIMD computation.

Explained hereunder in detail by referring to the drawings is a specific computing method of SIMD computation whereby the feature point extraction process and the optical flow calculation process are performed.

Figure 55:
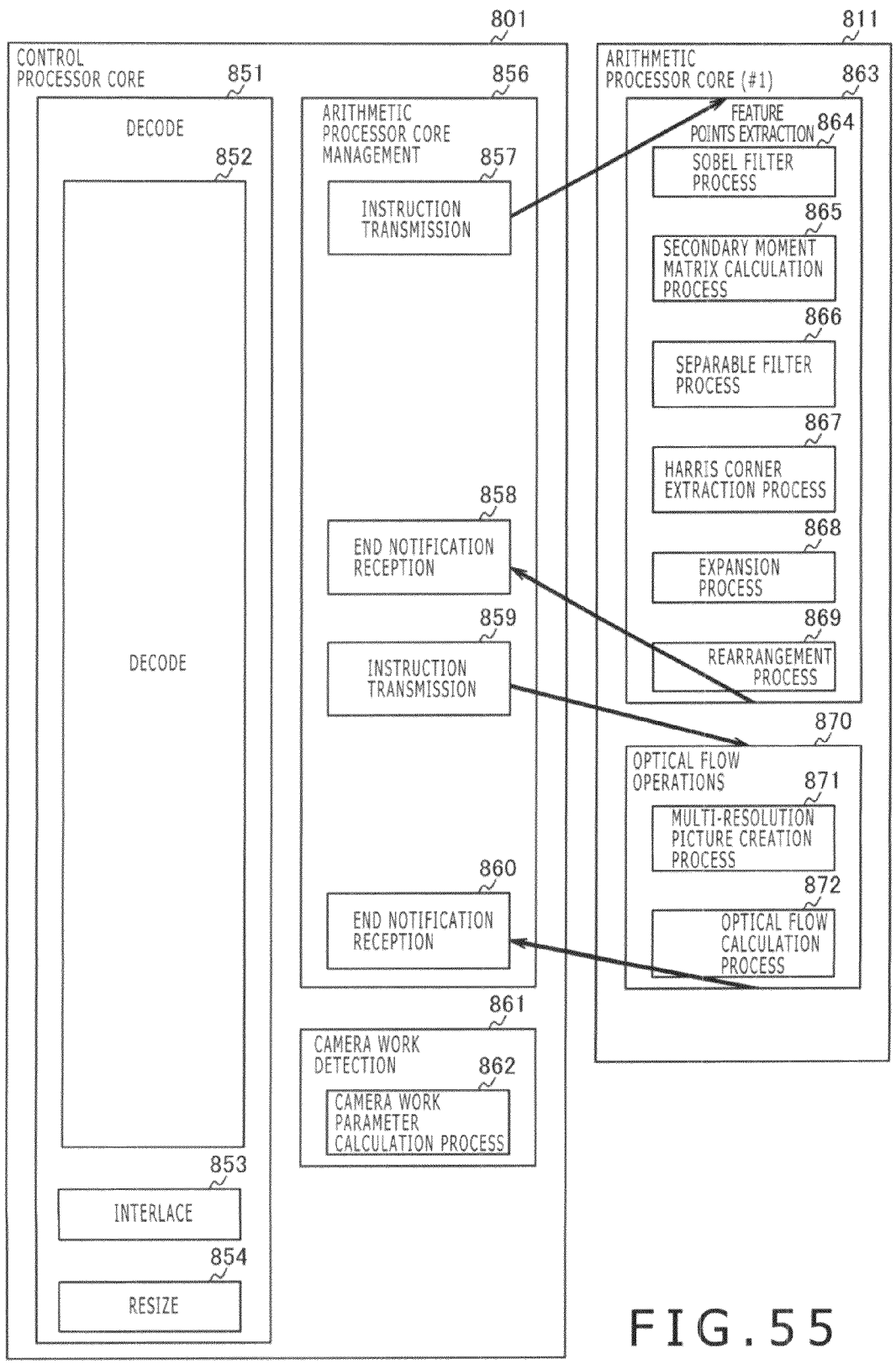
[FIG. 55]

FIG. 55 is a view showing a typical structure of programs executed by either the control processor core 801 or the arithmetic processor core (#1) 811 in the embodiment of the present invention. Although the processing of only the arithmetic processor core (#1) 811 is illustrated here, the same processing is carried out by the arithmetic processor cores (#2) 812 through (#8) 818 as well.

The control processor core 801 performs a decode process 852, an interlace process 853, and a resize process 854 for decoding 851. The decode process 852 is a process that decodes moving picture files. The interlace process 853 is a process that perform interlace elimination on each of the decoded frames. The resize process 854 is a process that reduces in size each of the frames having undergone interface elimination.

Also, the control processor core 801 carries out instruction transmission processes 857 and 859, and end notification reception processes 858 and 860 for arithmetic processor core management 856. The instruction transmission processes 857 and 859 are processes that transmit an SIMD computation execution instruction to the arithmetic processor cores (#1) 811 through (#8) 818. The end notification reception processes 858 and 860 are processes that receive an SIMD computation end notification from the arithmetic processor cores (#1) 811 through (#8) 818 with regard to the above instruction. Furthermore, the control processor core 801 carries out a camera work parameter calculation process 862 for camera work detection 861. The camera work parameter calculation process 862 is a process that calculates affine transformation parameters for each of the frames based on the optical flows calculated through the SIMD computations carried out by the arithmetic processor cores (#1) 811 through (#8) 818.

The arithmetic processor core (#1) 811 carries out a Sobel filter process 864, a second moment matrix process 865, a separable filter process 866, a Harris corner point extraction (Calc Harris) process 867, a dilation process 868, and a sort process 869 for feature point extraction processing 863.

The Sobel filter process 864 is a process that calculates an x-direction value dx obtained using a P2 filter (x-direction) and a y-direction value dy obtained using a y-direction filter. The calculation of the x-direction value dx will be discussed later in detail by referring to FIGS. 56 through 59.

The second moment matrix process 865 is a process that calculates values $dx^2$, $dy^2$, and $dx \cdot dy$ using the values dx and dy calculated by the Sobel filter process 864.

The separable filter process 866 is a process that applies Gaussian filtering (blurring) to the picture of $dx^2$, $dy^2$, and $dx \cdot dy$ calculated by the second moment matrix process 865.

The Harris corner point extraction process 867 is a process that calculates the score of a Harris corner using the values of $dx^2$, $dy^2$, and $dx \cdot dy$ to which blurring was applied by the separable filter process 866. The score S of this Harris corner is calculated illustratively by use of the following expression:

$$S=(dx^2 \times dy^2 - dx \cdot dy \times dx \cdot dy)/(dx^2+dy^2+\epsilon)$$

The dilation process 868 is a process that applies blurring to the picture constituted by the score of the Harris corner calculated by the Harris corner point extraction process 867.

The sort process 869 is a process whereby the pixels of the Harris corners calculated by the Harris corner point extraction process 867 are sorted in descending order of their scores and whereby a predetermined number of the pixels with the highest scores are picked up and extracted as feature points.

The arithmetic processor core (#1) 811 performs a pyramid picture (Make Pyramid Image) process 871 and an optical flow calculation (Calc Optical Flow) process 872 for optical flow operations 870.

The pyramid picture process 871 is a process that successively creates pictures of which the size is reduced in a predetermined number of steps starting from the size of the picture taken by the imaging apparatus. The pictures thus created are called multi-resolution pictures.

The optical flow calculation process 872 is a process that calculates the optical flows of the smallest of the multi-resolution pictures created by the pyramid picture process 871. Using the result of the calculation, the optical flow calculation process 872 again calculates the optical flows of the picture of which the resolution is one step higher. This series of calculations is repeated until the largest of the pictures is reached.

As described above, the feature point extraction process carried out by the feature point extraction section 481 shown in FIG. 48 and the optical flow calculation process carried out by the optical flow calculation section 482 also in FIG. 48 are carried out and their results obtained illustratively by the multi-core processor 800 executing SIMD computations in parallel. The feature point extraction process and the optical flow calculation process shown in FIG. 55 and elsewhere are for illustration. Alternatively, other processes made of diverse filter processes and a threshold value process on the pictures making up the moving picture may be used by the multi-core processor 800 in executing SIMD computations.

FIG. 56 is a view schematically outlining a structure of data and a flow of processes in effect when picture data (which corresponds to one of the frames making up a moving picture taken by the imaging apparatus) stored in the main memory 781 in the embodiment of the present invention is subjected to a filtering process using the Sobel filter 830. In FIG. 56, the picture data stored in the main memory 781 is shown in simplified form with 32 pixels arrayed in the line direction. The Sobel filter 830 is a 3×3 edge extraction filter. As shown in FIG. 56, the picture data held in the main memory 781 is subjected to the filtering process using the Sobel filter 830, and the result of the filtering process is output. Explained in this example is how the results of four iterations of the filtering process are obtained all at once by use of SIMD computations.

Figure 57:
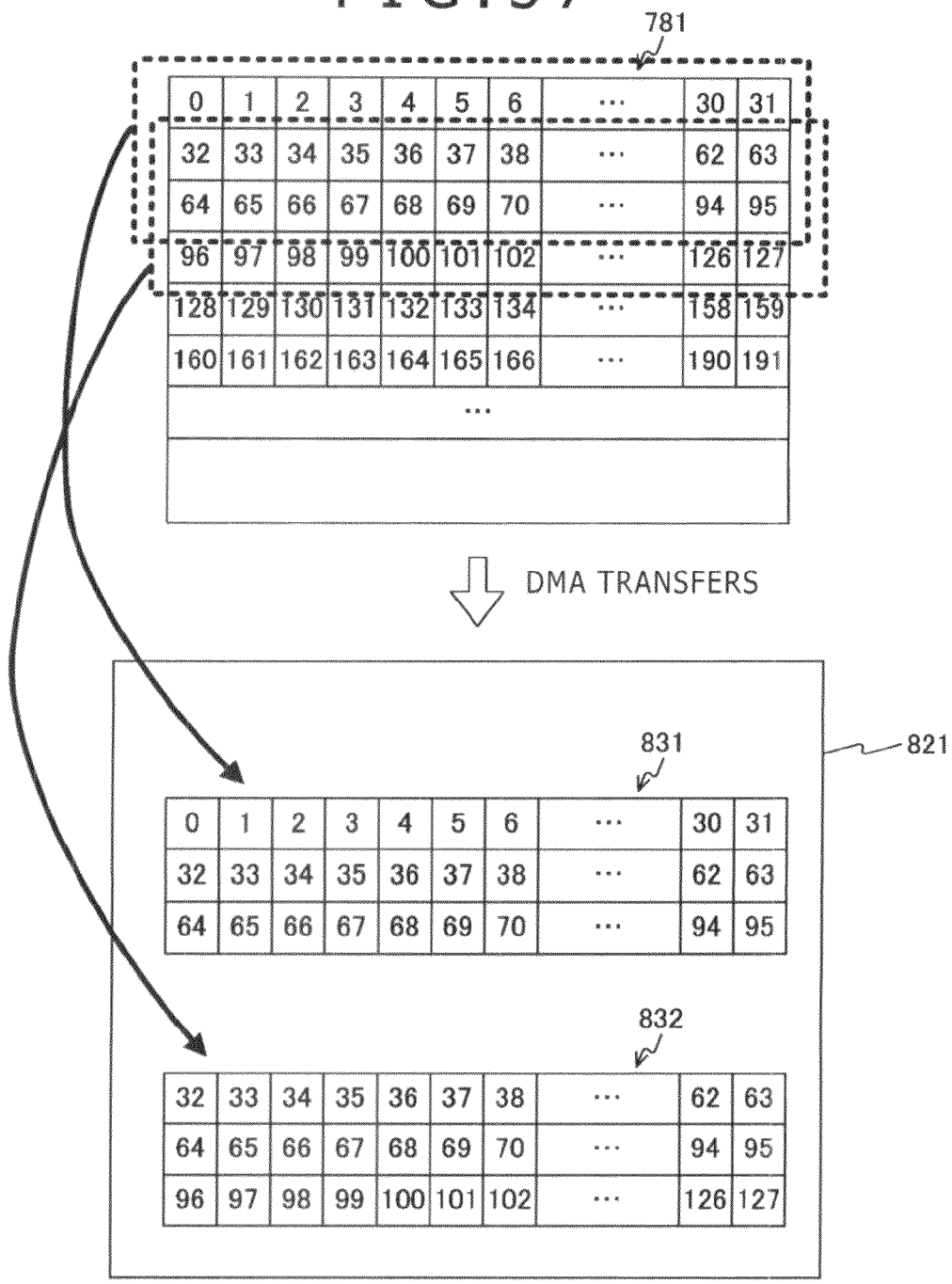
[FIG. 57]

FIG. 57 is a view schematically outlining a flow of data in effect when picture data stored in the main memory 781 in the embodiment of the present invention is subjected to SIMD computations using the Sobel filter 830. First, a predetermined number of lines (e.g., 3 lines) including the first line of the picture data held in the main memory 781 are transferred in a DMA (Direct Memory Access) operation to a first buffer 831 in the local store 821 of the arithmetic processor core, and the predetermined number of lines shifted one line downward from the lines DMA-transferred to the first buffer 831 are DMA-transferred to a second buffer 832. The use of such a double buffer arrangement helps conceal delays in DMA transfers.

FIG. 58 is a view schematically outlining a vector creation method whereby nine vectors are created from picture data stored in the first buffer 831 when the filtering process is performed using the Sobel filter 830 in the embodiment of the present invention. As shown in FIG. 57, following a DMA transfer, nine vectors are created from the picture data held in the first buffer 831. Specifically, from line 1 of the picture data held in the first buffer 831, four data items starting from the leftmost place are used to create vector data 841; the four data items shifted one place right on the same line are used to create vector data 842; and the four items likewise shifted one place right again are used to create vector data 843. From line 2 and line 3, the four data items are used likewise to create vector data 844 through 849.

FIG. 59 is a view schematically outlining a vector operation method whereby vector operations are performed on the vector data 841 through 849 using a SIMD instruction when the filtering process is carried out using the Sobel filter 830 in the embodiment of the present invention. Specifically, SIMD computations are carried out successively on the vector data 841 through 843 so as to obtain a vector A. In the SIMD operation, first, an operation of "−1×vector data 841" is performed in SIMD fashion, followed by SIMD operations of "0×vector data 842" and "1×vector data 843" in that order.

Since the result of the operation of "0×vector data 842" is definitely "0," this operation may be omitted. And since the result of the operation of "1×vector data 843" is definitely the same as the value of the vector data 843, this operation may also be omitted.

Then the result of the operation of "−1×vector data 841" and the result of the operation of "0×vector data 842" are added up in SIMD fashion. Then the result of that addition and the result of the operation of "1×vector data 843" are added up in SIMD fashion. Illustratively, a data structure of "vector data 1×vector data 2+vector data 3" can be computed in SIMD fashion. Thus with regard to the computation of the vector A, the SIMD operation of "0×vector data 842" and that of "1×vector data 843" may be omitted, and a single operation of "−1×vector data 841+vector data 843" may be executed in SIMD fashion.

Likewise, the vector data 844 through the vector data 846 are computed in SIMD fashion to obtain a vector B, and the vector data 847 through the vector data 849 are computed in SIMD fashion to obtain a vector C.

The vectors A through C thus obtained in SIMD fashion are computed by SIMD operation to obtain a vector D. When SIMD computations are carried out as described, the results of as many operations as the number of the elements making up the vector (4 data items in this example) are obtained altogether.

After the vector D is obtained, the same process is repeated while the place of the data to be extracted from the picture data held in the first buffer 831 in FIG. 57 is shifted one place right at a time, which allows the vector D to be obtained successively from each iteration of the process. Upon completion of the process up to the rightmost place of the picture data held in the first buffer 831 shown in FIG. 57, the result of the process is DMA-transferred to the main memory 781.

Thereafter, from the picture data held in the main memory 781, the predetermined number of lines shifted one line downward from the lines DMA-transferred to the second buffer 832 are DMA-transferred to the first buffer 831. Also, the above-described process is repeatedly performed on the picture data held in the second buffer 832. The same process is repeated until the lowest line of the lines of the picture data held in the main memory 781 is reached.

When the feature point extraction process and the optical flow calculation process are mostly performed in SIMD fashion as described above, high-speed processing can be accomplished.

Figure 60:
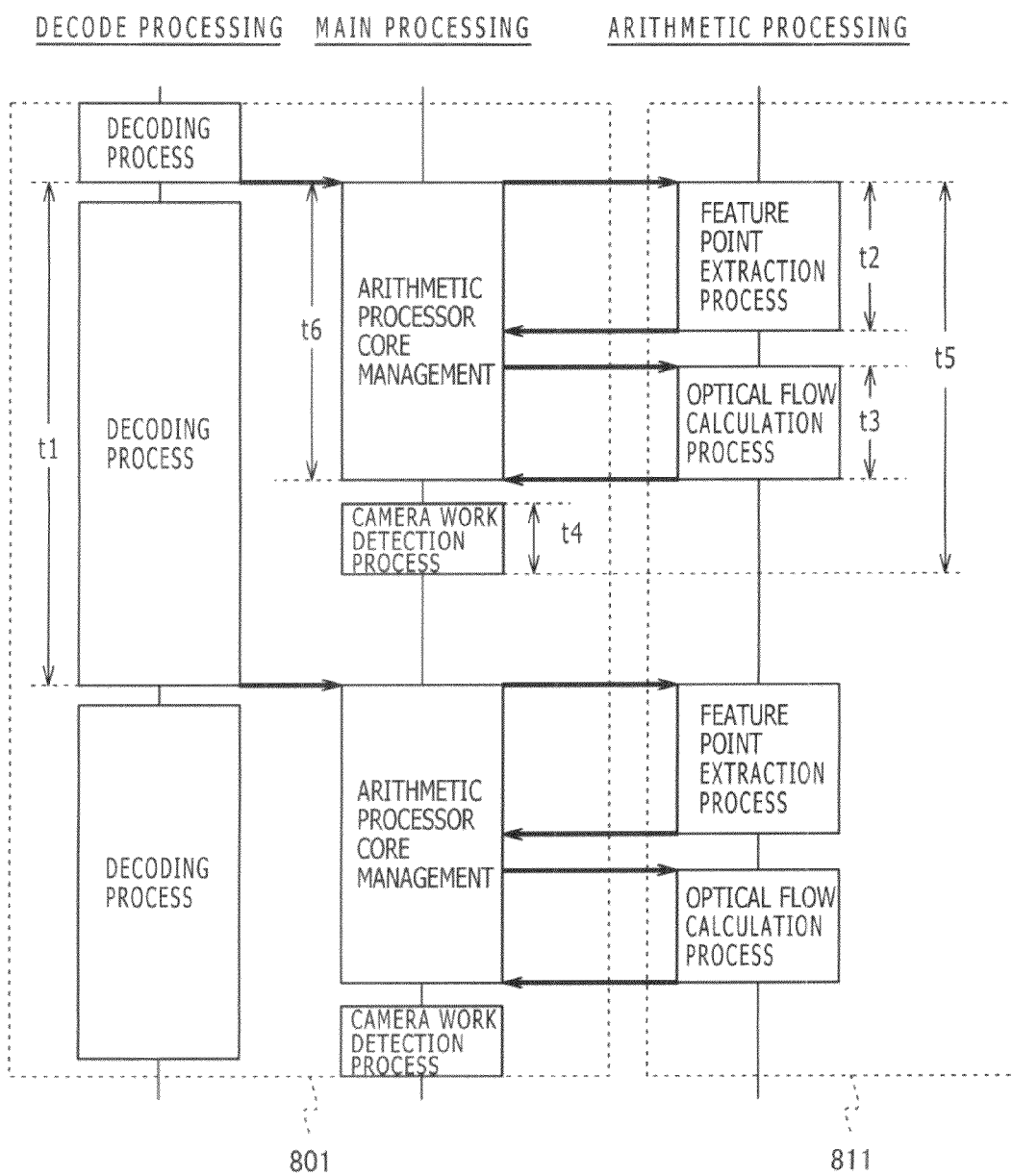
[FIG. 60]

FIG. 60 is a view chronologically outlining a flow of a camera work parameter calculation process according to the embodiment of the present invention. As discussed above, the decoding and analysis processes on a moving picture can be parallelly performed illustratively by the multi-core processor 800 executing SIMD computations. This makes it possible to render the time required to analyze each of the frames constituting the moving picture shorter than the time required to decode the frame.

In FIG. 60, for example, t1 denotes the time required by the control processor core 801 to decode each of the frames making up the moving picture; t2 represents the time required by the arithmetic processor cores (#1) 811 through (#8) 818 to extract feature points from each of the frames making up the moving picture; t3 stands for the time required by the arithmetic processor cores (#1) 811 through (#8) 818 to perform the optical flow calculation process on each of the frames making up the moving picture; and t4 indicates the time required by the control processor core 801 to perform the camera work detection process on each of the frames making up the moving picture. And t5 denotes the time required by the control processor core 801 and the arithmetic processor cores (#1) 811 through (#8) 818 to perform the camera work detection process on each of the frames making up the moving picture. Also, t6 represents the time required by the control processor core 801 to manage the arithmetic processor cores (#1) 811 through (#8) 818. Illustratively, t1 may be set to "25.0 ms," t2 to "7.9 ms," t3 to "6.7 ms," t4 to "1.2 ms," and t5 to "15.8 ms."

Explained below in detail by referring to the drawings is the case where a moving picture content is reproduced by the embodiment of the present invention using metadata files.

Figure 61:
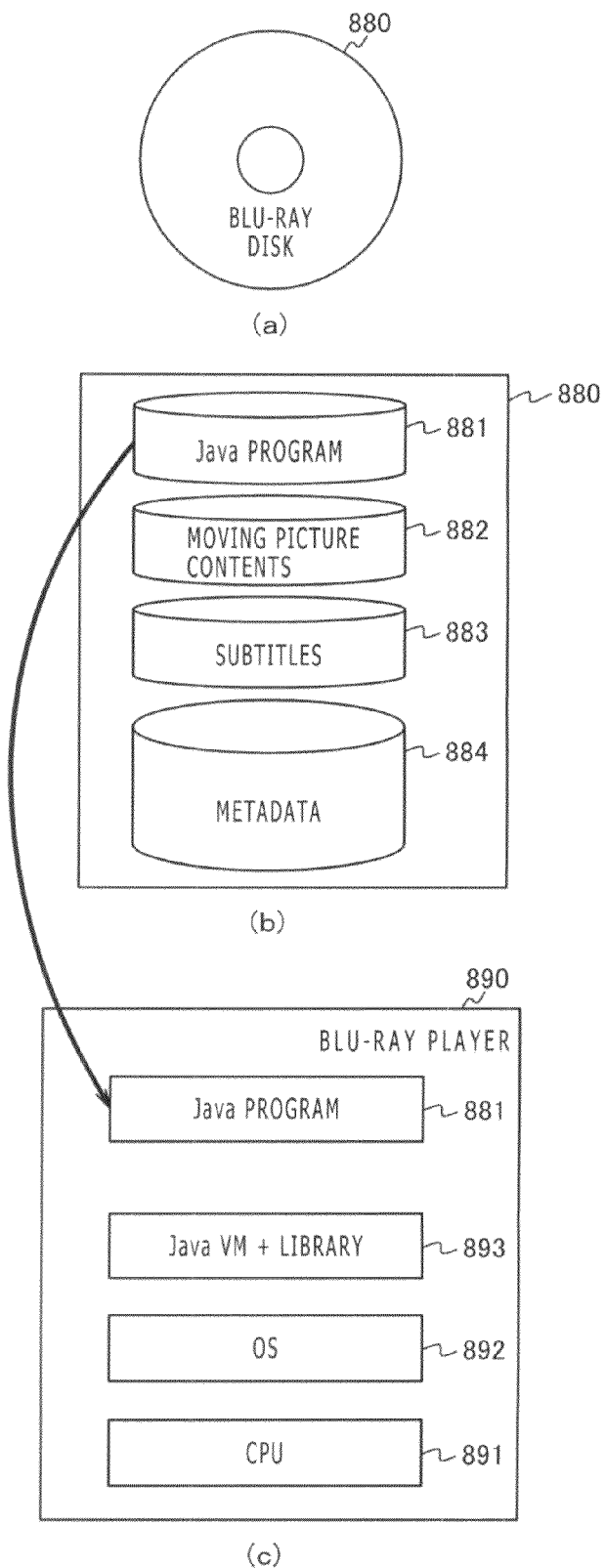
[FIG. 61]

FIG. 61(*a*) is a top view schematically showing a Blu-ray Disc (registered trademark) 880 as a typical recording medium, and FIG. 61(*b*) is a view schematically showing data 881 through 884 recorded on the Blu-ray Disc 880. Recorded illustratively on the Blu-ray Disc 880 are a moving picture content 882 which constitutes a moving picture taken by an imaging apparatus or the like, subtitles 883 for the moving picture content 882, metadata (e.g., a metadata file shown in FIG. 30(*b*) and a relative relation metadata file shown in FIG. 43) 884 obtained by analyzing the moving picture content 882, and a Java (registered trademark) program 881 related to the reproduction of moving pictures performed by the embodiment of the present invention.

FIG. 61(*c*) is a view schematically showing an internal structure of a Blu-ray Disc player 890 capable of reproducing the Blu-ray Disc 880. Here, the Blu-ray Disc player 890 capable of reproducing a Blu-ray Disc is furnished as standard with a Java (registered trademark) VM (Java (registered trademark) virtual machine) plus a library 893 along with a CPU 891 and an OS 892, so that the Blu-ray Disc player 890 can execute Java (registered trademark) programs. Thus when the Blu-ray Disc 880 is inserted in the Blu-ray Disc player 890, the Blu-ray Disc player 890 can load and carry out the Java (registered trademark) program 881. This makes it possible for the Blu-ray Disc player 890, when reproducing the moving picture content 882, to reproduce the moving picture using the metadata 884 according to the embodiment of the present invention. That is, all Blu-ray Disc players can reproduce moving pictures according to the embodiment of the present invention without recourse to dedicated PC software or the like.

According to the embodiment of the present invention, as described above, the input sound can be converted in accordance with the position, angle, or scaling factor of the picture corresponding to the current frame of a moving picture on the display screen. This allows the person viewing the moving picture to listen to the sound appropriately reflecting the position, angle, or scaling factor of the picture corresponding to the current frame on the display screen. That is, the viewer can obtain more realistic sound effects than before.

Also, whereas the embodiment of the present invention has been explained above in connection with moving pictures taken by the imaging apparatus, the embodiment of the present invention may be applied alternatively to moving pictures and the like that are synthesized from animations or from moving pictures taken by camera and then edited.

Also, whereas the embodiment of the present invention has been explained above in conjunction with the picture processing apparatus such as personal computers, the embodiment of the present invention may be applied alternatively to moving picture reproduction apparatuses such as TV sets.

Also, the embodiment of the present invention may be applied alternatively to moving picture viewing systems that illustratively combine sound equipment with a display device.

While the present invention has been described in conjunction with the foregoing specific embodiment claimed correspondingly in the appended claims, the embodiment should not be construed as limiting the scope of the invention but as merely providing illustrations of some of the presently preferred embodiments of this invention. Thus it is to be understood that changes and variations may be made without departing from the spirit or scope of the claims that follow.

Specifically, in claim 1, the content acquisition means corresponds illustratively to the content acquisition section 120 or to the content acquisition section 121. And the picture conversion information supply means corresponds illustratively to the picture conversion information supply section 130 or to the metadata storage section 250. And the picture conversion means corresponds illustratively to the picture conversion section 140 or to the picture conversion section 141. And the picture synthesis means corresponds illustratively to the picture synthesis section 150 or to the picture synthesis section 151. And the display control means corresponds illustratively to the display control section 170 or to the display control section 171. And the sound conversion information calculation means corresponds illustratively to the sound conversion information calculation section 190 or to the sound conversion information calculation section 191. And the sound conversion processing means corresponds illustratively to the sound conversion processing section 200. And the sound output control means corresponds illustratively to the sound output control section 210.

And in claim 7, the volume control means corresponds illustratively to the volume control section 201 or to the volume control section 630. And the sound addition means corresponds illustratively to the sound addition section 202 or to the sound addition section 640.

And in claim 10, the picture holding means corresponds illustratively to the picture memory 160 or to the picture memory 161.

And in claim 11, the display area extraction means corresponds illustratively to the display area extraction section 260.

And in claim 13 or 14, the content acquisition step corresponds illustratively to step S922. And the picture conversion information supply step corresponds illustratively to step S924 or S963. And the picture conversion step corresponds illustratively to steps S927, S931, S935 and S936. And the sound conversion information calculation step corresponds illustratively to step S951 or S982. And the sound conversion processing step corresponds illustratively to steps S952 and S953.

The series of steps and processes discussed above as part of the embodiment of the present invention may be construed as methods for carrying out such steps and processes, as programs for causing a computer to execute such methods, or as a recording medium that stores such programs.

The invention claimed is:

1. A method comprising:
   receiving display area extraction information regarding a display area extracted from a whole area of a synthesized picture and picture conversion information, the synthesized picture being generated by converting a second picture which is positioned chronologically after a first picture in a time line of moving pictures based on the picture conversion information including at least one element regarding a movement of the second picture relative to the first picture, and by synthesizing the converted second picture to the synthesized picture which has been output previously based on the picture conversion information; and
   controlling a right channel sound and a left channel sound based on the display area extraction information and the picture conversion information, the control of the right channel sound differing from the control of the left channel sound according to the movement of the second picture relative to the first picture.

2. The method according to claim 1, wherein the display area extraction information includes rotation of the second picture relative to the synthesized picture.

3. The method according to claim 1, wherein the display area extraction information includes scaling of the second picture relative to the synthesized picture.

4. The method according to claim 1, wherein the display area extraction information includes the position, angle or size of the second picture relative to the synthesized picture.

5. A method comprising:
   converting a right channel sound and a left channel sound based on a display area extraction information and picture conversion information including at least one element regarding a movement of a second picture relative to a first picture positioned chronologically before the second picture in a time line of moving pictures, the first picture and the second picture being used to generate a synthesized picture, the synthesized picture being generated by converting the second picture based on the picture conversion information, and by synthesizing the converted second picture to the synthesized picture output previously based on the picture conversion information, the conversion of the right channel sound differing from the conversion of the left channel sound according to the movement of the second picture relative to the first picture; and
   outputting the converted right channel sound and the converted left channel sound in synchrony with the moving picture.

6. The method according to claim 5, wherein the display area extraction information includes rotation of the second picture relative to the synthesized picture.

7. The method according to claim 5, wherein the display area extraction information includes scaling of the second picture relative to the synthesized picture.

8. The method according to claim 5, wherein the display area extraction information includes the position, angle or size of the second picture relative to the synthesized picture.

9. An information processing apparatus, comprising:
   circuitry configured to
      receive display area extraction information regarding a display area extracted from a whole area of a synthesized picture and picture conversion information, the synthesized picture being generated by converting a second picture which is positioned chronologically after a first picture in a time line of moving pictures based on the picture conversion information including at least one element regarding a movement of the second picture relative to the first picture, and by synthesizing the converted second picture to the synthesized picture which has been output previously based on the picture conversion information; and
      control a right channel sound and a left channel sound based on the display area extraction information and the picture conversion information, the control of the right channel sound differing from the control of the left channel sound according to the movement of the second picture relative to the first picture.

10. The information processing apparatus according to claim 9, wherein the display area extraction information includes rotation of the second picture relative to the synthesized picture.

11. The information processing apparatus according to claim 9, wherein the display area extraction information includes scaling of the second picture relative to the synthesized picture.

12. The information processing apparatus according to claim 9, wherein the display area extraction information includes the position, angle or size of the second picture relative to the synthesized picture.

13. An information processing apparatus, comprising:
circuitry configured to
convert a right channel sound and a left channel sound based on a display area extraction information and picture conversion information including at least one element regarding a movement of a second picture relative to a first picture positioned chronologically before the second picture in a time line of moving pictures, the first picture and the second picture being used to generate a synthesized picture, the synthesized picture being generated by converting the second picture based on the picture conversion information, and by synthesizing the converted second picture to the synthesized picture output previously based on the picture conversion information, the conversion of the right channel sound differing from the conversion of the left channel sound according to the movement of the second picture relative to the first picture; and
output the converted right channel sound and the converted left channel sound in synchrony with the moving picture.

14. The information processing apparatus according to claim 13, wherein the display area extraction information includes rotation of the second picture relative to the synthesized picture.

15. The information processing apparatus according to claim 13, wherein the display area extraction information includes scaling of the second picture relative to the synthesized picture.

16. The information processing apparatus according to claim 13, wherein the display area extraction information includes the position, angle or size of the second picture relative to the synthesized picture.

17. A non-transitory computer-readable medium encoded with computer-readable instructions thereon that, when executed by a computer, cause the computer to perform a method comprising:
receiving display area extraction information regarding a display area extracted from a whole area of a synthesized picture and picture conversion information, the synthesized picture being generated by converting a second picture which is positioned chronologically after a first picture in a time line of moving pictures based on the picture conversion information including at least one element regarding a movement of the second picture relative to the first picture, and by synthesizing the converted second picture to the synthesized picture which has been output previously based on the picture conversion information; and
controlling a right channel sound and a left channel sound based on the display area extraction information and the picture conversion information, the control of the right channel sound differing from the control of the left channel sound according to the movement of the second picture relative to the first picture.

18. The non-transitory computer-readable medium according to claim 17, wherein the display area extraction information includes rotation of the second picture relative to the synthesized picture.

19. The non-transitory computer-readable medium according to claim 17, wherein the display area extraction information includes scaling of the second picture relative to the synthesized picture.

20. The non-transitory computer-readable medium according to claim 17, wherein the display area extraction information includes the position, angle or size of the second picture relative to the synthesized picture.

21. A non-transitory computer-readable medium encoded with computer-readable instructions thereon that, when executed by a computer, cause the computer to perform a method comprising:
converting a right channel sound and a left channel sound based on a display area extraction information and picture conversion information including at least one element regarding a movement of a second picture relative to a first picture positioned chronologically before the second picture in a time line of moving pictures, the first picture and the second picture being used to generate a synthesized picture, the synthesized picture being generated by converting the second picture based on the picture conversion information, and by synthesizing the converted second picture to the synthesized picture output previously based on the picture conversion information, the conversion of the right channel sound differing from the conversion of the left channel sound according to the movement of the second picture relative to the first picture; and
outputting the converted right channel sound and the converted left channel sound in synchrony with the moving picture.

22. The non-transitory computer-readable medium according to claim 21, wherein the display area extraction information includes rotation of the second picture relative to the synthesized picture.

23. The non-transitory computer-readable medium according to claim 22, wherein the display area extraction information includes scaling of the second picture relative to the synthesized picture.

24. The non-transitory computer-readable medium according to claim 21, wherein the display area extraction information includes the position, angle or size of the second picture relative to the synthesized picture.

* * * * *